US007761885B2

(12) United States Patent
Labrou et al.

(10) Patent No.: US 7,761,885 B2
(45) Date of Patent: Jul. 20, 2010

(54) TASK COMPUTING

(75) Inventors: Yannis Labrou, Baltimore, MD (US);
Ryusuke Masuouka, Potomac, MD
(US); Duy Huynh, Raleigh, NC (US);
Zhexuan Song, Silver Spring, MD (US)

(73) Assignee: Fujitsu Limited, Kawasaki (JP)

( * ) Notice: Subject to any disclaimer, the term of this patent is extended or adjusted under 35 U.S.C. 154(b) by 1398 days.

(21) Appl. No.: 11/115,403

(22) Filed: Apr. 27, 2005

(65) Prior Publication Data
US 2005/0246726 A1 Nov. 3, 2005

Related U.S. Application Data

(60) Provisional application No. 60/565,851, filed on Apr. 28, 2004, provisional application No. 60/603,251, filed on Aug. 23, 2004, provisional application No. 60/628,557, filed on Nov. 18, 2004, provisional application No. 60/639,805, filed on Dec. 29, 2004.

(51) Int. Cl.
G06F 3/00 (2006.01)
(52) U.S. Cl. ........................... 719/330; 715/700
(58) Field of Classification Search .................. 719/328, 719/330; 715/700
See application file for complete search history.

(56) References Cited

U.S. PATENT DOCUMENTS

| 5,530,861 | A | 6/1996 | Diamant et al. |
| 6,324,567 | B2 * | 11/2001 | Chidambaran et al. ...... 709/203 |
| 6,556,875 | B1 | 4/2003 | Nagasaka et al. |
| 6,859,803 | B2 | 2/2005 | Dagtas et al. |
| 6,901,596 | B1 * | 5/2005 | Galloway ................... 719/330 |
| 6,910,037 | B2 | 6/2005 | Gutta et al. |
| 6,983,227 | B1 * | 1/2006 | Thalhammer-Reyero ....... 703/2 |
| 7,170,857 | B2 | 1/2007 | Stephens |
| 7,424,701 | B2 * | 9/2008 | Kendall et al. .............. 717/105 |
| 7,577,910 | B1 | 8/2009 | Husemann |
| 7,596,754 | B2 | 9/2009 | Wessling et al. |

(Continued)

OTHER PUBLICATIONS

Ankolekar, Anupriya, et al., "DAML-S: Web Service Description for the Semantic Web", The Semantic Web—ISWC 2002. First International Web Conference Proceedings (Lecture Notes in Computer Science vol. 2342), The Semantic Web—ISWC 2002; XP-002276131; Sardinia, Italy; Jun. 2002; (pp. 348-363).

(Continued)

Primary Examiner—Lechi Truong
(74) Attorney, Agent, or Firm—Staas & Halsey LLP

(57) ABSTRACT

Task Computing computer system by segmenting the system into a plurality of implementation tiers of a presentation layer, a remote procedure call programming interface (API), a middleware layer to which the presentation layer interfaces via the remote procedure call API to real-time, dynamically generate a computer implemented task interface at the presentation layer to a semantically described source of function as a service on a computer system, and a service layer and a function source realization layer providing the semantically described source of function as the service on the computer system to which the middleware layer interfaces. Real-time and dynamically composing an executable task that comprises one or more services using the generated task interface at the presentation layer to one or more services on the computer based upon the semantically described application-, device- and service-rich computer.

54 Claims, 38 Drawing Sheets

U.S. PATENT DOCUMENTS

| | | | |
|---|---|---|---|
| 7,610,045 | B2 | 10/2009 | Little |
| 2002/0078255 | A1 | 6/2002 | Narayan |
| 2002/0107939 | A1 | 8/2002 | Ford et al. |
| 2002/0116225 | A1* | 8/2002 | Morse et al. .................... 705/3 |
| 2003/0204645 | A1* | 10/2003 | Sharma et al. .............. 709/328 |
| 2004/0054690 | A1 | 3/2004 | Hillerbrand et al. |
| 2004/0083205 | A1 | 4/2004 | Yeager |
| 2004/0204063 | A1* | 10/2004 | Van Erlach .............. 455/556.1 |
| 2004/0207659 | A1 | 10/2004 | Goodman et al. |
| 2004/0230636 | A1* | 11/2004 | Masuoka et al. ............ 708/800 |
| 2005/0021560 | A1* | 1/2005 | Yoon et al. ............... 707/104.1 |
| 2005/0060372 | A1 | 3/2005 | DeBettencourt |
| 2005/0080768 | A1 | 4/2005 | Zhang |
| 2007/0157096 | A1 | 6/2007 | Keren et al. |

OTHER PUBLICATIONS

Bader, Gary D., et al., BioPAX—Biological Pathways Exchange Language, Level 1, Version 1.0 Documentation; © 2004 BioPAX Workgroup, BioPAX Recommendation [online] Jul. 7, 2004; Retrieved from the Internet: ://www.biopax.org/release/biopax-level1.owl>.
De Roure, David, et al., "E-Science", Guest Editors' Introduction, IEEE Intelligent Systems; Published by the IEEE Computer Society, © Jan./Feb. 2004 IEEE, pp. 24-63.
"Gene Ontology Consortium" OBO—Open Biological Ontologies; [online] [Retrieved on Oct. 22, 2004] Retrieved from the Internet <URL: geneontology.org/> (6 pages).
Handschuh S., et al. "Annotation for the deep web", IEEE Intelligent Systems, IEEE Service Center, New York, NY, US, vol. 18, No. 5, Sep. 1, 2003; pp. 42-48; XP011101996 ISSN: 1094-7167-Abstract (1 page).
Zhexuan Song, et al. "Dynamic Service Discovery and Management in Task Computing,"pp. 310-318, MobiQuitous 2003, Aug. 22-26, 2004, Boston, pp. 1-9.
MaizeGDB, "Welcome to MaizeGDB!", Maize Genetics and Genomics Database; [online] [Retrieved on Oct. 22, 2004] Retrieved from the Internet maizegdb.org/>.
Marenco et al., "QIS: A framework for biomedical database federation" Journal of the American Medical Informatics Association, Hanley and Belfus, Philadelphia, PA, US, vol. 11, No. 6, Nov. 1, 2004; pp. 523-534, XP005638526; ISSN: 1067-5027.
Ramey, Chet; "Bash Reference Manual", Version 2.02, Apr. 1, 1998; XP-002276132; pp. i-iv; p. 1; and pp. 79-96.
Trellis, "Capturing and Exploiting Semantic Relationships for Information and Knowledge Management", The Trellis Project at Information Sciences Institute (ISI), [online] [Retrieved on Oct. 22, 2004] Retrieved from the Internet www.isi.edu/ikcap/trellis/> 2 pages.
Information Sciences Institute; USC Viterbi School of Engineering; [online] [Retrieved on Oct. 22, 2004] Retrieved from the Internet isi.edu> 2 pages.
Mindswap—Maryland Information and Network Dynamics Lab Semantic Web Agents Project; SWOOP—Hypermedia-based OWL Ontology Browser and Editor; [online] [Retrieved on Oct. 22, 2004] Retrieved from the Internet mindswap.org/2004/SWOOP> (3 pages).
Mindswap—Maryland Information and Network Dynamics Lab Semantic Web Agents Project; OntoLink; Semantic Web Research Group; [online] [Retrieved on Oct. 22, 2004] Retrieved from the Internet <URL: mindswap.org/2004/OntoLink> (2 pages).
Mindswap—Maryland Information and Network Dynamics Lab Semantic Web Agents Project; Pellet OWL Reasoner; [online] [Retrieved on Oct. 22, 2004] Retrieved from the Internet <URL: mindswap.org/2003/pellet/index.shtml> (3 pages).
Haarslev, Volker, "Racer", RACER System Description; News: New Racer Query Language Available; [online] [Retrieved on Oct. 22, 2004] Retrieved from the Internet <URL: cs.concordia.ca/~haarslev/racer> (10 pages).
Jambalaya, the CHISEL group; CH/SEL—Computer Human Interaction & Software Engineering Lab, Home; [online] [Retrieved on Oct. 22, 2004] Retrieved from the Internet <URL: thechiselgroup.org/jambalaya> (1 page).
Malik, Ayesha, "XML, Ontologies, and the Semantic Web", XML Journal, Openlink Virtuoso; [online] [Retrieved on Oct. 22, 2004] Retrieved from the Internet :///www.sys-con.com/xml1/article.cfm?id=577> (7 pages).
Altschul. SF, et al., "Basic local alignment search tool", National Center for Biotechnology information, National Library of Medicine, National Institutes of Health, Bethesda, Maryland 20894; [online] [Retrieved on Oct. 22, 2004] Retrieved from the Internet <URL: ncbi.nlm.nih.gov/entrez/query.fcgi?cmd=Retrieve&db=> (3 pages).
NCBI BLAST *Information*; [online] [Retrieved on Oct. 22, 2004] Retrieved from the Internet <URL: ncbi.nih.gov/Education/BLASTinfo/information3.html> (1 page).
Example of Terrorism Ontology; [online] [Retrieved on Dec. 16, 2004] Retrieved from the Internet <URL mindswap.org/2003/owl/swint/terrorism> (7 pages).
Guttman, E., et al., "Service Location Protocol, Version 2", Network Working Group; @ Home Network; Vinca Corporation; Jun. 1999 (pp. 1-55).
Masuoka, Ryusuke, et al., "Task Computing—The Semantic Web meets Pervasive Computing—" Fujitsu Laboratories of America, Inc., [online] vol. 2870, 2003, pp. 866-881, <URL: mindswap.org> XP-002486064.
Rysuke Masuoka, et al. "Semantic Web and Ubiquitous Computing-Task Computing as an Example-" *AIS SIGSEMIS* Bullentin, vol. 1 No. 3, Oct. 2004, pp. 21-24.
Rysuke Masuoka, et al. "Ontology-Enabled Pervasive Computing Applications,"*IEEE Intelligent Systems*, vol. 18, No. 5, Sep./Oct. 2003 (Sep. 1, 2003), pp. 68-72.
Rysuke Masuoka, et al. Task Computing- Semantic-web enabled, user driven, interactive environments, WWW Based Communities for Knowledge Presentation, Sharing, Mining and Protection (The PSMP workshop) within CIC 2003, Jun. 23-26, 2003, pp. 1.
Rysuke Masuoka, et al. "Task Computing—Filling the Gap Between Tasks and Services," Fujitsu, vol. 55;No. 4; pp. 376-383 (2004) (in Japanese) (English Abstract) (1 page).
Masuoka Ryusuke, DAML Program and the Semantic Web : Toward a More Ontological World, Journal of Japanese Society for Artificial Intelligence, Japan 2002.7 17(4) pp. 392-399 (pp. 397-398 "6. The future of DAML").
Goble, C., et al., Semantic Web and Grid Computing, [online], 2002. 9.5., pp. 1-23, [H20.8.27. search], Internet semanticgrid.org/documents/swgc/swgc-final.pdf (pp. 16-17 "8.1 MyGrid (www.mygrid.org.uk)" and Figure 5).
Preece, A., et al., Intelligent Web Services, Intelligent Systems, IEEE, 2002.1., vol. 17, Issue 1, pp. 15-17 (p. 16, Cloumn right and p. 17, Column left).
1. The Semantic Grid, [online], 2002.10., [H21.1.5. search] , Internet<URL: web.archive.org/web/20021011030835/http://www.semanticgrid.org/documents/>.
The Semantic Web—ISWC 2002, First International Semantic Web Conference, Sardinia, Italy, Jun. 9-12, 2002, Proceedings, Springer, 2002.6.9., [H21.1.6. search], Internet<URL: springer.com/ computer/database+management+ %26+information+retrieval/book/978-3-540-43760-4?detailsPage=toc>.
U.S. Appl. No. 11/014,904, filed Dec. 20, 2004, Patrick Joseph Armstrong, Fujitsu Limited Kawasaki, Japan.
U.S. Appl. No. 10/733,328, filed Dec. 12, 2003, Ryusuke Masuoka, et al., Fujitsu Limited Kawasaki, Japan.
European Search Report Communication issued May 7, 2004 in related Europeans Application No. 03257974.0-1243 (4 pages).
European Patent Office Communication issued Sep. 5, 2005 in related European Application No. 03257974.0-1243 (12 pages).
European Patent Office Communication issued Jan. 22, 2007 in related European Application No. 03257974.0-1243.
First Notification of Office Action issued by the State Intellectual Property Office of China on Jul. 27, 2007 in related China Application No. 200310123963.2, including the Text of the First Office Action (28 pages).
First Notification of Office Action (PCT Application Entry Into the National Phase) issued by the State Intellectual Property Office of China on Dec. 7, 2007, in the related Chinese Patent Application No. 200580013453.7 (22 pages).

Second Notification of Office Action issued by the State Intellectual Property Office of China on Jan. 4, 2008, in related Chinese Patent Application No. 200310123963.2 (2 pages).

First Notification of Office Action issued by the State Intellectual Property Office of China on Mar. 14, 2008 in corresponding Chinese Patent Application No. 200510132687.5 (9 pages).

Second Notification of Office Action issued by the State Intellectual Property Office of China on Sep. 5, 2008 in corresponding Chinese Patent Application No. 200510132687.5, including the Text of the Second Office Action (8 pages).

Third Notification of Office Action issued by the State Intellectual Property Office of China on May 9, 2008 in related China Application No. 200310123963.2, including the Text of the Third Office Action (8 pages).

Rejection Decision issued by the State Intellectual Property Office of China on Sep. 5, 2008 in related China Application No. 200310123963.2, including the Text of the Decision for Rejection (8 pages).

Extended European Search Report Communication issued Aug. 11, 2008 in corresponding European Application No. 05027181.6-1527/1672537.

Notice of Completion of Formalities for Patent Registration with the Notice of Decision of Granting Patent Right for Invention, dated Oct. 10, 2008, issued in related China Application No. 200580013453.7.

Notification of Transmittal of the International Search Report and the Written Opinion of the International Searching Authority, or the Declaration issued Jun. 27, 2006 in related International Application No. PCT/US05/14557.

Notification Concerning Transmittal of International Preliminary Report on Patentability (Chapter I of the Patent Cooperation Treaty) mailed Nov. 9, 2006 in related international Application No. PCT/US2005/014557.

Supplementary European Search Report issued by the EPC on Jul. 18, 2008 in related European Application No. 05739051.0-1243.

Notice Requesting Submission of Opinion filed Nov. 15, 2007 in related Korean Application No. 10-2006-7017143.

U.S. Office Action mailed Oct. 17, 2008 in co-pending U.S. Appl. No. 10/733,328 (20 pages).

U.S. Office Action mailed Jul. 21, 2009 in co-pending U.S. Appl. No. 10/733,328 (21 pages).

U.S. Office Action mailed Oct. 13, 2009 in co-pending U.S. Appl. No. 11/014,904 (6 pages).

Ryusuke Masuoka, et al., "Policy-based Access Control for Task Computing Using Rei", *WWW* 2005, May 10-14, 2005, Chiba, Japan.

Yannis Labrou, et al., "Task Computing: Semantics-Oriented Middleware for Ubiquitous Computing", *WWW* 2005, May 10-14, 2005, Chiba, Japan.

Japan Office Action mailed on Sep. 9, 2008 and issued in related Japanese Patent Application 2003-422759 (4 pages).

Japanese Office Action mailed on Jan. 13, 2009 and issued in related Japanese Patent Application 2003-422759 (2 pages).

U.S. Appl. No. 11/691,807, Filed Mar. 27, 2007, Yannis Labrou, et al., Fujitsu Limited.

U.S. Appl. No. 11/512,405, Filed Aug. 30, 2006, Ryusuke Masuouka, et al., Fujitsu Limited.

U.S. Office Action mailed Mar. 31, 2010 in related co-pending U.S. Appl. No. 11/691,807.

U.S. Office Action mailed Jan. 26, 2010 in related co-pending U.S. Appl. No. 11/512,405.

* cited by examiner

STEER-WS API 120

STEER-WS API 120 is a web service. To start, launch, for example, a HostedSTEER-WS TCC 119 or other application client(s) 119. The web service is available at
http://localhost/steerws/service.asmx.
It has the following operations:

| | |
|---|---|
| addRemoteSite Add a remote discovery module to STEER | |
| checkExecutionStatus Given an execution reference ID, find the current status of the execution. The output has the format *code\|pid\|extraInfo* where code is the execution status code (COMPELTE, ERROR, CANCEL, DONE, PREPARE, CONTROLUI), pid is the id of the process that is currently being executed, extraInfo is the control UI, or output result, or error message. | |
| deleteService Delete a given service by providing the service id. | |
| executeService Execute a single service | |
| executeServiceList2 Execute a sequence of service. As for service list, the input is like s1\|s2\|s3... for parameter pair, it can be either empty, means one-in-one-out list. Or output@number=input@number where output and input are both parameter id, number starts from 0 to the number of service - 1, means the parameter of service at the given number in the sequence. | |
| executeOWLS Execute an OWL-S description without adding it into the service knowledge base. | |
| filterServicesByProperties Filter the existing services by conditions | |
| filterServicesByProperties2 Filter a list of services by conditions | |
| findAllCompositions Find all possible compositions. | |
| findAllMatchedPairs Find all producer, consumer pairs. Designed for composition pane. | |
| findAllServices List all services. Each item has service id, service type and names (in all languages) | |
| findAllServicesInSphere Given a sphere id, find all services that are discovered by the sphere. | |
| findCompositionsByTerms Given a list of keywords, find all compositions with those keywords | |
| findMatchedParameters Given two services that can be composed, find the input and output parameters. | |
| findRelatedServices Find services that can be directly put before or after the given service. | |
| findServiceCandidates Given a list of services, find all services that can be composed with them. | |
| getClassProperties Find all properties (data and object) of a given Ontology class | |
| getDirectSubclass Find the direct sub class of a given Ontology class | |
| getDirectSuperclass Find the direct sub class of a given Ontology class | |
| getNames Given any OWL entity, find its names (in all languages) | |
| getServiceDescription Find the OWL-S description of a service | |
| getServiceProperty Find all properties of a service | |
| holdDiscoveryModule Hold a running discovery module | |
| isRunning Detect if STEER is running | |
| lastUpdateTime Find the last time when a service is added/removed. Use this to find any updates in STEER | |
| listDiscoveryModules List all running discovery modules. | |
| matchByParameter Given a URI of a parameter, find all matched parameters. (Outputs for input and vice versa) | |
| matchedServiceByParameter Given a URI of a parameter, find all matches services. | |
| queryByRDQL Execute an RDQL query over the existing service knowledge base | |
| removeRemoteSite Remove a remote site from the discovery list. | |
| restartDiscoveryModule Restart an existing discovery module | |
| restoreDiscoveryModule Start an on-hold discovery module | |
| saveComposition Save an execution plan into a new service and return the service description | |
| sortServices Given a list of services, sort them in an executable order. | |
| stopExecution Stop a running execution by providing the execution tracking ID | |

Note: WSDL of the STEER TCC web service

FIG. 2

```
string newUpdateTime = lastUpdateTime ();
if (newUpdateTime != oldUpdateTime) {
      // retrieve service list, update your local knowledge
      oldUpdateTime = newUpdateTime;
} else {
      // The old service list is still valid, no need to do //
      any changes.
}
```

FIG. 3A

```
int executionID = startExecuteServiceList(serviceList);
bool InProcess = true;
string previousStatus = "";
while (InProcess) {
  string status = checkExecutionStatus(executionID);
  If (status == "DONE" or status == "ERROR") {
      // Execution is ended or stopped because of errors
      InProcess = false;
  else if (status != "" and status != previousStatus) {
     // Open status in a Web Browser for Control UI
  }
  previousStatus = status
}
```

FIG. 3B

| |
|---|
| string Insert (string *data,* string *description,* string *expiration,* boolean *public)* <br> *data:* object represented in OWL <br> *description:* object description <br> *expiration:* object expiration time represented in string format <br> *public:* pervasive or local object <br> *Return:* reference id of the inserted object |
| string Insert3 (string *data,* string *description,* string *expiration,* boolean *public,* int *limit,* string *locationName,* string *coordindates)* <br> *data:* object represented in OWL <br> *description:* object description <br> *expiration:* object expiration time represented in string format <br> *public:* pervasive or local object <br> *limit:* number of invocation of the object <br> *locationName:* name of the location of the service <br> *coordinates:* coordinates of the location of the service <br> *Return:* reference id of the inserted object |
| string InsertLimit (string *data,* string *description,* string *expiration,* boolean *public,* int *limit)* <br> *data:* object represented in OWL <br> *description:* object description <br> *expiration:* object expiration time represented in string format <br> *public:* pervasive or local object <br> *limit:* number of invocation of the object <br> *Return:* reference id of the inserted object |
| string InsertLimit2 (string *data,* string *description,* string *expiration,* string *modality,* int *limit)* <br> *data:* object represented in OWL <br> *description:* object description <br> *expiration:* object expiration time represented in string format <br> *modality:* selected from "held", "local", "pervasive" <br> *limit:* number of invocation of the object <br> *Return:* reference id of the inserted object |
| string Store (string *data)* <br> Insert into PIPE with default description, no expiration time, no limit and store as pervasive object. <br> *data:* object represented in OWL |
| boolean Remove (string *sid)* <br> Remove a service <br> *sid:* service reference id, see the return value of insert, insertLimit and insertLimit2 for details |
| bool Update (string *sid,* string *description,* string *expiration,* string *modality,* int *limit)* <br> *sid:* service reference id, see the return value of insert, insertLimit and insertLimit2 for details <br> *description:* object description <br> *expiration:* object expiration time represented in string format <br> *modality:* selected from "held", "local", "pervasive" <br> *limit:* number of invocation of the object <br> *Return:* whether the update operation is successful *(true)* or fail *(false)* |
| bool UpdateServiceExpiration (string *sid,* string *expiration)* <br> Change the expiration time of a service <br> *sid:* service reference id, see the return value of insert, insertLimit and insertLimit2 for details |
| bool UpdateServiceHeld (string *sid)* <br> Change the modality of a service to "held" <br> *sid:* service reference id, see the return value of insert, insertLimit and insertLimit2 for details |
| bool UpdateServiceLimit (string *sid,* int *limit)* <br> Change the invocation limit of a service <br> *sid:* service reference id, see the return value of insert, insertLimit and insertLimit2 for details |

FIG. 5A

| |
|---|
| bool UpdateServiceLocal (string *sid*) |
| Change the modality of a service to "local" |
| *sid*: service reference id, see the return value of insert, insertLimit and insertLimit2 for details |
| bool UpdateServicePervasive (string *sid*) |
| Change the modality of a service to "pervasive" |
| *sid*: service reference id, see the return value of insert, insertLimit and insertLimit2 for details |

Call-back based cross-environment service discovery

```
// Main code to build a diagram
serviceList = findAllServicesWithNoOutput ();    / 1102
startNode = new Node ();
endNode = new Node ();
foreach (service in serviceList)
      buildDiagram (startNode, service);    ] / 1104

// function buildDiagram
function buildDialgram (Node node, Service service)
{
      Edge e = new Edge (service);
      e.startNode = node;
      if (service has not input)
      {
            e.endNode = endNode;    / 1106
            return;
      }
      check if there is any node that represent service input
      if (no such node exists)
            create a new node called n
      else
            n is such a node serviceList = findAllMatchedService (service);
      foreach (s in serviceList)
            buildDiagram  (n,  s);   //  recursive  call  the
function
}
```

Sample code of building a speech recognition state diagram

FIG. 11

Matrix 1410

| | Client (C) | Service (S) |
|---|---|---|
| Attributes (= Facts) in OWL | Client Attribute (C-A): Obtained from CAs | $S\text{-}A_{pub}$: Public Attributes (in OWL-S)<br>[$S\text{-}A_{pri}$: Private Attributes (hidden from others), might be unnecessary] |
| Policy (= Rules) in REI | Client Policy (C-P): Usually hidden from others (1420) | $S\text{-}P_{pub}$: Public Policy (in OWL-S)<br>$S\text{-}P_{pri}$: Private Policy (hidden from others) (1424) |

(1422)

Policy Calculation
⋯⋯ (1420) Client calculates its acceptability of service (composition) [C-P, $S\text{-}A_{pub}$]
——— (1422) Client calculates feasibility to the service (composition) [C-A, $S\text{-}P_{pub}$]
– – – (1424) Service calculates acceptability of (or authenticates) clients [C-A, $S\text{-}P_{pub}$, $S\text{-}P_{pri}$ and/or $S\text{-}A_{pri}$ (as the case may be)]

FIG. 14G

```
<!- Fact from Task Computing client -->                      1412
<rdf:RDF ...>
  <rdfs:label lang=en>Bob Smith</rdfs:label>
  <company1:Name   ...>Bob Smith</company1:Name>
  <company1:Expiry ...>2004-08-23T23:05:28Z</company1:Expiry>
  <company1:Status ...>&company1;Company1Visitor</company1:Status>
  <company1:Affiliation ...>University-1</company1:Affiliation>
  <Signature xmlns="http://www.w3.org/2000/09/xmldsig#">
    <SignedInfo>
      ...
    </SignedInfo>
    <SignatureValue>ZrbEVA7JWWGNbpqc...Jo6dDw=</SignatureValue>
  </Signature>
</rdf:RDF>

<!- Printer Private Policy -->
...
<deontic:Permission rdf:about="&company1policy;right_to_be_printed_on"
  policy:desc="All senior employees have the right to print">
  <deontic:actor rdf:resource="&company1policy;var1"/>
  <deontic:action rdf:resource="&company1policy;printing_in_conference"/>
  <deontic:constraint rdf:resource="&company1policy;preOrSenior"/>
</deontic:Permission>
...

<!- Delegation Inserted (and Removed) in Shared Policy-->
<action:Delegation
  rdf:ID="Delegation2004-08-23T19:32:19ZJohn">
  <action:sender rdf:resource="&inst;John"/>
  <action:receiver rdf:resource="&inst;BobSmith"/>
  <action:content>
    <deontic:Permission>
      <deontic:action rdf:resource="&inst;ASeniorEmployeePrintingAction"/>
    </deontic:Permission>
  </action:content>
</action:Delegation>
```

FACT, PRIVATE POLICY, AND SHARED POLICY

FIG. 14H

Real-World Physical Object Semanticizer: Architecture

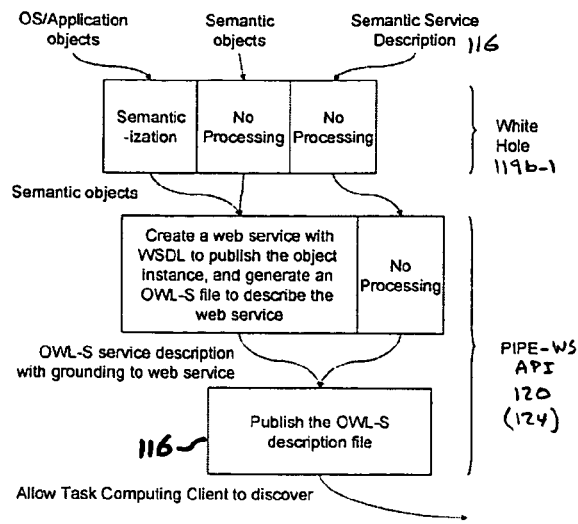

Procedure of semantic-izing, service-izing and publishing of objects and services

FIG. 16A

| Input | OS/Application Object | Semantic object in OWL or URL to it | SSD in OWL-S or URL to it |
|---|---|---|---|
| Function | Identify the object type, create a semantic object | Obtain or download the OWL file | Obtain or download the OWL-S file |
| Output | Semantic Object in OWL | | SSD in OWL-S |

Function of the white hole application

FIG. 16B

| Input | Semantic object in OWL | SSD in OWL-S |
|---|---|---|
| Function | Create a web service, which provides the semantic object (in OWL); generate an OWL-S file for the service; make it available through a discovery range | Make the OWL-S file available within a discovery range |
| Output | Published semantic service | |

Function of the PIPE application

FIG. 16C

```
<?xml version="1.0" encoding="utf-8"?>
<!DOCTYPE uridef[
  <!ENTITY rdf "http://www.w3.org/1999/02/22-rdf-syntax-ns">
  <!ENTITY rdfs "http://www.w3.org/2000/01/rdf-schema">
  <!ENTITY owl "http://www.w3.org/2002/07/owl">
  <!ENTITY service "http://www.daml.org/services/owl-s/1.1/Service.owl">
  <!ENTITY profile "http://www.daml.org/services/owl-s/1.1/Profile.owl">
  <!ENTITY process "http://www.daml.org/services/owl-s/1.1/Process.owl">
  <!ENTITY grounding "http://www.daml.org/services/owl-s/1.1/Grounding.owl">
  <!ENTITY company1 "http://www.company1.com/tce/ontologies/2005/01/service.owl">
  <!ENTITY obj "http://www.company1.com/tce/ontologies/2004/03/object.owl">
  <!ENTITY xsd "http://www.w3.org/2001/XMLSchema">
]>
<rdf:RDF
  xmlns:owl="&owl;#"
  xmlns:rdfs="&rdfs;#"
  xmlns:rdf="&rdf;#"
  xmlns:service="&service;#"
  xmlns:process="&process;#"
  xmlns:profile="&profile;#"
  xmlns:grounding="&grounding;#"
  xmlns:company1="&company1;#"
  xml:base="http://www.company1.com/tce/services/Company1Document.owl#"
>
        <owl:Ontology rdf:about="">
            <owl:imports rdf:resource="&obj;"/>
              <owl:imports rdf:resource="&service;" />
              <owl:imports rdf:resource="&profile;" />
              <owl:imports rdf:resource="&process;" />
              <owl:imports rdf:resource="&grounding;" />
            <owl:imports rdf:resource="&company1;"/>
        </owl:Ontology>

<!-- Service description -->
<service:Service rdf:ID="FileProviderService">
  <service:presents rdf:resource="#FileProviderProfile" />
  <service:describedBy rdf:resource="#FileProvider" />
  <service:supports rdf:resource="#FileProviderGrounding" />
</service:Service>
<!-- Profile description -->
<company1:ProducerProfile rdf:ID="FileProviderProfile">
  <service:isPresentedBy rdf:resource="#FileProviderService"/>

<profile:serviceName xml:lang="en">Company1 Document
</profile:serviceName>
    <profile:serviceName xml:lang="ja">Company1 文書
    <profile:serviceName xml:lang="zh-cn">Company1 文件
    <profile:serviceName xml:lang="es">Documentos Company1</profile:serviceName>
    <profile:serviceName xml:lang="ko">Company1 서류들</profile:serviceName>
  <profile:serviceName xml:lang="zh-tw">Company1 檔案庫</profile:serviceName>
  <profile:serviceName xml:lang="tr">Company1 Belgeleri</profile:serviceName>
  <profile:serviceName xml:lang="hi">Company1 दौकुमेट</profile:serviceName>
  <profile:serviceName xml:lang="el">Εγγραφο Company1</profile:serviceName>
```

```
<profile:textDescription xml:lang="en">Lets you select a document from the Company1
document folder</profile:textDescription>
<profile:textDescription xml:lang="ja">Company1 の文書フォルダから文書を選びます。
</profile:textDescription>
<profile:textDescription xml:lang="zh-cn">让你从Company1的文件列表中选取一个文件。
</profile:textDescription>
<profile:textDescription xml:lang="es">Permite seleccionar un documento de la carpeta de
documentos de Company1</profile:textDescription>
<profile:textDescription xml:lang="ko">Company1 서류들중에서 선택하기
</profile:textDescription>
<profile:textDescription xml:lang="zh-tw">請您自美國富士通實驗室之檔案資料夾中選擇您將要的
檔案</profile:textDescription>
<profile:textDescription xml:lang="tr">Company1 belge klasörinden bir belge seçmenizi sağlar
</profile:textDescription>
<profile:textDescription xml:lang="hi">दोकुमेंट फोल्दर से एफ एल ए सि पि दोकुमेंट चून सकते है
</profile:textDescription>
<profile:textDescription xml:lang="el">Σας δίνει την δυνατότητα να επιλέξετε ένα έγγραφο από
τον φάκελο εγγράφων του Company1</profile:textDescription>

<company1:hasServiceControlUI>
      <company1:ServiceControlUI>
        <profile:sParameter rdf:resource="http://sws.company1.com/DirectoryPublishUI/Select.aspx%
3fname%3dCompany1+Documents%26dir%3dC%253a%255cMy%2bPublished%2bDirectories%
255cMy%2bDocuments%26type%3dFile" />
      </company1:ServiceControlUI>
    </company1:hasServiceControlUI>

<profile:hasOutput rdf:resource="#FileOutput" />
</company1:ProducerProfile>

<process:AtomicProcess rdf:ID="FileProvider">
  <process:hasOutput rdf:resource="#FileOutput" />
  <process:hasInput rdf:resource="#wsdlServiceId" />
</process:AtomicProcess>

<process:Input rdf:ID="wsdlServiceId">
  <process:parameterType rdf:datatype="&xsd;#anyURI">&xsd;#string</process:parameterType>
  <company1:useRandomInput>true</company1:useRandomInput>
</process:Input>

<process:Output rdf:ID="FileOutput">
  <process:parameterType rdf:datatype="&xsd;#anyURI">&obj;#File</process:parameterType>
</process:Output>
<!-- Grounding description -->
<grounding:WsdlGrounding rdf:ID="FileProviderGrounding">
```

```xml
<service:supportedBy rdf:resource="#FileProviderService" />
<grounding:hasAtomicProcessGrounding rdf:resource="#FileProviderProcessGrounding" />
</grounding:WsdlGrounding>

<grounding:WsdlAtomicProcessGrounding rdf:ID="FileProviderProcessGrounding">
  <grounding:owlsProcess rdf:resource="#FileProvider"/>

<grounding:wsdlOperation>
    <grounding:WsdlOperationRef>
      <grounding:portType rdf:datatype="&xsd;#anyURI">
http://www.company1.com/tce/services/DirectoryPublishService/GetURLSoap
</grounding:portType>
      <grounding:operation rdf:datatype="&xsd;#anyURI">
http://www.company1.com/tce/services/DirectoryPublishService/GetURL</grounding:operation>
    </grounding:WsdlOperationRef>
  </grounding:wsdlOperation>

<grounding:wsdlInputMessage rdf:datatype="&xsd;#anyURI">
http://www.company1.com/tce/services/DirectoryPublishService/GetURLSoapIn
</grounding:wsdlInputMessage>

<grounding:wsdlInput>
    <grounding:WsdlInputMessageMap>
      <grounding:owlsParameter rdf:resource="#wsdlServiceId" />
      <grounding:wsdlMessagePart rdf:datatype="&xsd;#anyURI">
http://www.company1.com/tce/services/DirectoryPublishService/sid
</grounding:wsdlMessagePart>
    </grounding:WsdlInputMessageMap>
  </grounding:wsdlInput>

<grounding:wsdlOutputMessage rdf:datatype="&xsd;#anyURI">
http://www.company1.com/tce/services/DirectoryPublishService/GetURLSoapOut
</grounding:wsdlOutputMessage>

<grounding:wsdlOutput>
    <grounding:WsdlOutputMessageMap>
      <grounding:owlsParameter rdf:resource="#FileOutput"/>
      <grounding:wsdlMessagePart rdf:datatype="&xsd;#anyURI">
http://www.company1.com/tce/services/DirectoryPublishService/GetURLResult
</grounding:wsdlMessagePart>
    </grounding:WsdlOutputMessageMap>
  </grounding:wsdlOutput>

<grounding:wsdlDocument rdf:datatype="&xsd;#anyURI">
http://sws.company1.com/DirectoryPublishService/Service.asmx?wsdl
</grounding:wsdlDocument>
</grounding:WsdlAtomicProcessGrounding>
</rdf:RDF>
```

FIG. 16F

```
<?xml version="1.0" encoding="utf-8"?>
<!DOCTYPE uridef[
  <!ENTITY rdf "http://www.w3.org/1999/02/22-rdf-syntax-ns">
  <!ENTITY rdfs "http://www.w3.org/2000/01/rdf-schema">
  <!ENTITY owl "http://www.w3.org/2002/07/owl">
  <!ENTITY service "http://www.daml.org/services/owl-s/1.1/Service.owl">
  <!ENTITY profile "http://www.daml.org/services/owl-s/1.1/Profile.owl">
  <!ENTITY process "http://www.daml.org/services/owl-s/1.1/Process.owl">
  <!ENTITY grounding "http://www.daml.org/services/owl-s/1.1/Grounding.owl">
  <!ENTITY company1
"http://www.company1.com/tce/ontologies/2005/01/service.owl">
  <!ENTITY obj "http://www.company1.com/tce/ontologies/2004/03/object.owl">
  <!ENTITY xsd "http://www.w3.org/2001/XMLSchema">
]>

<rdf:RDF
  xmlns:owl="&owl;#"
  xmlns:rdfs="&rdfs;#"
  xmlns:rdf="&rdf;#"
  xmlns:service="&service;#"
  xmlns:process="&process;#"
  xmlns:profile="&profile;#"
  xmlns:grounding="&grounding;#"
  xmlns:company1="&company1;#"

xml:base="http://192.168.4.26/UPnPFile/82266289_SemanticObjectBroadcastingServic
eDesc.owl"
>

<owl:Ontology rdf:about="">
        <owl:imports rdf:resource="&obj;"/>
           <owl:imports rdf:resource="&service;" />
           <owl:imports rdf:resource="&profile;" />
           <owl:imports rdf:resource="&process;" />
           <owl:imports rdf:resource="&grounding;" />
        <owl:imports rdf:resource="&company1;"/>
</owl:Ontology>
<!-- Service description -->
<service:Service rdf:ID="SemanticObjectProviderService">
  <service:presents rdf:resource="#SemanticObjectProviderProfile" />
  <service:describedBy rdf:resource="#SemanticObjectProvider" />
  <service:supports rdf:resource="#SemanticObjectProviderGrounding" />
</service:Service>

<!-- Profile description -->
  <company1:InstanceProvidingServiceProfile
rdf:ID="SemanticObjectProviderProfile">
    <service:isPresentedBy rdf:resource="#SemanticObjectProviderService" />

<profile:serviceName><![CDATA[Bob Smith]]></profile:serviceName>

<profile:textDescription><![CDATA[Object published by
PIPE]]></profile:textDescription>
```

FIG. 16G

```xml
<!-- SMF starts here -->
  <company1:hasSelfDestructionService>
    <company1:SelfDestructionService>
      <profile:sParameter rdf:resource="#DestroyObject" />
    </company1:SelfDestructionService>
  </company1:hasSelfDestructionService>
<!-- SMF ends here -->

<profile:hasOutput rdf:resource="#SemanticObjectOutput" />
  </company1:InstanceProvidingServiceProfile>

<process:AtomicProcess rdf:ID="SemanticObjectProvider">
  <process:hasInput rdf:resource="#wsdlServiceId"/>
  <process:hasOutput rdf:resource="#SemanticObjectOutput"/>
</process:AtomicProcess>

<process:Input rdf:about="#wsdlServiceId">
  <process:parameterValue
rdf:parseType="Literal">82266289</process:parameterValue>
</process:Input>
<process:Output rdf:about="#SemanticObjectOutput">
  <process:parameterType
rdf:datatype="&xsd;#anyURI">http://www.company1.com/tce/ontologies/2004/03/objec
t.owl#Contact</process:parameterType>
</process:Output>

<!-- Grounding description -->

<grounding:WsdlGrounding rdf:ID="SemanticObjectProviderGrounding">
  <service:supportedBy rdf:resource="#SemanticObjectProviderService" />
  <grounding:hasAtomicProcessGrounding
rdf:resource="#SemanticObjectProviderProcessGrounding" />
  <grounding:hasAtomicProcessGrounding
rdf:resource="#DestroyObjectProcessGrounding" />
</grounding:WsdlGrounding>

<grounding:WsdlAtomicProcessGrounding
rdf:ID="SemanticObjectProviderProcessGrounding">
  <grounding:owlsProcess rdf:resource="#SemanticObjectProvider"/>

<grounding:wsdlOperation>
      <grounding:WsdlOperationRef>
        <grounding:portType
rdf:datatype="&xsd;#anyURI">http://www.company1.com/webservices/PIPE/GetDataSoap
</grounding:portType>
        <grounding:operation
rdf:datatype="&xsd;#anyURI">http://www.company1.com/webservices/PIPE/GetData</gr
ounding:operation>
      </grounding:WsdlOperationRef>
  </grounding:wsdlOperation>

<grounding:wsdlInputMessage
rdf:datatype="&xsd;#anyURI">http://www.company1.com/webservices/PIPE/GetDataSoap
In</grounding:wsdlInputMessage>

<grounding:wsdlInput>
    <grounding:WsdlInputMessageMap>
```

```
<grounding:wsdlInput>
   <grounding:WsdlInputMessageMap>
      <grounding:owlsParameter rdf:resource="#wsdlServiceId" />
      <grounding:wsdlMessagePart
rdf:datatype="&xsd;#anyURI">http://www.company1.com/webservices/PIPE/serviceId</
grounding:wsdlMessagePart>
   </grounding:WsdlInputMessageMap>
</grounding:wsdlInput>

<grounding:wsdlOutputMessage
rdf:datatype="&xsd;#anyURI">http://www.company1.com/webservices/PIPE/GetDataSoap
Out</grounding:wsdlOutputMessage>

<grounding:wsdlOutput>
   <grounding:WsdlOutputMessageMap>
      <grounding:owlsParameter rdf:resource="#SemanticObjectOutput" />
      <grounding:wsdlMessagePart
rdf:datatype="&xsd;#anyURI">http://www.company1.com/webservices/PIPE/GetDataResu
lt</grounding:wsdlMessagePart>
   </grounding:WsdlOutputMessageMap>
</grounding:wsdlOutput>

<grounding:wsdlDocument
rdf:datatype="&xsd;#anyURI">http://192.168.4.26/LocalSemanticObjectManager/Servi
ce.asmx?wsdl</grounding:wsdlDocument>
</grounding:WsdlAtomicProcessGrounding>

<!-- Process for self-destruction function -->
<process:AtomicProcess rdf:ID="DestroyObject">
   <process:hasInput rdf:resource="#destroyServiceId" />
   <process:hasOutput rdf:resource="#destroyServiceResult"/>
</process:AtomicProcess>

<process:Input rdf:about="#destroyServiceId">
   <process:parameterValue
rdf:parseType="Literal">82266289</process:parameterValue>
</process:Input>

<process:Output rdf:about="#destroyServiceResult">
   <process:parameterType
rdf:datatype="&xsd;#anyURI">&xsd;#string</process:parameterType>
</process:Output>

<!-- Grounding for self-destruction function -->
<grounding:WsdlAtomicProcessGrounding rdf:ID="DestroyObjectProcessGrounding">
   <grounding:wsdlOperation>
      <grounding:WsdlOperationRef>
         <grounding:portType
rdf:datatype="&xsd;#anyURI">http://www.company1.com/webservices/PIPE/RemoveSoap<
/grounding:portType>
         <grounding:operation
rdf:datatype="&xsd;#anyURI">http://www.company1.com/webservices/PIPE/Remove</gro
unding:operation>
      </grounding:WsdlOperationRef>
   </grounding:wsdlOperation>

<grounding:owlsProcess rdf:resource="#DestroyObject" />
```

FIG. 16I

```
<grounding:wsdlInputMessage
rdf:datatype="&xsd;#anyURI">http://www.company1.com/webservices/PIPE/RemoveSoapI
n</grounding:wsdlInputMessage>

<grounding:wsdlInput>
   <grounding:WsdlInputMessageMap>
      <grounding:owlsParameter rdf:resource="#destroyServiceId" />
      <grounding:wsdlMessagePart
rdf:datatype="&xsd;#anyURI">http://www.company1.com/webservices/PIPE/sid</ground
ing:wsdlMessagePart>
   </grounding:WsdlInputMessageMap>
</grounding:wsdlInput>

<grounding:wsdlOutputMessage
rdf:datatype="&xsd;#anyURI">http://www.company1.com/webservices/PIPE/RemoveSoapO
ut</grounding:wsdlOutputMessage>

<grounding:wsdlOutput>
   <grounding:WsdlOutputMessageMap>
      <grounding:owlsParameter rdf:resource="#destroyServiceResult" />
      <grounding:wsdlMessagePart
rdf:datatype="&xsd;#anyURI">http://www.company1.com/webservices/PIPE/RemoveResul
t</grounding:wsdlMessagePart>
   </grounding:WsdlOutputMessageMap>
</grounding:wsdlOutput>

<grounding:wsdlDocument
rdf:datatype="&xsd;#anyURI">http://192.168.4.26/LocalSemanticObjectManager/Servi
ce.asmx?wsdl</grounding:wsdlDocument>
</grounding:WsdlAtomicProcessGrounding>
</rdf:RDF>
```

```xml
<?xml version="1.0" encoding="utf-8"?>
<!DOCTYPE uridef[
  <!ENTITY rdf "http://www.w3.org/1999/02/22-rdf-syntax-ns">
  <!ENTITY rdfs "http://www.w3.org/2000/01/rdf-schema">
  <!ENTITY owl "http://www.w3.org/2002/07/owl">
  <!ENTITY service "http://www.daml.org/services/owl-s/1.1/Service.owl">
  <!ENTITY profile "http://www.daml.org/services/owl-s/1.1/Profile.owl">
  <!ENTITY process "http://www.daml.org/services/owl-s/1.1/Process.owl">
  <!ENTITY grounding "http://www.daml.org/services/owl-s/1.1/Grounding.owl">
  <!ENTITY company1
"http://www.company1.com/tce/ontologies/2005/01/service.owl">
  <!ENTITY obj "http://www.company1.com/tce/ontologies/2004/03/object.owl">
  <!ENTITY xsd "http://www.w3.org/2001/XMLSchema">
]>

<rdf:RDF
  xmlns:owl="&owl;#"
  xmlns:rdfs="&rdfs;#"
  xmlns:rdf="&rdf;#"
  xmlns:service="&service;#"
  xmlns:process="&process;#"
  xmlns:profile="&profile;#"
  xmlns:grounding="&grounding;#"
  xmlns:company1="&company1;#"

xml:base="http://192.168.4.26/UPnPFile/995622400_SemanticObjectBroadcastingServiceDesc.owl"
>

<owl:Ontology rdf:about="">
          <owl:imports rdf:resource="&obj;"/>
            <owl:imports rdf:resource="&service;" />
            <owl:imports rdf:resource="&profile;" />
            <owl:imports rdf:resource="&process;" />
            <owl:imports rdf:resource="&grounding;" />
          <owl:imports rdf:resource="&company1;"/>
  <owl:imports
rdf:resource="http://www.company1.com/tce/ontologies/2004/03/project.owl"/>

</owl:Ontology>

<!-- Service description -->

<service:Service rdf:ID="SemanticObjectProviderService">
  <service:presents rdf:resource="#SemanticObjectProviderProfile" />
  <service:describedBy rdf:resource="#SemanticObjectProvider" />
  <service:supports rdf:resource="#SemanticObjectProviderGrounding" />
</service:Service>

<!-- Profile description -->

<company1:InstanceProvidingServiceProfile
rdf:ID="SemanticObjectProviderProfile">
    <service:isPresentedBy rdf:resource="#SemanticObjectProviderService" />

<profile:serviceName><![CDATA[XYZ Project]]></profile:serviceName>
```

FIG. 16K

```xml
<profile:textDescription><![CDATA[Object published by
PIPE]]></profile:textDescription>

<company1:hasSelfDestructionService>
    <company1:SelfDestructionService>
      <profile:sParameter rdf:resource="#DestroyObject" />
    </company1:SelfDestructionService>
  </company1:hasSelfDestructionService>

<profile:hasOutput rdf:resource="#SemanticObjectOutput" />
  </company1:InstanceProvidingServiceProfile>

<process:AtomicProcess rdf:ID="SemanticObjectProvider">
  <process:hasInput rdf:resource="#wsdlServiceId"/>
  <process:hasOutput rdf:resource="#SemanticObjectOutput"/>
</process:AtomicProcess>

<process:Input rdf:about="#wsdlServiceId">
  <process:parameterValue
rdf:parseType="Literal">995622400</process:parameterValue>
</process:Input>
<process:Output rdf:about="#SemanticObjectOutput">
  <process:parameterType
rdf:datatype="&xsd;#anyURI">http://www.company1.com/tce/ontologies/2004/03/proje
ct.owl#Project</process:parameterType>
</process:Output>

<!-- Grounding description -->

<grounding:WsdlGrounding rdf:ID="SemanticObjectProviderGrounding">
  <service:supportedBy rdf:resource="#SemanticObjectProviderService" />
  <grounding:hasAtomicProcessGrounding
rdf:resource="#SemanticObjectProviderProcessGrounding" />
  <grounding:hasAtomicProcessGrounding
rdf:resource="#DestroyObjectProcessGrounding" />
</grounding:WsdlGrounding>

<grounding:WsdlAtomicProcessGrounding
rdf:ID="SemanticObjectProviderProcessGrounding">
  <grounding:owlsProcess rdf:resource="#SemanticObjectProvider"/>

<grounding:wsdlOperation>
      <grounding:WsdlOperationRef>
        <grounding:portType
rdf:datatype="&xsd;#anyURI">http://www.company1.com/webservices/PIPE/GetDataSoap
</grounding:portType>
        <grounding:operation
rdf:datatype="&xsd;#anyURI">http://www.company1.com/webservices/PIPE/GetData</gr
ounding:operation>
      </grounding:WsdlOperationRef>
  </grounding:wsdlOperation>

<grounding:wsdlInputMessage
rdf:datatype="&xsd;#anyURI">http://www.company1.com/webservices/PIPE/GetDataSoap
In</grounding:wsdlInputMessage>

<grounding:wsdlInput>
```

```
    <grounding:WsdlInputMessageMap>
       <grounding:owlsParameter rdf:resource="#wsdlServiceId" />
       <grounding:wsdlMessagePart
rdf:datatype="&xsd;#anyURI">http://www.company1.com/webservices/PIPE/serviceId</
grounding:wsdlMessagePart>
    </grounding:WsdlInputMessageMap>
  </grounding:wsdlInput>

<grounding:wsdlOutputMessage
rdf:datatype="&xsd;#anyURI">http://www.company1.com/webservices/PIPE/GetDataSoap
Out</grounding:wsdlOutputMessage>

<grounding:wsdlOutput>
    <grounding:WsdlOutputMessageMap>
       <grounding:owlsParameter rdf:resource="#SemanticObjectOutput" />
       <grounding:wsdlMessagePart
rdf:datatype="&xsd;#anyURI">http://www.company1.com/webservices/PIPE/GetDataResu
lt</grounding:wsdlMessagePart>
    </grounding:WsdlOutputMessageMap>
  </grounding:wsdlOutput>

<grounding:wsdlDocument
rdf:datatype="&xsd;#anyURI">http://192.168.4.26/LocalSemanticObjectManager/Servi
ce.asmx?wsdl</grounding:wsdlDocument>
</grounding:WsdlAtomicProcessGrounding>

<!-- Process for self-destruction function -->
<process:AtomicProcess rdf:ID="DestroyObject">
  <process:hasInput rdf:resource="#destroyServiceId" />
  <process:hasOutput rdf:resource="#destroyServiceResult"/>
</process:AtomicProcess>

<process:Input rdf:about="#destroyServiceId">
  <process:parameterValue
rdf:parseType="Literal">995622400</process:parameterValue>
</process:Input>

<process:Output rdf:about="#destroyServiceResult">
  <process:parameterType
rdf:datatype="&xsd;#anyURI">&xsd;#string</process:parameterType>
</process:Output>

<!-- Grounding for self-destruction function -->
<grounding:WsdlAtomicProcessGrounding rdf:ID="DestroyObjectProcessGrounding">
  <grounding:wsdlOperation>
    <grounding:WsdlOperationRef>
       <grounding:portType
rdf:datatype="&xsd;#anyURI">http://www.company1.com/webservices/PIPE/RemoveSoap<
/grounding:portType>
       <grounding:operation
rdf:datatype="&xsd;#anyURI">http://www.company1.com/webservices/PIPE/Remove</gro
unding:operation>
    </grounding:WsdlOperationRef>
  </grounding:wsdlOperation>

<grounding:owlsProcess rdf:resource="#DestroyObject" />
```

```
   <grounding:wsdlInputMessage
rdf:datatype="&xsd;#anyURI">http://www.company1.com/webservices/PIPE/RemoveSoapI
n</grounding:wsdlInputMessage>

<grounding:wsdlInput>
      <grounding:WsdlInputMessageMap>
         <grounding:owlsParameter rdf:resource="#destroyServiceId" />
         <grounding:wsdlMessagePart
rdf:datatype="&xsd;#anyURI">http://www.company1.com/webservices/PIPE/sid</ground
ing:wsdlMessagePart>
      </grounding:WsdlInputMessageMap>
   </grounding:wsdlInput>

<grounding:wsdlOutputMessage
rdf:datatype="&xsd;#anyURI">http://www.company1.com/webservices/PIPE/RemoveSoapO
ut</grounding:wsdlOutputMessage>

<grounding:wsdlOutput>
      <grounding:WsdlOutputMessageMap>
         <grounding:owlsParameter rdf:resource="#destroyServiceResult" />
         <grounding:wsdlMessagePart
rdf:datatype="&xsd;#anyURI">http://www.company1.com/webservices/PIPE/RemoveResul
t</grounding:wsdlMessagePart>
      </grounding:WsdlOutputMessageMap>
   </grounding:wsdlOutput>

<grounding:wsdlDocument
rdf:datatype="&xsd;#anyURI">http://192.168.4.26/LocalSemanticObjectManager/Servi
ce.asmx?wsdl</grounding:wsdlDocument>
</grounding:WsdlAtomicProcessGrounding>
</rdf:RDF>
```

FIG. 16N

TASK COMPUTING

CROSS-REFERENCE TO RELATED APPLICATION(S)

This application is related to, and claims the benefit of priority under 35 USC 119 to, Provisional Application U.S. Ser. No. 60/565,851, entitled TASK COMPUTING SYSTEMS by Yannis Labrou, Ryusuke Masuoka, Duy Huynh, Zhexuan Song, and, filed Apr. 28, 2004 in the U.S. Patent and Trademark Office, the contents of which are incorporated herein by reference.

This application is related to, and claims the benefit of priority under 35 USC 119 to, Provisional Application U.S. Ser. No. 60/603,251, entitled TASK COMPUTING, by Ryusuke Masuoka, Yannis Labrou, Zhexuan Song, and, filed Aug. 23, 2004 in the U.S. Patent and Trademark Office, the contents of which are incorporated herein by reference.

This application is related to, and claims the benefit of priority under 35 USC 119 to, Provisional Application U.S. Ser. No. 60/628,557, entitled TASK COMPUTING, by Ryusuke Masuoka, Yannis Labrou, Zhexuan Song, and, filed Nov. 18, 2004 in the U.S. Patent and Trademark Office, the contents of which are incorporated herein by reference.

This application is related to, and claims the benefit of priority under 35 USC 119 to, Provisional Application U.S. Ser. No. 60/639,805, entitled TASK COMPUTING, by Ryusuke Masuoka, Yannis Labrou, Zhexuan Song, and, filed Dec. 29, 2004 in the U.S. Patent and Trademark Office, the contents of which are incorporated herein by reference.

This application is related to U.S. Ser. No. 10/733,328, entitled TASK COMPUTING, by Ryusuke Masuoka, Yannis Labrou, Zhexuan Song, filed Dec. 12, 2003 in the U.S. Patent and Trademark Office, the contents of which are incorporated herein by reference.

BACKGROUND OF THE INVENTION

1. Field of the Invention

The present invention is directed to real-time, dynamically composing and executing complex tasks based upon semantically described application-, device- and service-rich computing environments.

2. Description of the Related Art

Personal Computing may be referred to as a paradigm in which a user operates a single device and accesses/uses applications that reside on that device. Personal computing requires that the user has a sufficient understanding of the user's computing environment and of the applications that are available on the user's computer, so that as a knowledgeable user, the user can adequately utilize the available resources to execute complex tasks. This is computing as most users experience it on a daily basis; the burden of learning how to achieve complex tasks resides with the user, who has to understand each of the applications running on the user's machine and of the functions that the user's machine supports, to manually transfer data between applications (cut & paste), to manually invoke each application and the specific functionality that relates to the task and to eventually devote full attention (and time) to the execution of the complex task. Accomplishing complex tasks relies on the user's understanding of the task on one hand and of the available resources (devices and applications) on the other, so that the user can combine them into a workflow that the user will execute and the final outcome of which will be a completed task.

A shift from Personal Computing to a more task-oriented view of the computing environment, would be as follows:

For example, as one feature of an operating system, when the user inserts a music CD into the CD tray, a window pops up suggesting to the user tasks the user can perform from that point on. A typical listing of these options can include:

Play Audio CD
Copy Music from CD
Open folder to view files
Take no action

Each of these options also mentions the application to be used to perform the action. The focus is on the action, or task to be performed rather than the application used to perform the task.

However, here the operating system uses a pre-specified list of actions, or tasks, that are associated with the occurrence of a specific event (inserting a music CD, or connecting a digital camera), so that when the event occurs, the relevant listing of actions is presented to the user to act upon. In that sense, the system's response is hardwired and does not include flexibility beyond that which as been programmed into the system as to the possible actions to be performed as a result of the triggering event. In other words, the system shows the same set of the actions that can take place when a digital camera is connected to the computer; the programmer of the operating system has prepared this specific list of actions for the particular event. Applications can change the items in the list, but there is not an easy way for end-users to change it.

In another example of an operating system, the user may be presented with a choice of actions depending on a file type. That is, a separate list of tasks is presented to the user for each of the following file types: Documents, Pictures, Photo Album, Music, Music Artist, Music Album, and Videos. For example, if the file type is a picture, a list of "picture tasks" is presented:

View (pictures) as a slide show
Order prints online
Print the picture
Set the picture as background
Copy pictures to a CD This list of tasks is again pre-compiled and associated with the specific file type. There is not an easy way for end-users to modify the list.

In another example of office suite software, a smart tags feature is available. The smart tag feature highlights text in the current document while using an editor and offers the user a drop down menu of actions that can be performed with the object that that text denotes. For example, if the text represents a name, then this feature may identify the object associated with that name to be a person, and may offer the following list of possible actions:

Send mail (to that person)
Schedule a meeting (with that person)
Open Contact (of that person)
Create a Contact (for that person)

The options are enabled by identifying that the string of characters in the document might represent a name. The system relies on the syntactic features of the text to identify that this particular piece of text represents a name. However, a string of characters that does not resemble a typical American name (e.g., Lusheng Ji), may not be identified as a name related to a person. The reason is that the part of the system that identifies a piece of text as a name is a pretty simple program (script) that attempts to identify easily identifiable patterns in the syntactic form of the text. Once the "nature" of the text is identified (correctly or incorrectly), e.g., person, address, etc., a pre-compiled list of possible actions is presented to the user. It is possible for application programmers to create smart tags for other domains and applications, such as identifying addresses and invoking a map application, etc.

Another example of an attempt to present to the user a more task-oriented view of the computing environment is now discussed. When a user types an address in the search box of a search engine, the service will return (above the usual search results) a link to a mapping function that, if followed, will provide a map of the address.

However, it is not obvious that the user might be searching for the map of the typed address. Other reasonable possibilities exist: the user might want a phone number listing associated with this address, or if that address is a business, the user might want to see the BETTER BUSINESS BUREAU record for the searched business, or to check the weather in that vicinity, and so on. In its current form, the search engine guesses what type of "thing" (in this case an address) the typed text stands for and it returns a hard-wired task associated with this type of entry.

Therefore, in a task-oriented view of the computing environment, the focus is on the task that can be performed and not on the application to be used for executing the task. Moreover the user does not need to know which application will be used for the task. If the user chooses to execute one of the suggested tasks, the proper application will be instantiated accordingly and invoked (launched).

However, the computing examples mentioned above exhibit similar features that do not allow real-time, dynamic composition of executable tasks, as follows. In some manner, the type or nature of the user's input (text or event) is guessed; in effect the system attempts to infer the meaning (semantics) of a string, relying on its syntactic features. A system makes a guess of plausible tasks that the user might wish to perform given that input; that guess is hardwired into the system, so effectively it is not the system that makes the guess in real time, but it is the programmer of the system that made the guess when programming the system, way before the user interacts with the system. The appropriate application is automatically invoked upon the user's selection (whatever the user selected in a second step), instantiated with the proper input (whatever the system guessed in a first step), a static cause-effect (or trigger-response) mechanism.

Although the above computing examples can increase the user's convenience, the conventional systems still retain the following personal computing features:

The functionality has been designed into the application; the application's programmers have programmed (hard-wired) the system's response. As a result, this is not a flexible and scalable approach because the range of possibilities has been decided during design time.

The system has limited ways to accommodate the user's actions and wishes, and it cannot accurately "perceive" the nature (semantics or meaning) of the input. Despite the different technologies used in each of the examples, the system relies on correctly guessing the meaning of the input by its syntactic features.

The system employs a cause-effect (or trigger-response) mechanism, in the sense that a certain type of input results to a single action (application invocation). Complex user tasks entail more complex workflows with complex sequences of events and actions that would not be possible technologically speaking with the simplistic techniques used in these discussed examples.

Also, Personal Computing, i.e., the idea of a user owning and operating a computer that runs the user's applications and "holds" the user's data is giving way to computing environments with less well-defined boundaries. As computers get permanently connected to computer networks, the distinctions between local and remote applications and data collapse, or even worse, they are confusing to computer users. Moreover, users can access and interact with devices that are not computers in the sense of personal computers but still possess significant computing power and can serve the users' goals and help them accomplish a variety of tasks (cameras, printers, smart appliances, etc.). For one thing, the average user may not even be aware of what is possible or feasible in such computing environments, as available resources (devices and applications) may be constantly changing. In other words, the personal computing approach is infeasible in a setting replete with devices and applications that are not a priori known to the user.

Accordingly, there is a need to real-time, dynamically, discover, publish, compose, manage, and execute tasks in a computing environment, often referred to as ubiquitous pervasive computing environment, which requires a fundamentally different approach to the problem of the user accomplishing tasks in the computing environment.

SUMMARY OF THE INVENTION

It is an aspect of the present invention embodiment described herein to provide a real-time, dynamically, discovering, publishing, composing, managing, and executing complex tasks based upon semantically described application-, device- and service-rich computer computing (computer system) environments.

According to another aspect of the embodiments described herein a user can practically, effectively, efficiently, dynamically, in real-time, rely on a flexible and unified task, user interface (discovering, publishing, composition, service and/or task management, and execution functions) to manage interaction and to interact with a pervasive computing environment.

BRIEF DESCRIPTION OF THE DRAWINGS

These together with other aspects and advantages which will be subsequently apparent, reside in the details of construction and operation as more fully hereinafter described and claimed, reference being had to the accompanying drawings forming a part hereof, wherein like numerals refer to like parts throughout.

FIG. 2 is a list of example definitions of the STEER-WS API, according to an embodiment of the present invention;

FIGS. 3A-3B is example computer source codes illustrating use of STEER-WS API, according to an embodiment of the present invention;

FIGS. 5A-B is a list of example definitions of the PIPE-WS API 122, according to an embodiment of the present invention;

FIG. 11 is an example pseudo-code to generate a speech recognition diagram for a Task Computing environment, according to an embodiment of the present invention;

FIGS. 14A-14H are diagrams of a process of service access control in a place, according to an embodiment of the present invention;

FIGS. 16A-C are procedures of semantic-izing, service-izing and publishing of objects and services, according to an embodiment of the present invention;

FIGS. 16D-16N are three examples of computer interpretable source codes of SSDs 116 in OWL-S, according to an embodiment of the present invention.

DETAILED DESCRIPTION OF THE PREFERRED EMBODIMENTS

Figure 1A:
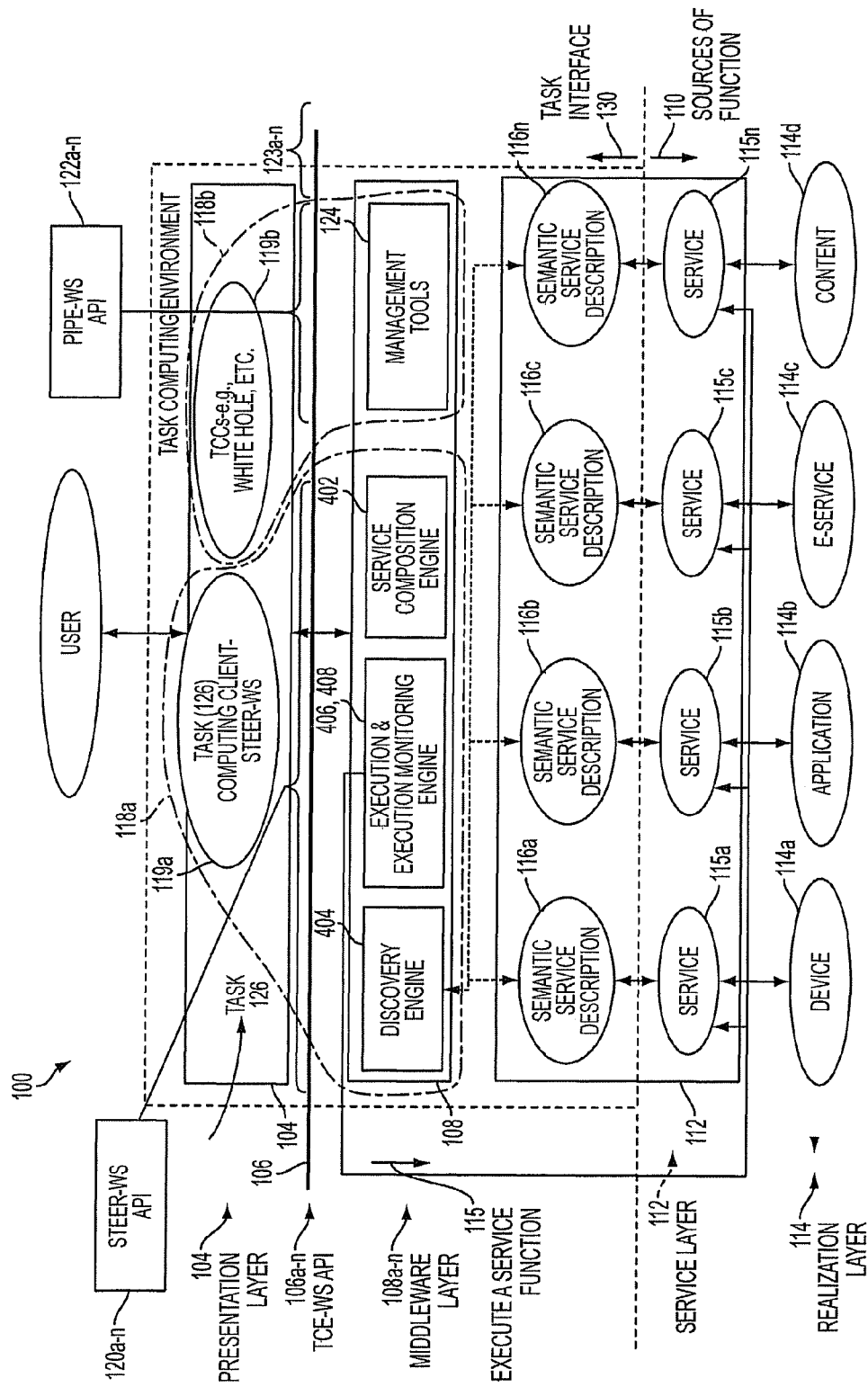
FIG. 1A is a system diagram of architecture of a TASK COMPUTING environment, according to an embodiment of the present invention.

FIG. 1A is a system diagram of architecture of a TASK COMPUTING 100 computer system(s) environment (TCE) 100, according to an embodiment of the present invention. In FIG. 1A, a computer implemented method comprises segmenting a pervasive Task Computing computer system environment 100 into a plurality of Task Computing computer system implementation tiers comprising a presentation processing layer 104, a remote procedure call mechanism application programming interface (API) 106, a middleware (server) processing layer 108 to which the presentation layer 104 interfaces via the remote procedure call API 106 to real-time, dynamically generate a computer implemented task interface 130 (e.g., software/programmed computing hardware interface, a computer display screen graphical user interface (GUI), computer voice user interface) at the presentation layer 104 to a semantically described computer system source of function 116, as a service 112 of a computer, as networked, non-networked, or both 110 (computer system 110), and a service layer 112 and a function source realization layer 114 providing the semantically described computer system source of function 116 as the computer system service 112 to which the middleware processing layer 108 interfaces; and real-time, dynamically composing a computer system an executable task that comprises one or more services 112, according to the generated task interface 130 at the presentation layer 104 to one or more services 112 on the computer system 110.

Task Computing 100 is a new paradigm to real-time, dynamically, discover, publish, compose, manage, and execute complex tasks in application-, device-, electronic service-, and content-rich computer network environments 114 (i.e., execute tasks in realization layer 114). Task computing 100 is based upon semantically describing (e.g., through Semantic Service Descriptions (SSDs) 116a-n) services 115a-n of computing devices 114a-n that according to their semantics can be composed on-the-fly by end-users into executable tasks. Therefore, according to the embodiments described herein, Task Computing 100 system has a multi layer computer system architecture of three or more programmed computing and/or computer readable information layers (e.g., semantic instances, Semantic Service Descriptions 116) of a presentation client processing layer 104, a middleware server processing layer 108 to which the client layer 104 interfaces via a remote procedure call mechanism, and a plurality of services in a plurality of computer systems layer.

According to the embodiments described herein, the term "service" 112 refers to computational embodiments of functionality from universe of function source realization layer 114 of computer devices, computer applications/software, electronic-services and computer (or machine or both) readable content.

The term "task" 126 refers to a composition of one or more actions according to discovered computer system services 112 that, for example, a user wants to perform. According to the embodiments described herein, a "task" 126 is automatically, user driven, or any combination thereof, is composed and managed via a computer implemented task interface 130. In case of a user, a task 126 as a composition of one or more services 112 is managed (e.g., discovered, published, composed, executed, etc.) at the presentation layer 104. In an unlimiting example, a composition of services 112, "view on projector 112 weather info 112 of business address 112 of my contact 112," is a "task" 126 that comprises four services 112 of "view on projector," "weather info," "business address," and "my contact." In other words, a "task" comprises a composition of one or more services 112.

The term "composition" refers to forming by putting together a plurality of services 112 according to provided functional characteristic(s) of services 112 as semantically described, such as (without limitation) semantic inputs and outputs of a service 112, for example, data object type for input (consumption)/output (production) of the service 112. An example of a functional characteristic of a service can be a precondition and an effect of the service 112 to determine service composability. An example of a precondition and an effect of a service 112 can be input and output data object types for a service 112.

The term "semantic instance" or "semantic object" refers to a set of descriptions on some item based on one or more ontology. A Semantic Service Description (SSD) 116 describes a service function 115 based upon one or more service function ontology.

The term "publish" refers to making the Semantic Service Description (SSD) 116 available through one or more service discovery mechanisms.

The term "discover" generally refers to discovery of a Semantic Service Description(s) 116.

TASK COMPUTING designates a type of computer system 100 that supports automatic or user driven or both (any combination thereof) real-time, dynamically, discovering, publishing, composing, managing, and executing a "task" 126 that comprises one or more services 112 based upon semantically described 116 application-, device- and service-rich computer computing (computer system) environments 110.

Two Task Computing Client embodiments referred to as Semantic Task Execution EditoR (STEER) (software to discover and compose into executable tasks the semantically described services 116) and as Pervasive Instance Provision Environment (PIPE) (software to publish and manage semantic instances and/or semantic services 116) are described in related commonly assigned pending U.S. patent application Ser. No. 10/733,328, entitled TASK COMPUTING, by Ryusuke Masuoka, Yannis Labrou, Zhexuan Song, filed Dec. 12, 2003 in the U.S. Patent and Trademark Office, owned by FUJITSU LIMITED assignee of the present Application, the entire contents of which are incorporated herein by reference. The embodiments described herein relate to technologies, and/or in improvements in technologies, used for real-time, dynamic composition of semantically described services 116 into executable tasks 126 as well as management (e.g., discovery, creation/publication, manipulation, etc.) of the semantically described services 116.

In FIG. 1A, according to the embodiment(s) described herein, one or more Task Computing Systems (TCSs) 118a-n are provided according to a client-server computer system architecture based upon a remote procedure call mechanism. A TCS 118 is logically and in implementation segmented into a presentation processing layer 104 providing client type programmed processes as Task Computing Clients 119a-n and a middleware processing layer 108 providing server type programmed processes, in which the segmented presentation and middleware processing layers 104, 108 are interfaced according to any remote procedure call mechanism, such as Web services (WS) as a Task Computing Environment-Web Service Application Programming Interface (TCE-WS API) 106a-n. The concept of Web services is well known. Therefore, according to the embodiments described herein, generally a TCS 118 comprises a Task Computing Client (TCC) 119 providing client type processes at the presentation layer 104, and the TCC 119 interfaces with the middleware server processing layer 108 via a remote procedure call API, such as Web services (WS) in which case the TCC 119 is referred to as a WS TCC 119. A TCS 118 that uses Web services, as an example of a remote procedure call mechanism, is herein referred to as WS TCS 118. By using a remote procedure call mechanism, such Web services, any application, including third party applications (e.g., MICROSOFT WORD, EXCEL, OUTLOOK, ADOBE ACROBAT, etc.) that can make a remote procedure call, such as Web service calls (or can incorporate remote procedure invocation capability) could become a Task Computing Client (TCC) 119. The embodiments described herein use Web services as an example of a remote procedure call mechanism, however, the present invention is not limited to such a configuration and any remote procedure call mechanism can be used.

Therefore, using Web services as an example of a remote procedure call API, Semantic Task Execution EditoR-Web Services Task Computing System (STEER-WS TCS) 118a is an example of a WS TCS 118, which comprises a STEER-WS Task Computing Client (STEER-WS TCC) 119a at the presentation processing layer 104 interfaced, via a STEER-WS API 120, with the middleware server processing layer 108.

A Pervasive Instance Provision Environment-Web Services Task Computing System (PIPE-WS TCS) 118b is another example of a WS TCS 118. A PIPE-WS API 122 exposes middleware server management tools 124 that are generally used for managing (e.g., creating/publishing, removing, manipulating, etc.) semantic object instances and/or SSDs 116 used in Task Computing 100 as well as managing tasks 126. An application client 119 that uses PIPE-WS 122 is herein referred to as a Semantically Described Service Control Mechanism (SDSCM) 119b, examples of which are "White Hole" 119b-1, "Service Manager" 119b-2, "Real-world object semanticizer 119b-3, and database semanticizer 119b-4, described in more detail below. For example, a WS TCS 118b that uses PIPE-WS 122 comprises a Web services Task Computing Client (application client) or SDSCM 119b, such as "White Hole" Task Computing Client ("White Hole") 119b-1, at the presentation processing layer 104, which interfaces via the PIPE-WS API 122 with the middleware server processing layer 108.

Through the use of Web services Task Computing Clients (WS TCCs) 119, such as (without limitation) STEER-WS TCC 119a, and White Hole 119b-1, "Service Manager" 119b-2, "Real-world object semanticizer 119b-3, and database semanticizer 119b-4, as programmable computing components (e.g., Task Computing Client software) at the presentation layer 104, users can manage (e.g., discover, publish, compose, execute, manipulate) tasks 126 based upon semantically described services 116 made available by the middleware server processes 108 through TCE-WS API 106.

In FIG. 1A, according to today's computing environments, a user is surrounded by functionality referred to as the realization layer 114, which comprise devices or computer-mediated services, such as electronic services (e-services) available over the Internet, applications that run on computing devices that the user operates, content available on a computer readable medium, or simply devices that support a specific function. Examples of such devices, application, e-services, and content, include (without limitation) telephones, computer displays, cameras, entertainment devices/centers, televisions, Personal Digital Assistants (PDAs), radio communication devices (e.g., mobile phones, etc.), audio players, fax machines, printers, weather services, map services, office suite computing software (e.g., email application, address book, etc.), multimedia computer readable media (e.g., music compact disc, movie digital video disc (DVD), etc.), Internet sites, databases, etc.

In FIG. 1A, the functionality or services 115a-n presented by the realization layer 114 can comprise, for example, (without limitation) listening to music (e.g., in case of an entertainment device), downloading songs, watching streaming videos, listening to radios, providing contact information, checking addresses on a map, etc. Conventionally, the realization layer 114 has been designed to provide functionality to the user by means of the user interacting with (and/or operating) each device or service; for example if the user want to call a colleague with the phone provided in the room she is visiting and the phone number of the colleague is stored in the user's electronic address book application on the user's laptop, the user must start laptop application, look-up the phone number in question and then dial the phone number manually on the phone. In other words, a user cannot compose a task 126. Even when the applications, e-services and devices can physically communicate with one another, i.e., a communication link among them exists, they cannot exchange data in a way that is meaningful to the user's task, unless the designers of the realization layer 114 have designed the computer system source of function, for example, a computing device, with that specific task in mind. When faced with plethora of sources of functions 114a-n, the user cannot perform tasks that utilize functionalities from all these sources, unless the sources of functions 114a-n have been designed for that task. Moreover, the casual user is often not unaware of what such tasks are possible.

In FIG. 1A, according to the embodiment described herein, the service layer 112 comprises a service function 115a from the function source realization layer 114 and a semantic service description 116a correspondingly semantically describing the service function 115a of the function source realization layer 114, as the service 112 of the computer system (as networked, non-networked, or both) 110. According to an aspect of the embodiments described herein, the relationship between service function 115 and SSD 116 can be many to many (n:m) for a particular function source 114. For example, one SSD 116 to a plurality of service functions 115 where one saves a service function 115 composition (with a plurality of service functions 115 in the composition) as an SSD 116. And one service function 115 to many SSDs 116, where one gives a plurality of kinds or types of semanticization of a singe service function 115. For example, in a case where a book lookup service function 115 (which returns authors, prices, photos, etc. for an ISBN input) can be grounded by semantic services 116 such that one returns the author contact, and another SSD 116 returns an image, etc. More particularly, according to the embodiments described herein, a service layer 112, comprises service functions 115a-n available by the realization layer 114a-n and Semantic Service Descriptions (SSDs) 116a-n corresponding to the service functions 115a-n, together forming available computer system (as networked, non-networked, or both) 110 services 112. The SSD 116 exposes on a computer network a service function 115 of a realization layer 114. Certain embodiment(s) of SSD 116 is/are described in the related commonly assigned pending U.S. patent application Ser. No. 10/733,328, entitled TASK COMPUTING, by Ryusuke Masuoka, Yannis Labrou, Zhexuan Song, filed Dec. 12, 2003 in the U.S. Patent and Trademark Office, owned by FUJITSU LIMITED assignee of the present Application, the entire contents of which are incorporated herein by reference.

Therefore, Task Computing 100 is a new paradigm for how a user interacts with service functions 115a-n of realization layer sources of functions 114a-n, for example, a computing device 114, that emphasizes a task 126 that the user wants to accomplish while using the computing device 114 rather than emphasizing the specific means for how to accomplish the task. Task computing 100 fills the gap between what users want done and a service function 115 of a computing device 114 that might be available in their environments. Task computing 100 presents substantial advantages over traditional approaches, such as the current personal computing paradigm, namely, it is more adequate for non-expert computer users, it is a time-saver for all types of users and is particularly suited for the emerging pervasive computing type of computing environments.

In FIG. 1A, therefore, according to the embodiments described herein, to provide a computer system architecture (software and/or programmable computing hardware) that would be flexible to extend and build upon, a distinct and modularized middleware server processing layer 108 is created whose functionality is made available to the presentation processing layer 104 through remote procedure call application programming interfaces (APIs) 106; so that application developers and users can use them to access Task Computing functions, such as service 112 discovery and composition into executable tasks 126, including construction, save, execution, monitoring, publishing, management, etc. of services 112 and/or tasks 126. A remote procedure call mechanism, such as for example Web services, provides location (i.e., different processing layers on different computers), platform, and programming language independence required for end-user application development.

As discussed above, ubiquitous pervasive networked computer computing environments are populated by a multitude of devices and other functionality (e-services, applications, content) 114, 115 that is often transient in nature; moreover, end-users, or even, developers that are creating an application for a ubiquitous environment might not know in advance what functionalities (resources) 114 and corresponding service functions 115 could be available at a given time and more importantly what they can be used for. To take advantage of this dynamism, it is necessary that service functionalities 114,115 can be discovered and combined at runtime rather than design time. Therefore, the embodiments described herein use, as an example, Semantic Web technologies, because if computer network resources 114, 115 are sufficiently self-described by machine-readable semantics 116, it is possible to build an infrastructure 100 that understands enough about the resources 114, 115, as computer system services 110, to permit end-users do what application developers typically do by bringing their own understanding of what resources 114, 115 provide and can be used for. The concept of Semantic Web is well known.

More particularly, according to the embodiment(s) described herein, the Task Computing 100 utilizes the well known concepts of Semantic Web and Web services. However, to deliver a real, functioning system in a truly dynamic and ad-hoc ubiquitous computing environment, according to the Task Computing 100 described herein, the following are established and implemented:

(1) As shown in FIG. 1, providing a task interface 130 to computer system sources of functions 110. The task interface 130 comprises a Task Computing System (TCS) 118 logically segmented into (1) a presentation processing layer 104 that comprises a Task Computing Client (TCC) 119 and (2) a middleware server processing layer 108 to which the TCC 119 at the presentation layer 104 interfaces with a remote procedure call mechanism API 106, such as Task Computing Environment (TCE) Web Services API 106 (for example, STEER-WS API 120 and the PIPE-WS API 122). The API 106 exposes the middleware server processing layer 108 to be interfaced by the presentation processing layer 104. The task interface 130 also comprises a Semantic Service Description (SSD) 116 layer that semantically describes service functions 115. An SSD 116 is discovered by the middleware processing layer 109 to be presented at the presentation layer 104 via a TCC 119 and a service function 115 is executed, for example, as part of a task 126 to be executed, by the middleware processing layer 108 according to a control command provided, for example, at the presentation layer 104 via the TCC 119 and based upon the SSD 116 for service function 115 to be executed.

(2) Separation of semantic service descriptions (SSDs) 116 and service implementations 115 to provide together a service layer 112;

(3) Separation between discovery (of a service or a saved task, as the case may be) mechanisms and discovery ranges, and manipulation capability of services 112 within and between those ranges by conceiving a concept of "sphere" as a subset of remote procedure call API running on computers 110 and accessible by remote Task Computing Clients 119 to achieve discovery ranges for services 112.

(4) Ability for users (and applications) to dynamically create and manipulate services 112 that can be made available and shared with others (or made unavailable when necessary) (i.e., provide service control management); and (5) Providing a variety of services 112 that enable interesting and truly useful tasks 126.

Therefore, as shown in FIG. 1A, the separation of the above-described layers is both logical (conceptual) and in implementation, useful in building a Task Computing 100 where the user can perform complex tasks that have not been (neither implicitly nor explicitly) designed into the computer network system, thus multiplying the uses of the sources of functionality 114, 115 (devices, applications, content and e-services). The present invention is not limited to the Semantic Web and other semantic type technologies or framework that allows data to be shared and reused across application, enterprise, and community boundaries can be used by the embodiments described herein.

In FIG. 1A, the function source realization layer 114, as the bottom most layer encompasses the universe of computer devices, computer applications/software, electronic-services and computer (or machine or both) readable content, where all functionality available to the user originates. Service functions 115 (described in more detail below) of the function source 114 are computational embodiments of functionality. Such service functionality 115 generally emanates from at least three different types of sources 114: devices, applications (software) and over-the-Web e-services. These three sources 114 are loosely defined and unlimiting categories, because the boundaries between them can be highly malleable. In an example, device 114 originating services 115 are the core functionality that the device 114 is designed to deliver. For example, a phone's (device) 114 main functionality is making phone calls (service) 115. Similarly, application (software) 114 originating functionalities are service functions 115 of the software 114 that is executing on a computing device 114. For example, a personal information management (PIM) application's functionalities, includes storing and retrieving contact information of persons. Finally e-services and/or content(s) 114 service functionality 115 is, for example, a service function 115 that is executing on some remote server to deliver the service functionality 115 through access to the Web, beyond the boundaries of a user's local network. Contents as a fourth source of functionality 114 can be very useful, namely content that is made available as a service function 115; this type of service function 115 can be very convenient as an information-sharing mechanism between users. Therefore, "services" 112 herein refers to computational embodiments of functionality from universe of function source realization layer 114 of computer devices, computer applications/software, electronic-services and computer (or machine or both) readable content. Therefore, a "service" 112 as a computational embodiment of functionality from a function source realization layer 114 has interface characteristics for interacting with the "service" 112, which can comprise a description of the "service," including name of the service, function(s) performed, etc., and functional characteristics of the service, such as input/output to the "service" 112. Further, according to the embodiments described herein, a computer implemented user interface to a computer system service 110 is according to semantically described based upon ontology input data and output data of a "service" 112. For example, a service 112 described in a Semantic Service Description (SSD) 116 to display a file on display projector can be named "View on Projector," which accepts a "File" as input and no output parameter.

In FIG. 1A, the service layer 112 is sources of functionality 114 made computationally available as service functions 115 via Semantic Service Descriptions (SSDs) 116. The SSDs allow discovery and access to (execution of) the service functions 115. Each service function 115 is associated with at least one Semantic Service Description (SSD) 116, which, for example, is encoded according to OWL-S, which is a Web service ontology language based upon Web Ontology Language (OWL) using the Resource Description Framework (RDF)/Extensible Markup Language (XML) exchange syntax, and a SSD 116 can be created on-the-fly, via PIPE-WS TCC 118b, as services 115 might be created (made available) dynamically. The SSD embodiment described is not limited to an OWL-S implementation and any computer interpretable language construct for describing properties and capabilities of computer system service functions 115, including Web services, can be used. The SSD 116 comprises three parts: profile, process and grounding, where the profile part allows users to manipulate the service 115 in semantic layer and the grounding part allows users to actually invoke services 115. Services 115 represent available functionality in the Task Computing universe 100, and SSDs 116 of these services 115 are meant to shield the user from the complexity of the underlying sources of service functionality 115 and make it easy for the user to employ these service sources 115 in accomplishing interesting and complex tasks. An embodiment(s) of Semantically Described Services 116, is described in related commonly assigned pending U.S. patent application Ser. No. 10/733,328, entitled TASK COMPUTING, by Ryusuke Masuoka, Yannis Labrou, Zhexuan Song, filed Dec. 12, 2003 in the U.S. Patent and Trademark Office, owned by FUJITSU LIMITED assignee of the present Application, the entire contents of which are incorporated herein by reference.

In FIG. 1A, middleware server processing layer components 108 are responsible for discovering services 115, 116 (or 112), deciding how services 115, 116 can be composed into executable tasks, executing the services and monitoring service execution, and enabling and facilitating a variety of management operations, including the creation and publishing of semantically described services 116. In other words, the purpose of the middleware processing layer components 108 is to abstract all service resources 115 as semantically-described services 116 that can be made available (e.g., at the presentation layer 104 via TCCs 119) to either users or the applications that seek to manipulate them.

In FIG. 1A, the presentation processing layer 104 utilizes the capabilities of the middleware processing layer 108 to enable users to execute tasks by combining all available service functionality 116, 115 (112). A variety of programmable computing clients (e.g., software clients, programmable computing hardware clients, or both, etc.) using Web services 118a-n, referred to as WS TCCs, WS applications, and/or WS web-based interface applications (accessible with a web browser) (herein all referred to as a WS TCC) are provided to execute tasks by combining all available service functionality 112 via the middleware processing layer 108. According to an embodiment described herein, the middleware layer components 108 are exposed through well-defined Web services application programming interfaces (WS APIs) 106, thereby allowing creation of WS Task Computing Clients (WS TCCs) 119 that utilize these APIs 106.

Defining the task computing environment Web services APIs 106 at the middle processing layer 108 for unrestricted accesses to the core functionalities of Task Computing, such as service 112 discovery, composition, execution, save, creation, management, opens a whole array of possibilities. For example, WS TCCs 119 are not bound to a particular implementation of Task Computing modules, as long as a user can make Web Service 106 calls, the user can work on any platform and use any programming language to create WS TCCs 119 and access services 112.

In FIG. 1A, therefore, according to the embodiments described herein, a Task Computing Environment-Web Services (TCE-WS) API 106 is provided. Subsets of the TCE-WS API 106 can be used for various task computing purposes, and herein are referred to as STEER-WS API 120 when used in the STEER-WS TCS 118*a*, PIPE-WS API 122 when used in one or more PIPE-WS TCSs 118*b*, and Sphere of Management (SoM)-WS API 123 when used to provide a "Sphere" for cross-environment task computing (as discussed in more detail below). According to the embodiments of the present invention, herein will be described the following:

Herein will be described in more detail various Web Services Task Computing Client (WS TCC) 119*a* embodiments, such as Semantic Task Execution EditoR-Web Services (STEER-WS TCC) 119*a*, which is based upon the STEER-WS API 120 and is software to discover and compose into executable tasks the semantically described services 116. A STEER-WS TCC 119*a* as a presentation layer 104 component of a WS TCS 118 provides a variety of computer implemented user interfaces. Therefore, herein will be described a computer displayed graphical user interface referred to as STEER-WS-Extended (XT) TCC 119*a*-1, a computer displayed graphical user interface embodied in a radio device, such a mobile phone, and referred to as Mobile-PhoneSTEER-WS TCC 119*a*-2, a STEER-WS-Spatial Information System (SIS) TCC 119*a*-3, a VoiceSTEER-WS TCC 119*a*-4, and a Tasklet-WS TCC 119*a*-5.

Also herein will be described application clients 119 based upon PIPE-WS API 122, which are Semantically Described Service Control Mechanism (SDSCM) 119*b* to manage services 112, such as create, remove, modify services 112. In particular, herein will be described a "Service Manager" 119*b*-2, "Real-world object semanticizer 119*b*-3, a database semanticizer 119*b*-4, and a media publisher 119*b*-5.

Also herein will be described, a concept of "sphere of management" for cross-environment service 112 discovery and execution.

Also herein will be described, an expanded usage (advanced behaviors) of Semantic Service Descriptions (SSD) 116, such as communication language accommodation (e.g., spoken language internationalization) and new parameters. A SSD 116 is a vehicle to communicate parameters of the service 115 from the service 115 itself to WS TCCs 119. More particularly, new kinds of parameters to enhance the Task Computing 100 environment are implemented, comprising a Relaxed Type for service 112 input, locations of services 112, multi-language services 112, and service 112 management functions.

Also herein will be described access control to services 112.

Also herein will be described Task Computing Client 119 internal services, such as Instance Creator, Instance Copier, Instance Interceptor, Instance Saver and Property Chooser.

Also herein will be described new services 112 are designed and implemented, which include: (1) semantic instance serializing services, (2) information providing services, (3) time/temperature services, (4) snapshot services, (5) OWL formatter service, and (6) text formatter service.

Figure 1B:
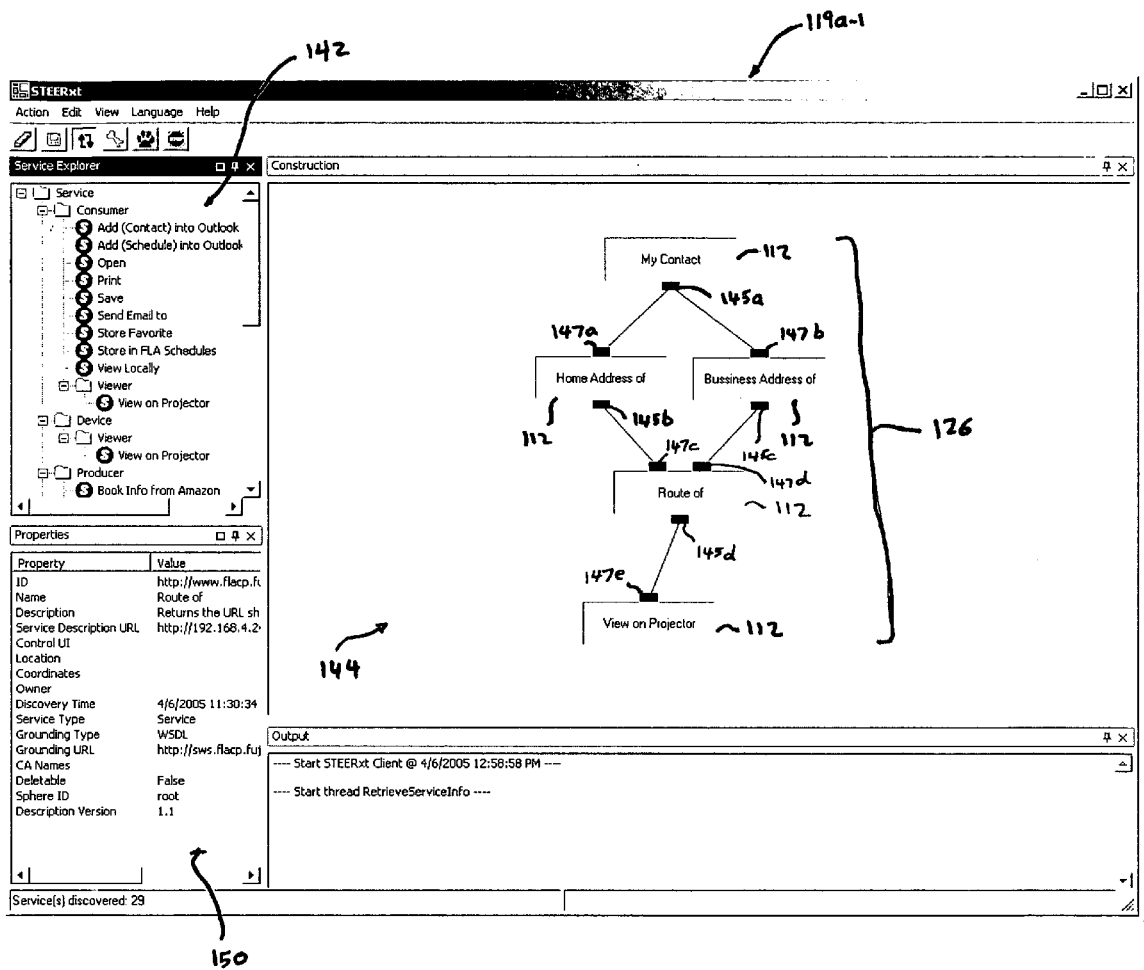
FIG. 1B, is an image of a computer displayed graphical user interface as a computer implemented task interface at the presentation layer, according to an embodiment of the present invention.

User Interface—STEER-WS-XT TCC 119*a*-1:

FIG. 1B, is an image of a computer displayed graphical user interface as a computer implemented task interface by STEER-WS-XT TCC 119*a*-1 at the presentation layer 104, according to an embodiment of the present invention. In FIG. 1B, a computer displayed graphical user interface window 142 is a discovered service 112 window (or discovery pane) 142 that displays according to an icon tree structure discovered services 112. According to an aspect of the embodiments described herein the services 112 are organized in the discovered service window 142 according to any type of hierarchical category of services 112 based upon ontology and/or other categorizations, such as (without limitation) friendly names, type of service, alphabetical order, etc. A computer displayed graphical user interface window 144 is a task window (or task 126 construction pane) 144, which is a directed service 112 graph accommodating a non-linear composition of services 112 for multiple inputs/outputs. In FIG. 1B, the task 126 window 144 displays in an unlimiting example a task 126 that comprises five services 112. In particular, the task 126 is "view on my projector 112*a* route of 112 of home address 112 and business address 112 from my contact 112."

In FIG. 1B, according to an aspect of the embodiments described herein an SSD 116 window 150 displays SSD 116 parameters/properties for a selected service 112 in the service window 122. The SSD window 135 can be useful, for example, in testing a task 126 as part of composing a task 126.

In FIG. 1B, the task window 144 provides selectable graphical displays of services 112 that have been selected in the discovered services window 142. In the task window 144, upon selection of a discovered service 112, compatible services according to service's functional characteristic based upon ontology are automatically identified, and a graphical display of the service 112 also automatically comprises one or more selectable functional characteristic buttons 145*a-n* representing available or valid (compatible) services 112 for the selected discovered service. Selection of a functional characteristic button displays a selectable list of other discovered services 112 that can consume produce of a preceding service 112, whereby composition of one or more services 112 together, as indicated by displayed lines connecting the graphical displays of services 112, creates a task 126. More particularly, in the task window 142, a user composes a directed service 112 graph as a task 126. In case of using input/output data object type of a service 112 as functional characteristics of the service 112, an output functional characteristic button 145*a* is differentiated from an input functional characteristic button 147*a* by color or any other known computer display differentiation methods.

Other STEER-WS TCC 119*a* computer implemented user interfaces of Mobile-PhoneSTEER-WS TCC 119*a*-2, STEER-WS-SIS TCC 119*a*-3, VoiceSTEER-WS TCC 119*a*-4, and Tasklet-WS TCC 119*a*-5 will be described in more detail further below.

With reference to FIGS. 1A and 1B, Task Computing 100 system has an architecture that provides a foundation for finding the services available in the current environment, constructing and manipulating a user-centric task view of the available services, and executing the resulting tasks composed of multiple services. It even lets the end-users dynamically and easily create new services as necessary. Three characteristics/elements of Task Computing 100 system are as follows:

(1) Uniform abstraction of all functionality 114, 115 as services 112. As discussed herein, in Task Computing 100, the middleware server processing layer 108 serves to abstract all resources as semantically described services 112. A semantically described service is a service function 115 available through remote procedure calls, such as (without limitation) WSDL (Web Service Description Language), a UPnP (Universal Plug and Play), CORBA, RMI, RPC, DCE, DCOM service functions 115) for which a semantic description (a file) 116 in a language intended for describing services (for example OWL-S) has been specified. When specifying such semantic descriptions 116, a specified ontology is specified for the domain that the service 116, 115 (112) act upon.

Regarding ontologies, software tools can be used to create ontologies and whenever possible existing or available ontologies can be used. The OWL-S service descriptions 116 express a functional characteristic of a service function 115 being semanticized, for example, the input and output, as semantic objects, and the owner, creator, location, etc. of the service 112. The description also includes grounding information so that the actual WSDL and/or UPnP service can be properly executed. In providing these descriptions semanticizer tools, such as (without limitation) real-world object semanticizer 119b-4, database semanticizer 119b-5, internal service instance creator, etc. described and/or referred herein, have been used for mapping ontology objects to WSDL parameters and creating any necessary grounding (grounding is expressed through XSLT scripts). Web Service interfaces 106 have been provided for the middleware server processing layer 108 based upon which an intuitive task 126 user interface at the presentation client processing layer 104 is provided.

The Task Computing middleware can also be viewed as a dynamic repository of semantic service descriptions. Apart from the APIs 106 for accessing and manipulating these descriptions, which are discussed herein, means is provided for querying this repository directly by implementing a API that will process any RDF Query Language (RDQL) query against the service descriptions (JENA 2.0 is used as an example for the processing of RDQL queries). For example the developer could filter the services presented to the user for task composition by some feature of the services, such as location, even though an explicit API for that purpose is not provided. This capability extends the power of the application developer and as certain queries become more useful they can be permanently added to the middleware as APIs 106 that execute pre-specified RDQL queries.

Abstraction of functionality as services 112 makes functionality universally accessible and allows the Task Computing infrastructure to interact with such functionality. A Task Computing 100 system transforms the functionality 114, 115 of the user's computing device (from applications and OS), of the devices in the environment, and of the available eservices on the Internet, into abstracted services 112. This abstraction paves the way for having fewer pre-arrangements to deal with the functionalities available in the environment, but by itself alone might not suffice to provide user real-time manipulation and composition of functionalities into tasks 126, so that the embodiments described herein also provide a presentation layer 104 to support real-time, dynamic management of a task 126 that comprise a plurality of services 112.

(2) Provide intuitive (to a user and/or a system) manipulation of abstracted services 112 based on semantic service descriptions (SSDs) 116. Intuitive manipulation of services 112 is made possible through the use of Semantic Service Descriptions (SSDs) 116; ontologies are the mechanism for achieving such a user and/or system intuitive manipulation. The concept of SSD 116 is described in related commonly assigned pending U.S. patent application Ser. No. 10/733, 328, entitled TASK COMPUTING, by Ryusuke Masuoka, Yannis Labrou, Zhexuan Song, filed Dec. 12, 2003 in the U.S. Patent and Trademark Office, owned by FUJITSU LIMITED assignee of the present Application, the entire contents of which are incorporated herein by reference.

If, for example, instead of SSD 116, only WSDL (Web Service Description Language) source of function 115 is used to describe the functional characteristics of a Web Service, the WSDL-described Web Services requires that programmers understand their semantics (beyond the WSDL descriptions) and develop the code to use the services in the right way. As a result, end-users' interaction with functionalities is limited by the scope of these programs in ways predefined by the developers. The additional semantics (supplied in an SSD 116) by mapping ontology objects to source of function 115 parameters, such as (without limitation) WSDL parameters, and creating any necessary grounding, allows the Task Computing 100 infrastructure to help users manipulate the services without this deep knowledge. For example, semantics can be used to constrain the manipulation of services by users, or to present the user possible tasks 126 in the current environment. If only WSDL is relied upon for a service composition based on semantic inputs and outputs of services, the composition would not be restricted to any compositions of a service that produces, for example, an XML Schema Definition (XSD) string with another one that consumes an XSD string, thus possibly leading to non executable (or invalid) service compositions. Therefore, according to the embodiments described herein, a "composition" refers to forming by putting together a plurality of services 112 according to provided functional characteristic(s) of services 112 as semantically described, such as (without limitation) semantic inputs and outputs of a service 112, for example, data object type for input (consumption)/output (production) of the service 112. An example of a functional characteristic of a service can be a precondition and an effect of the service 112 to determine service composability. An example of a precondition and an effect of a service 112 can be input and output data object types for a service 112. In particular, the SSDs 116 of services 112 provide finer granularity of the services inputs and outputs, so that, for example, a service that generates an "Address" semantic object will only be composable with semantically compatible services.

Another mechanism of providing user intuitive manipulation of services 112 is by giving appropriate service names according to a natural language, such as a "Route from My Home to" service name, the composed service names of compatible services can serve as a natural language task 126 representation(s) (for example, "View on Projector" 112+ "My File", 112 "Route from Company-1 to" 112 "A City Name Airport" 112). Ontologies can also support mechanisms, such as compositions based on subclass-super-class relationships, and semantic object translations that are very natural for end-users. Therefore, composition of a task 126 is based upon a natural language sentence, or in other words a composed task 126 reads like a natural language sentence. More particularly, the embodiments described herein provide assigning a name to the service as an element (e.g., a phrase) of a natural language sentence to support composability of the services to map into composability of natural language elements as a natural language sentence. Therefore, Task Computing 100 system allows very rich and interesting ways for the end-users to interact with the services of the environment 110.

(3) A user can guide a real-time and/or dynamic (late binding type) composition of a task 126 via a computer implement user interface based upon (1) and (2), for example, as shown in FIG. 1B.

TCE Web Service Application Programming Interface (TCE-WS API) 106:

FIG. 2 is a list of example definitions of the STEER-WS API 120, according to an embodiment of the present invention. In FIGS. 1A and 1B, STEER-WS TCC 119a is a WS TCC 119 that provides a convenient user interface to discover and filter services 112, compose, execute and save the services 112 as tasks 126. The STEER-WS API 120, which is a TCE-WS API 106, extracts Task Computing functionalities into independent modules and exposes them as standard Web service interfaces accessible by any WS TCC 119, such as for example the STEER-WS TCC 119a.

As shown in FIG. 2, by exposing the functionalities of Task Computing middleware server processing layer 108 by Web services 106, a WS TCC 119 at the presentation processing layer 104 can be freed from the implementation of the modules of the Task Computing middleware server processing layer 108. A WS TCC 119 developer can use any programming language on any operating system as long as Web Service 106 calls can be made, thereby providing a WS TCC 119. Even third party applications (MICROSOFT WORD, EXCEL, OUTLOOK, ADOBE ACROBAT, etc.) that can make Web Service calls (or can incorporate Web services invocation capability) could be a potential WS TCC 119.

In FIG. 2, functionalities, such as discovery, composition, execution, monitoring, save and so on are supported in STEER-WS API 120. Generally, the TCE-WS API 106, such as STEER-WS API 120 and PIPE-WS API 122 (described in more detail below with reference to FIGS. 5A-B, rely on a Service 112 identifier (SID) parameter which is something that uniquely identifies a semantically described service function 115 described in an SSD 116. Typically, according to the embodiments described herein, SID is a string of a Uniform Resource Locator (URL) to the semantically described service function 115 described in the SSD 116. For example, FIG. 3A shows an example computer source code 300 that uses STEER-WS API 120 to synchronize the local knowledge about discovered services 112. FIG. 3B shows another example computer source code 310 of using STEER-WS API 120 to invoke tasks 126 with multiple services 112. In an unlimiting example, in FIG. 3B, ServiceList parameter is the input string that, for example, uses "&" to delimit multiple tasks and uses "|" to delimit service 112 identifiers within a task, and a WS TCC 119 can have the program loop of FIG. 3B in its own code to invoke and monitor a task execution. Therefore, in the present invention, the source codes, such as FIGS. 3A-3B, which utilize TCE WS API 106 to invoke remote procedures in the middleware server processing layer 108, are embodiment implementations of WS TCCs 119, such as STEER-WS TCC 119a.

Figure 4:
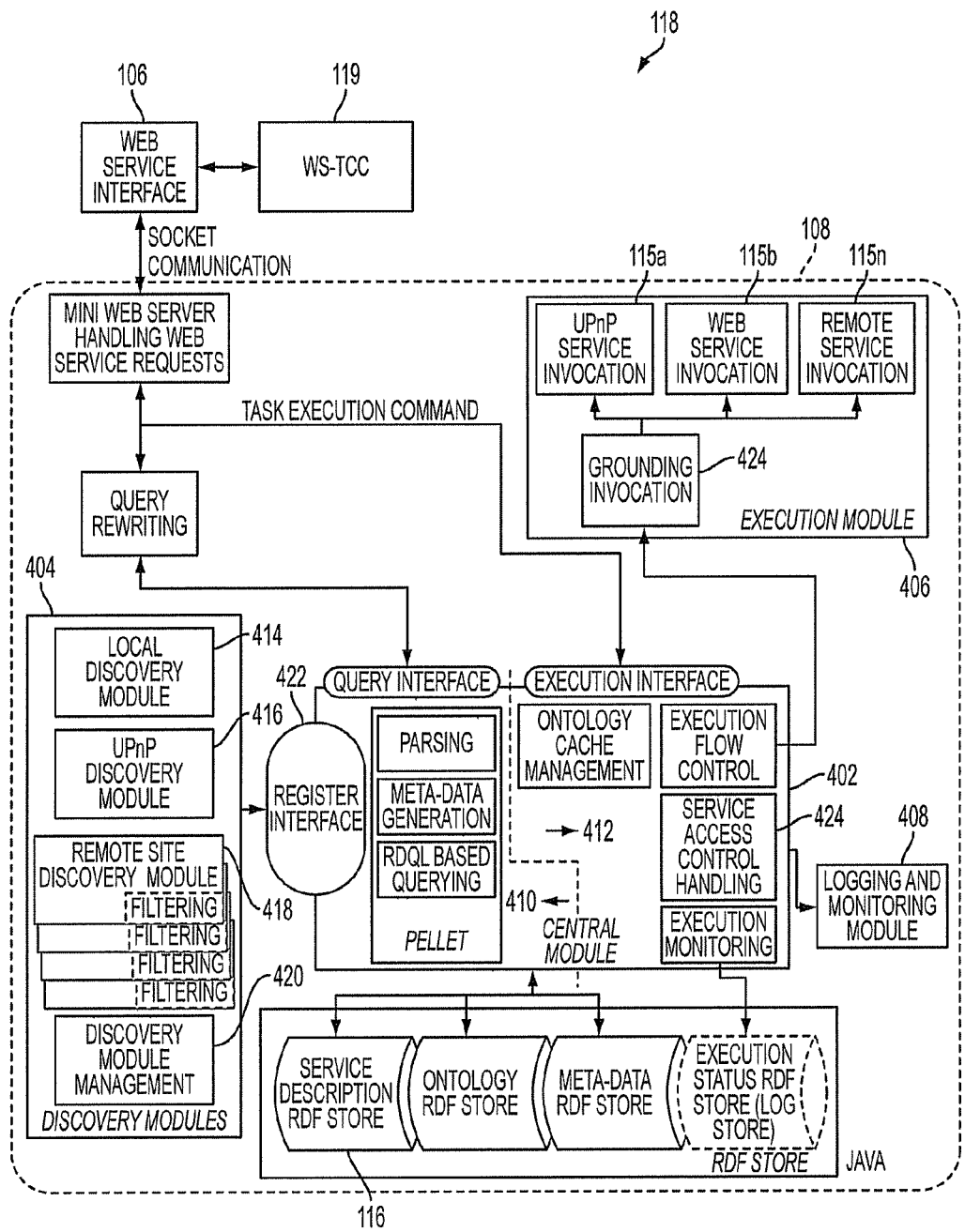
FIG. 4 is a functional block diagram of middleware processing layer 108 program modules, according to an embodiment of the present invention.

FIG. 4 is a functional block diagram of middleware server processing layer 108 program modules of STEER-WS TCC 119a, according to an embodiment of the present invention. As shown in FIGS. 1 and 4, the middleware processing layer 108 of the STEER-WS TCC 119a comprises a central module 402 that controls, according to Web services 106 requests via the STEER-WS API 120 from the presentation processing layer 104, service 112 discovery modules 404, execution modules 406, and monitoring modules 408. The central module 402 comprises service 112 parsing and indexing modules 410 and service 112 composition and task 126 execution planning 412. The service 112 parsing and indexing modules 410 provides a registering interface 422, which allows discovery modules 404 to register/unregister discovered services 112. Discovery modules 404 comprises a set of individual discovery modules, such as local discovery module 414, any third party service function 115 discovery module 416, such as UPnP, remote site discovery modules 418, and a discovery module management 420 that has a management function of determining whether each discovery module should be used or not in a different environment 110.

According to an aspect of the embodiments described herein, the service discovery modules 404 discover service functions 115 according to any service function 115 discovery mechanism via the third-party discovery module 416 or remote site discovery module using a remote third-party discovery module 418n. The third party discovery mechanisms 416 can be, for example, as Universal Plug and Play (UPNP) technology, JINI technology, BLUETOOTH, etc., or any combination thereof. For example, a CYBERLINK UPNP and/or INTEL UPNP TOOLKIT implementation can be used in third-party discovery module 416 to discovery service descriptions broadcast within the sub-network by UPnP. Also, the service discovery modules 401 can discover Semantic Service Descriptions (SSDs) 116 via local discovery module 414 and remote site discovery module 418.

According to an aspect of the embodiments described herein, JENA, by HEWLETT-PACKARD DEVELOPMENT COMPANY, is used to store SSDs 116. The parsing and indexing modules 410 comprise parsing and analysis functions to parse and analyze SSDs 116. For example, according to an aspect of the embodiments described herein, an SSD 116 is parsed using JENA, by HEWLETT-PACKARD DEVELOPMENT COMPANY, with support of PELLET and OWL-S API by MINDLAB, UNIVERSITY OF MARYLAND, USA. In particular, "a service 112 is discovered" is equivalent to "the SSD 116 of a service 112 is found." A SSD 116, which is discoverable by one of the service discovery modules 404, is sent to the central module 402, through the register interface 422, where the SSD 116 is first parsed, for example, by JENA with PELLET support. Once the SSD is parsed, PELLET is ready to answer RDQL queries. By asking queries from the service 112 parsing and indexing module 410 and based upon the query results, the service 112 composition and task 126 execution planning module 412 completes a service 112 composition(s) as a task 126, and determines the execution plan for the task 126 in response to a task 126 execution command from a TCC 119. Once an execution plan is determined, the central module 402 invokes a related service function(s) 115, via the execution modules 406 that comprises a grounding invocation 424 provided in the SSD 116 to invoke a service function 115. The discovery modules 404 discover services 112 that can comprise service functions 115 and Semantic Service Descriptions (SSDs) 116. The above description of the service 112 parsing and indexing 410 are not limited to such a configuration and any mechanism to parse and analyze SSDs 116 can be used other than JENA and PELLET.

According to an aspect of the embodiments described herein, as an independent module, a WS TCC 119 can use any kinds of underlying service 112 discovery mechanisms 404 or execution mechanisms 406 as long as a unified and high-level abstracted discovery and execution mechanisms are implemented according to a Web services API(s) 106, for example, by implementing a Web Service interface 106 for underlying BLUETOOTH SDP, IR, RENDEZVOUS, JINI, etc. 404, 406. Therefore, for example, the only thing a user needs to specify is the Uniform Resource Locator (URL) of the Web Service Definition Language (WSDL) files for STEER-WS API 120 to interface with the service layer 112 (e.g., discovered services 115, 116). As along as the Web Service API 106 is provided, the whole underling discovery procedure by the TCE-WS API 106 is transparent to the user at the WS TCC 119 in presentation processing layer 104. For example, one of STEER-WS API 120a can be using BLUETOOTH discovery modules 404 to find and execute BLUETOOTH based services 112. Another STEER-WS API 120n can be using UPnP discovery modules 404.

In FIG. 1A, PIPE-WS TCS 118b is another example of a WS TCS 118 to publish and manage semantic object instances. The PIPE-WS API 122 extracts Task Computing management functionalities 124 into independent modules and exposes them as standard Web Service interfaces 106 accessible by any WS TCC 119, such as "White Hole" 119b-

1, "Service Manager" 119b-2, "Real-world object semanticizer" 119b-3, and "Database semanticizer" 119b-4. More particularly, PIPE-WS API 122 provides a Web services interface 106 for PIPE-WS TCSs 118b to manage services 112, such as publishing operating system or application objects, device services, etc.

FIGS. 5A-5B is a list of example definitions of the PIPE-WS API 122, according to an embodiment of the present invention. The PIPE-WS API 122 enable easy creation of Task Computing services 112. For example, as shown in FIG. 5A, by calling one of "Insert" Web services 122 with the parameter, data, set to an OWL object, a PIPE-WS TCS 118b can create a service 112 according to the given OWL object with given properties. By calling one of "Insert" Web services 122 with the parameter, data, set to an OWL-S for a Web Service in a string, one can make a Web Service available as a Task Computing service 112 with given properties. By calling "Remove" Web services 122, one can make the Task Computing service 112 unavailable immediately.

Cross-Environment Discovery and Execution:

According to an aspect of the embodiments described herein, with the support of Web Service interfaces 106, Task Computing middleware server processing layer 108a can incorporate a new concept of "sphere of management" for cross-environment discovery and execution mechanisms by accessing other Task Computing middleware server processing layer 108n modules through Web services. A set of TCE-WS APIs 106 for cross-environment discovery and execution, for example, a subset of STEER-WS API 120 and PIPE-WS API 122, is herein referred to as "Sphere of Management (SoM)-WS APIs" 123. Therefore, SoM-WS API 123 is used to manage (provide) remote services 112. "Cross-environment" herein generally refers to taking into consideration a computer system network characteristic where a plurality of sub-networks 110a-n as different or other network environments (e.g., private networks, virtual private networks, subnets, intranets, etc.) are in communication with each other based upon known techniques and each computer network environment might comprise computer network services or sources of functions 110 (i.e., function source realization layer 114 and service layer 112), which should discoverable and executable as part of Task Computing Environment 100.

According to an aspect of the embodiments described herein, the following STEER-WS API 120 (FIG. 2) are used as SoM-WS API 123.
  checkExecutionStatus
  executeService
  filterServiceByProperties
  findAllServices
  getServiceDescription
  queryByRDQL According to the embodiments described herein, to realize a "Sphere," the SoM-WS API 123n middleware server processing programs 108n execute (are installed) on another remote computer system 110n. A middleware server processing programs 108a instance can internally access other "Sphere" middleware server processing layers 108n instances via TCE-WS API 106n (i.e., remote "Sphere" API 123n) instances or whatever implements a remote API to incorporate services 112 running in different networks, different platforms and/or different technologies (BLUETOOTH for example), discover the services 112 and execute the services 112 as tasks 126.

Therefore, a "Sphere" is realized by a set of remote APIs, such as SoM-WS API 123 that provides a consistent view for Cross-environment Service 112 Discovery, Publishing, Execution and Management. The concept of "Sphere" is extended to a "Filtered Sphere." A "Filtered Sphere" is a pair of Cross-environment service 112 discovery SoM WS API 123 and a service 112 filter. A WS TCC 119 applies a filter when it adds a link to a remote sphere API 123 with (or without) a friendly "Sphere" name and calls it a "Filtered Sphere." In general, a filtered SoM-WS API 123 provides an optional string as a friendly "Sphere" name, and requires a URL to the service 112 discovery SoM-WS API 123, which are according to WSDL and a (partial) query (e.g., a string) according to RDF Data Query Language (RDQL), which is a query language for RDF (or any other query language can be used as the filter). A query is based upon service 112 property (ies) in an SSD 116 of the service 112.

For example:
  ("My Services at Company-1", "http://www.company-1.com/steerws/service.asmx?wsdl", "owner eq 'Bob Smith'")
  ("Company-1 Conf Room Services", "http://www.company-1.com/steerws/service.asmx?wsdl", "location eq 'Conference Room'")

In the forgoing two examples, the "owner eq 'Bob Smith'" and "location eq 'Conference Room'" are examples of RDQL query as service 112 filters. In the first case "My Services at Company-1" are filtered according to those services 112 in which the service 112 property "owner" is equal (or owned) by "Bob Smith." In particular, a query(s) is according to a value(s) of a service parameter(s). In this case, a query determines if "Bob Smith" is equal to a value of a service property "owner." When STEER-WS TCC 119a uses a filter to find the services 112 from the STEER-WS API 120, only those services 112 that match the filter are shown under the category defined by the friendly service name. The filter does not have to be a complete RDQL query as long as the STEER-WS API 120 can understand it. Therefore, when the concept of filtering services 112 is applied to a "Sphere," a "Filtered Sphere" or "Virtual Sphere" can be realized as only filtered services 112 in a remote computer system 110 are provided. In other words, specifying a query in a service 112 discovery, realizes a user's "Virtual Sphere" or "Sub-Sphere."

Therefore, according to the embodiments described herein, a single "sphere" can provide multiple "filtered spheres." As long as the filters are different, the sets of services 112 found for different "filtered spheres" are perceived independently by the WS TCC 119 user. The filtering mechanisms are applicable not only to the service 112 discovery mechanism on remote spheres 123 API, but to the local and pervasive (e.g., UPnP) service 112 discovery mechanisms as well.

Figure 6:
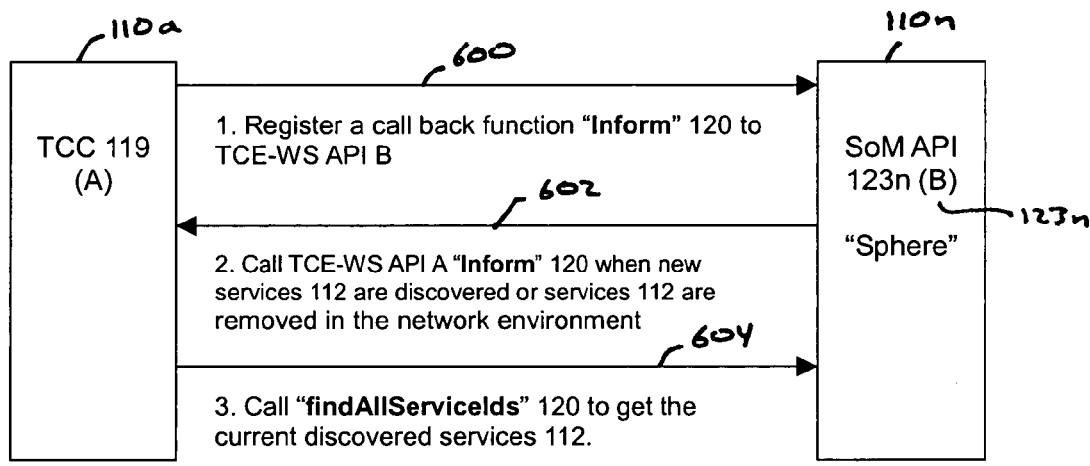
FIG. 6 is a flow chart of call-back based cross-environment service directory, according to an embodiment of the present invention.

FIG. 6 is a flow chart of call-back based cross-environment service directory, according to an embodiment of the present invention. The method discussed in FIG. 3A is a poll based solution for service 115, 116 (112) discovery. To implement Cross-Environment Task Computing, another method of cross-environment service 112 discovery and execution is described herein with reference to FIG. 6. According to FIG. 6, a call-back based solution for cross-environment service directory comprises: first, add to/provide in STEER-WS API 120 a new Web services interface called "Inform (string message)" 120. At operation 600, to discover services 112 within another computing environment 110, a WS TCC 119 (A), via TCE WS API 106a, such as STEER-WS API 120a, registers itself via the "Inform" STEER-WS 120a to another remote TCE WS API 106n herein referred to as SoM WS API 123n (B) in that other computer environment 110n. As discussed above, the SoM WS API 123n, which executes in a remote or other computer environment 110n, realizes a "Sphere." When, at operation 602, B later discovers new services 112 (or that some of the services 112 are removed), it uses A's "Inform" Web Service interface 106a to let A know of the changes. Either the message at operation 602 contains the identifications of newly discovered services 112 or A, at operation 604, could use "findAllServiceIds" Web services 120 to retrieve the latest information. The benefits of call-back based solution are: (1) efficiency, because A does not have to poll B again and again, and (2) it supports prompt discovery. Also, in a poll based solution, if B has any changes, A cannot find it until the next poll, whereas in the call-back based solution, A will find it almost immediately. However, the call-back based solution might have a drawback if A is behind a firewall, because the Web services 106a of A is inaccessible from B, so that the call-back based solution might not work. Therefore, a poll based solution has a benefit of working in cross computing environments 110 when firewalls have been implemented. Also a poll based solution has a benefit of requiring a one way connection.

In FIG. 3B, the execution sample source code can be used for cross-environment task 126 execution. To make the procedure transparent to a user, when parsing the semantic service description (SSD) 116 of a cross-environment service 115, the grounding part of the SSD 116 can be rewritten to point to the TCE Web Services API (TCE-WS API) 106 of other cross-environments 110, or alternatively, the other cross-environment end, which implements TCE-WS API 106, can rewrite the SSD 116 (i.e., rewrite OWL-S) to provide the SSD 116 through its TCE-WS API 106 in a way that execution goes through specific Web services 106.

Figure 7:
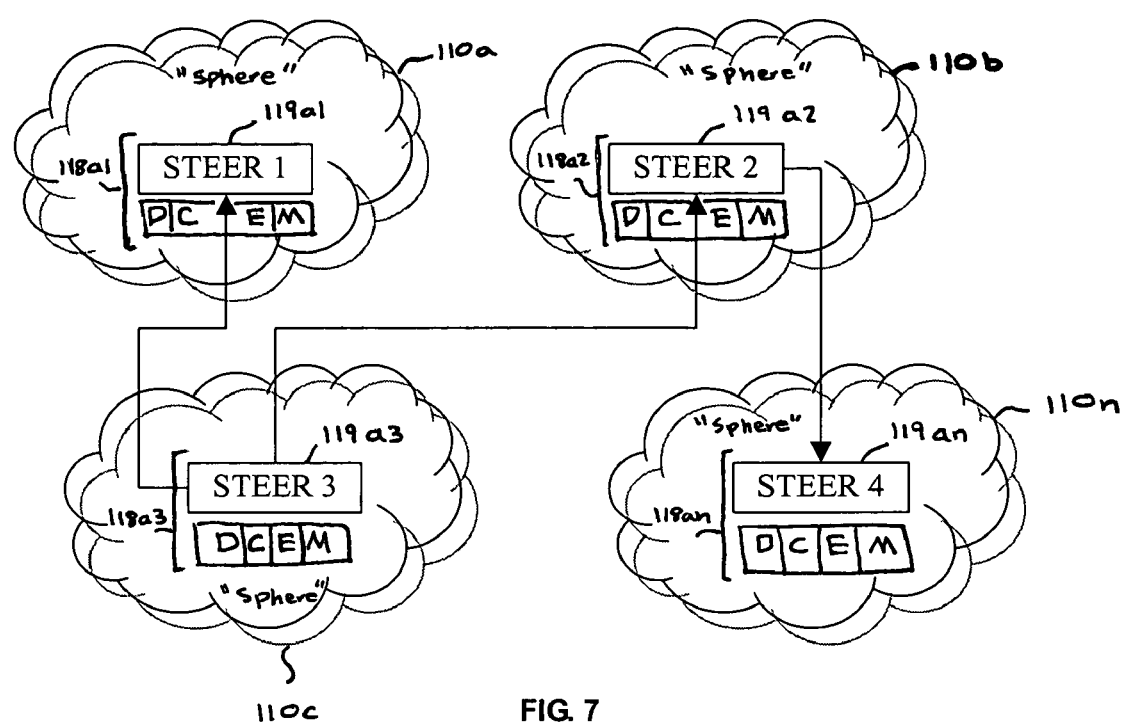
FIG. 7 is a network diagram of cross-environment service directory and execution, according to an embodiment of the present invention.

FIG. 7 is a network diagram of cross-environment service directory and execution, according to an embodiment of the present invention. In FIG. 7, each WS TCC 118 (e.g., STEER-WS TCC 1-4) has its own discovery range within a sub-network 110 where services or sources of functions 112 exist. Typically in the present invention, the service 112 discovery range is limited by the underlying technologies used in service 112 discovery. For instance, if UPnP is used to discover pervasive services 112, UPnP cannot find services 112 that are not in, or are outside, the same sub-network 110.

Therefore, based on the STEER-WS API 120 and PIPE-WS API 122 technologies, a cross-environment service 112 discovery, publishing, execution and management is described herein. As shown in FIG. 7, multiple WS TCCs 119, such as STEER-WS TCC 119a, run/execute in different network environments 110. Within its own range 110a, a STEER-WS TCC 119a can find a set of services 112. Then by using STEER-WS TCC 119a Web services 120, a STEER-WS TCC 119a can communicate/interface with Web Service instances 120 of other STEER-WS TCC 119n and get their service 112 discovery results.

In FIG. 7, as an example, there are four STEER-WS TCC 119a1-n referred to as STEER Clients 1 through 4. Each has its own discovery range 110a which is depicted as a cloud. Each STEER-WS TCC 119a has a Web services API 120. To discover a service 115, 116 (112) outside its range 110n, the Web services 120 of each of the other WS TCCs 119a1-n are called (e.g., Web services 120 of STEER-WS TCC 119a2 are called). For example, in FIG. 7, STEER Client 3 calls the "findAllServiceIds" Web Service 120 (FIG. 2) of STEER Client 1 to retrieve all services that are discovered by STEER 1. Once the service id list is retrieved, STEER Client 3 uses "findServiceProperty" Web Service 120 (FIG. 2) to retrieve the semantic service description 116 of services 115 and registers them in its own engine. During the registration, a new service 112 identification is created. The identification indicates that the service 112 is a remote service 112 (remote service identifier), and from where it is initially discovered. Now STEER Client 3 can use the services 115, 116 (112) as if they are in its own discovery range 110a.

To invoke a remote service 112, a STEER-WS TCC 119 will use the Web Service interface 120 of other STEER-WS TCCs 119 too. In the above FIG. 7 example, STEER Client 3 will encode the input of the service 115 (if there is an input) and send the request to STEER Client 1. As the result, STEER Client 3 will receive a reference identifier about the request. Next, STEER Client 3 will poll STEER Client 1 about the execution status by using the reference identifier. There are four possibilities:
  1. If the execution is complete, the (DONE) message will be returned. Then STEER Client 3 can use another Web Service interface 120 to retrieve the output by providing the reference id.
  2. If the execution is failed, the (ERROR) message will be returned.
  3. If the execution is still undergoing, no message will be returned. Then STEER 3 will wait for a while and poll again.
  4. If the service 115, 116 has a service control user interface (UI) and requires more input from user, the URL of the service control UI will be returned. Then STEER Client 3 will show the URL to the user. Meanwhile, STEER Client 3 will wait for a while and poll again.

According to an aspect of the embodiment described herein, the cross-environment service discovery and execution can be deployed as a hierarchical structure or in any other configuration. For example, in FIG. 7, STEER Client 2 uses the Web Service interface 120 to discover and execute the services 115, 116 (112) of STEER Client 4. When STEER Client 3 communicates with STEER Client 2, it gets not only the services 112 that are initially discovered by STEER Client 2, but the services 112 from STEER Client 4 as well. STEER Client 3 does not know the difference between them. It simply thinks that the services 112 are all from STEER Client 2. To invoke a service 112, it will send the request to STEER Client 2 Web Service interface 120. Once STEER Client 2 receives the request, it will check its own middleware processing engine 108 and find out that the service 112 is actually from STEER Client 4. Then STEER Client 2 will relay the request to STEER Client 4. Once STEER Client 2 is polled by STEER Client 3, it will poll STEER Client 4 and send whatever it gets to STEER Client 3.

In FIG. 7, each instance of a Task Computing System 118-1-n (TSC 1-4, in this case STEER-WS TCS 118a1-n), can typically discover (and execute) those services that run on the same machine or system 110 that the Task Computing middleware 108 is running (i.e., local to that device), generally available services on the Internet and devices and services in the same subnet. Consider a situation where Alice, who is visiting Bob, wants to show the map from Bob's home to Carol's place on Bob' TV. In this case, Carol's contact information is available in Alice's PIM, accessible through Alice's TCS 118-1 (at Alice's home), however, the display service is in Bob's apartment 9 TCS 118-n. This scenario is referred to as extending the range of a task 126 or extending the range of Task Computing 100, so that it can discover and execute services 112 in another Task Computing Environment. In addition, services associated with each respective TCS 118 might run behind a firewall, which further complicates the matter. Web Service interfaces of the middleware layer 108 is instrumental in engineering a solution to extending the range of Task Computing 100 system.

With reference to FIG. 7, a more detailed explanation is described, which is referred to as Sphere of Management or SoM. In FIG. 7 four TCS 118, 110 nodes, each with its own discovery range that is depicted as a cloud, and its middleware layer 108 that includes four programmable modules or units (discovery 404, central 402, execution 406 and management 124) represented by D, C, E, M. A middleware layer 108 that is considered remote with respect to a computing environment 110 is referred to SoM API 123 to realize a "Sphere." If one node 118 wants to discover a service outside its range, it must first know which TCS the service 112 resides at and the WSDL of the Web Service 106 (123) exposed by that other node 118. This information can be exchanged, for example, online or by e-mail between the TCS 118 human operators; another option would be to run a directory where human owners of TCSs 118 can publish their TCSs.

Then, the discovery web services can be invoked, in the same manner that a client local to the remote TCS 118 would invoke them, in order to get the list of services in that node and the SSD 116 of each service 112 in the remote node TCS 118. For example, TCS 3 calls the Web Service 106 of TCS 1 to retrieve all services that may be discovered by TCS 1 and then register them in its own discovery module(s) 404. These services are treated by TCS 3 just as other services that are directly discovered by TCS 3, but the discovery module of TCS 3 adds a flag to its internal representation of these services to indicate where the services were initially discovered. After the initial discovery, TCS 3, may poll TCS 1 to check on changes of the list of TCS 1 services.

Execution is also supported through the Web Service API's 106. A user from TCS 3 can create a new task with services from both TCS 1 and TCS 3 and execute it. Services that are initially discovered by TCS 3 do not require any special treatment. However, services in TCS 1 might require an extra operation because they might be behind a Firewall and TCS 3 can not directly invoke them. In this case, TCS 3 gets help from TCS 1 in execution. First TCS 3 will send an execution request about a specific service to TCS 1 along with the context (input parameters, etc.) through the Web Service APIs 106, and get a reference id as a response. During the time that TCS 1 is executing the service, TCS 3 will use that reference id to poll TCS 1 about the status. Finally, after the execution in TCS 1 is complete, the updated context (output, etc.) is returned as the last polling result. The rationale for this design is that during polling, TCS 1 may return something back (such as the current execution status, or extra information regarding execution, etc.) and through polling, it is easier for TCS 3 to monitor the status.

Once a TCS 118, 110 node is exposed to external users, anyone can discover and execute its services (they are web services after all). A security technique would be to add a user identification mechanism in our Web Service API, and/or to build on top of Web Services security standards as discussed in more detail further below.

Sphere of Management extends beyond just two TCSs 118. In FIG. 7, TCS 2 uses the Web Service interface 106 to discover and execute the services of TCS 4. When TCS 3 communicates with TCS 2, it receives not only the services that are initially discovered by TCS 2, but the services from TCS 4 as well. To invoke a service from TCS 4, TCS 3 sends the request to TCS 2. Once TCS 2 receives the request, it checks its own engine and upon determining that the service is actually from TCS 4 it will relay the request to TCS 4. Once TCS 2 is polled by TCS 3, it will poll TCS 4 and will forward the response to TCS 3.

Service 112 discovery is referred to as the process of finding services 112 through the SSDs 116 of the services 112, as related to a user's context. As discussed above, given the separation of service implementation 115 and SSD 116, discovery is reduced to the acquisition and processing of the SSDs of service functions 115 by a TCS 118. The implementation of service discovery relies on one or more discovery mechanisms; a TCS 118 comprising the middleware processing layer 108 can exploit multiple underlying service discovery mechanisms and a service might be discoverable through multiple discovery mechanisms. Users, or the services (or their providers) may set the discovery mechanism employed for the discovery of a particular service. Changing the discovery mechanism for a service, may affect who can discover a service. Although service discovery mechanisms are orthogonal to discovery ranges, some discovery mechanisms are more suited for a specific discovery range than others (see Table 1). Next each discovery range will be described.

TABLE 1

| Discovery Range | Example Discovery Mechanism |
| --- | --- |
| 1. Empty | N/A |
| 2. Private | File system based discovery |
| 3. Group by Subnet | Multi-cast based discovery |
| 4. Group by Interest | Community directory, publish/subscribe (company, community) |
| 5. Public | Open semantic service directory |

1. Empty Services in empty discovery range are those that cannot be discovered by anyone. Empty is not an entirely conceptual range; any service that is made unavailable (even for its owner) may assume this range. For example, a user does not want the service providing her contact information discovered by others due to privacy considerations, or even by herself because it is annoying to always discover a service that she does not intend to use, may choose the empty range for this service. When, later, she wants to use her contact for displaying on a kiosk the route from the airport she is at to her home, she may move the service into the private discovery range.

2. Private Services in the private discovery range are discoverable only by their owner and typically reside on the user's own computing device which runs the TCS 118. For example, the local resource handling services such as "My File" 112, which lets the user select and expose a file on her device, assumes (by default) this discovery range. Here, the TCS 118 uses a file system-based discovery mechanism combined with notifications using sockets to implement this discovery range.

3. Group by Subnet discovery range is most closely related to ubiquitous environments, because of its ad-hoc and spontaneous nature of grouping. Services that happen to be on the same subnet of the user, such as a part of a company Intranet or a home network, will be discovered, enabling a very localized discovery mechanism. For example, UPnP can be used as the discovery mechanism to implement this range. Specifically, UPnP's discovery mechanism is used to find the UPnP devices on the subnet (not all of which are Task Computing-enabled services) and for each UPnP device, the TCS 118 invokes one specific UPnP action (getDescriptionURL) to determine if the UPnP device represents a Task Computing-enabled service 112 and if so, the TCS 118 proceeds to download the SSD 116 from the UPnP device. Other discovery mechanisms such as JINI can also be used in the same way as UPnP to implement this discovery range.

4. Group by Interest discovery range refers to services discovered by any arbitrary group of people, perhaps bound by similar interests or group membership, such as the group of employees of a company or the members of a golf club. This discovery mechanism can be provided by combining web services with callbacks and polling mechanisms.

5. Public Services in this discovery range can be discovered by anyone. A good discovery mechanism for this range is an open semantic service directory; examples include Web pages with links to SSDs 116 of publicly available services or a search engine for semantic web services like Universal Description, Discovery and Integration (UDDI) (a semantic service search engine version). Alternatively, users can share the SSDs 116 by emailing them to each other, or by sharing them over a peer-to-peer network.

According to an aspect of the embodiments described herein, a cross-environment PIPE-WS TCS 118b can also be provided for cross-environment management of services 112, thereby providing cross-environment application clients of Semantically Described Service Control Mechanism (SD-SCMs) 119b to manage tasks 126/services 112. For example, in case of a cross-environment "White Hole" Task Computing Client 119b-1, the White Hole 119b-1 stores the WSDL URLs of PIPE-WS APIs 122n that are not necessarily running on the same machine as the White Hole 119b-1. Once an object is dragged and dropped into the White Hole 119b-1, it sends publish requests (using one of "Insert" Web services 122 shown in FIG. 5A) to other PIPE-WS APIs 122 other than or along with the one on the same device. In this way, the semantic instance of a service object 115 can be created and published in other networks 110, thus "cross-environmentally." According to an aspect of the embodiments described herein, alternatively, the White Hole 119b-1 allows the user to select PIPE-WS APIs 122a-n to use (described in more detail further below). For example, a SDSCM 119b Task Computing Client, such as "White Hole" 119b-1, that uses the PIPE-WS 122a in a computer environment 110a, a service 112 in a remote environment 110n can be published as long as a Web Service call 122n can be made for the PIPE-WS 122n in the remote environment 110n.

A White Hole 119b-1, which is a user interface tool for publishing services using PIPE-WS API 122, can be extended to accommodate multiple PIPE-WS APIs 122 to deal with service 112 publishing in two or more cross-environments 110n. A White Hole 119b-1 can provide a startup dialog box or an option setting dialog box for a user to set the following White Hole 119b-1 parameters:

PIPE WS API 122 Functional Parameters:
1. Name (optional)
2. URL(s) of the target PIPE-WS API 122
3. Proxy URLs (to use for Web Service calls and control UIs) (optional)
4. Option for Use of object in Web Service call
White Hole 119b-1 GUI Setting Parameters:
1. Show GUI Option
2. Color of GUI
3. Icon Image for GUI
4. Grouped or independent GUI A single White Hole 119b-1 GUI can accommodate multiple PIPE-WS APIs 122a-n by showing a dialog box for the user to choose which PIPE-WS API 122 to use to publish as a service 112 a semantic object dropped into the White Hole 119b-1. Or provide multiple instances of White Hole 119b-1, each with a different color or image for each remote PIPE-WS API 122a-n, to make it easy for the user to differentiate and remember which icon corresponds to which PIPE-WS API 122. More particularly, White Hole 119b-1 user interface options accommodate visual and/or audible (as the case may be) differentiation among provided or available "Spheres."

Regarding cross-environment 110 service 112 management, the PIPE-WS API 122 is extended by adding new Web Service interfaces 122 for service 112 management. Therefore, a new Web Service Task Computing Client (WS TCC) application client 119 that uses PIPE-WS API 122, as a SDSCM 119b, called "Service Manager" 119b-2 is created. One main function of Service Manager 119b-2 is to use PIPE-WS APIs 122 to manage services 112 in a plurality of computer system environments 110. In an unlimiting example, the management actions of the Service Manager 119b-2 include: change service 115,116 (112) name and description, change service 112 expiration time, change service 112 discovery range, change "Sphere" of the services 112, change service 112 invocation limit, and so on. In particular, the Service Manager 119b-2 can be used to fulfill cross-environment service 112 management, as follows. Each PIPE-WS API 122 has an option to decide whether remote users can use it to manage its services 112. If the option is set to be a True value, a remote user can add the PIPE-WS API 122 in the user's Service Manager 119b-2. From the Service Manager 119b-2 tool, a user can check all details about the services 112 managed by the remote PIPE-WS API 122 and do basically all management actions remotely, as long as the PIPE-WS API 122 is accessible.

Presentation Processing Layer 104 User Interfaces:

The implementation of STEER-WS API 120 and PIPE-WS 122 makes it possible to provide a large variety of Task Computing 100 user interfaces 104 for WS TCCs 119, because a presentation processing layer 104 of a WS TCC 119 can be freed from the implementation of the modules of the Task Computing middleware processing layer 108. User interface 104 examples of WS TCC 119 are described herein for (1) a radio device user interface, (2) location (place) aware icon (e.g., balloon) computer display screen graphical user interface, (3) voice command user interface, (4) multiple inputs/outputs in a user interface, and (5) Tasklet-WS TCC 119a-5. The Task Computing 100 system environment can provide any combination of the foregoing user interfaces 104.

Figure 8:
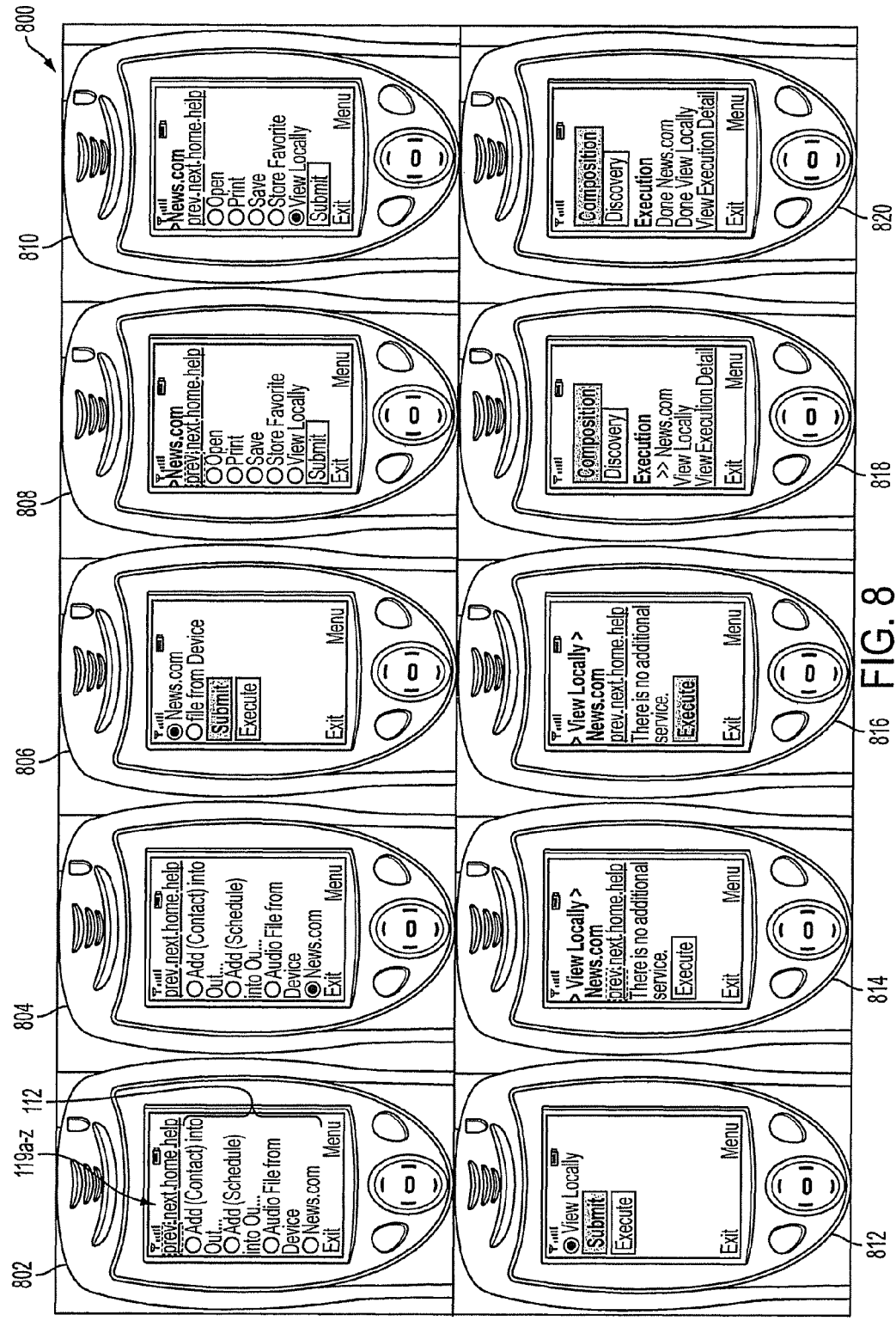
FIG. 8 is a diagram of mobile phone display screen user interface images to manage services, according to an embodiment of the present invention.

(1) A Mobile (Radio) Phone User Interface of WS TCC 119:

FIG. 8 is a diagram of mobile phone display screen user interface images to manage services 112, according to an embodiment of the present invention. More particularly, FIG. 8 is a diagram of mobile phone display screen user interface images to manage core functionalities of Task Computing, such as service 112 discovery, composition, execution, save, creation, and other service 112 management related operations. As discussed above, "service" herein refers to available computer system (as networked, non-networked, or both) services or sources of function 110 (i.e., "services" 112 herein refers to computational embodiments of functionality from universe of computer devices, computer applications/software, electronic-services and computer (or machine or both) readable content). User navigation of the mobile phone user interface can be according to known input unit(s)/device(s) (e.g., microphone for voice command/control, keyboard/keypad, pointing device (e.g., mouse, pointer, stylus), touch screen, etc.) and output unit(s)/device(s) (e.g., computer display screen, speaker(s), printer(s), etc.).

According to the embodiments described herein, a mobile phone user can experience Task Computing in any Web-enabled mobile or radio communication phone 800. A Task Computing Mobile Phone STEER Web Services Task Computing Client referred to as Mobile-PhoneSTEER-WS TCC 119a-2 is provided to manage tasks 126 on a mobile phone. Typically according to the present invention, a Mobile-PhoneSTEER-WS TCC 119a-2 is a Web WS client 119 for mobile phones, which can be implemented in any computer programming language that is installable and executable on the mobile phone, such as Java 2 Platform, Micro Edition (J2ME), Binary Runtime Environment for Wireless (BREW), any other language that might be installable on the mobile phone so that applications written in that language can be executed on the mobile phone, or any combinations thereof. Web clients 119*a*-2 might be pre-installed in Web-enabled phones and can vary widely in terms of the kind of Hyper Text Markup Language (HTML) they can process. More particularly, Web clients 119*a*-2 can be implemented via any Web and/or Wireless Application Protocol (Wap) browser software that interprets a markup language document to display information. According to another aspect of the embodiments described herein, a Mobile-PhoneSTEER-WS TCC 119*a*-2 can be a custom client application. The presentation processing layer 104 of Mobile Phone-STEER-WS TCC 119*a*-2 may be implemented similar to a Web-based User Interface for Task Computing or "Hosted STEER," also referred to as "TCC II," and described in the related commonly assigned pending U.S. patent application Ser. No. 10/733,328, entitled TASK COMPUTING, by Ryusuke Masuoka, Yannis Labrou, Zhexuan Song, filed Dec. 12, 2003 in the U.S. Patent and Trademark Office, owned by FUJITSU LIMITED assignee of the present Application, the entire contents of which are incorporated herein by reference.

Figure 9:
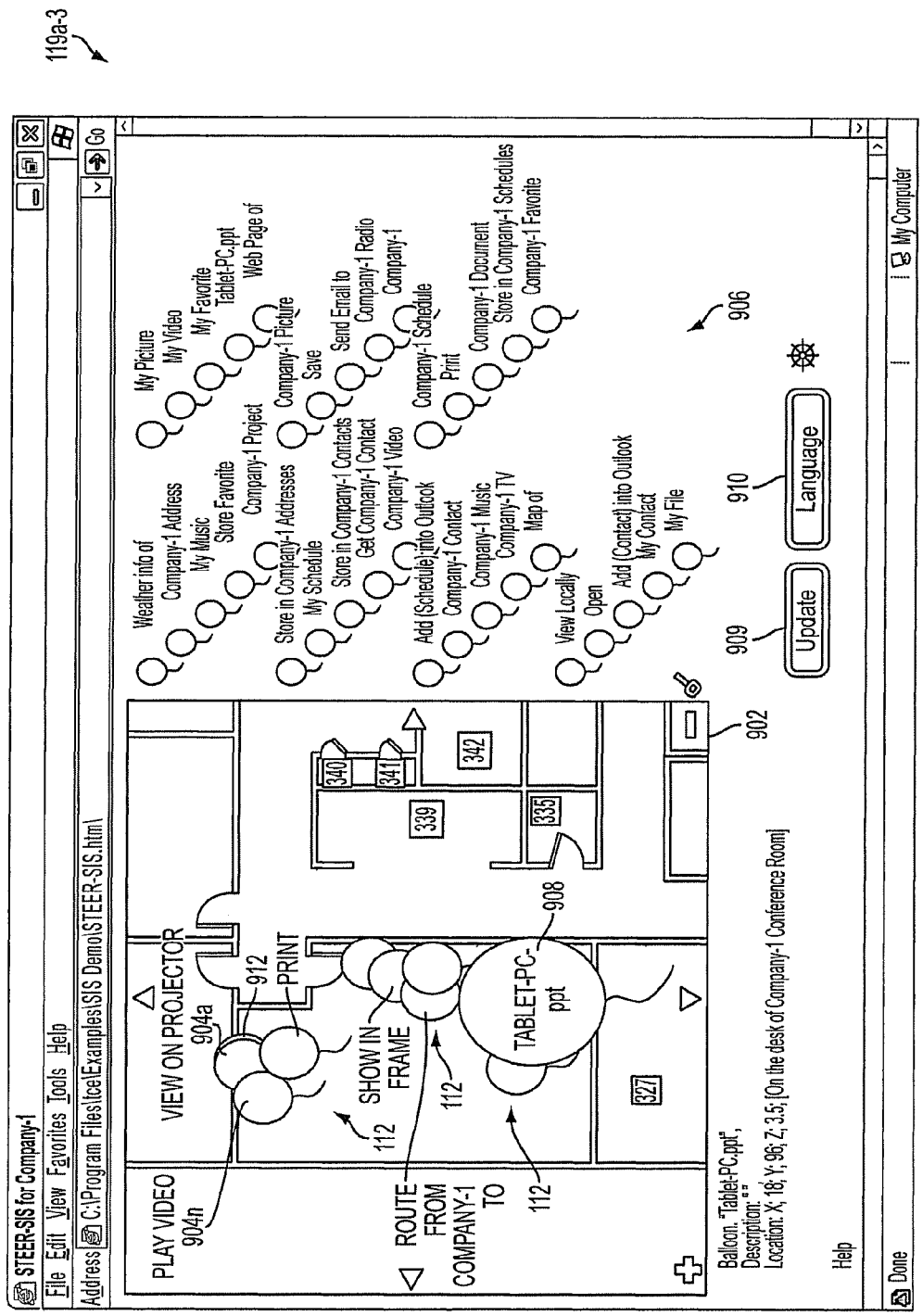
FIG. 9 is an image of a computer displayed location aware icon graphical user interface, according to an embodiment of the present invention.

However, according to the embodiments described herein, the Mobile Phone-STEER-WS TCC 119*a*-2 relies on WS API 106 to interface with the middleware server processing layer 108 and look and feel of Mobile Phone-STEER-WS TCC 119*a*-2 for managing tasks 126 is adapted to fit the specific requirements of a mobile phone 900, such as a much smaller screen size. FIG. 9 illustrates an example of a user experience using a Task Computing mobile phone, where a user may request a list of discovered services 112 (in multiple pages), create/compose a task 126 and execute the task 126. All operations happen in the relatively small display area of mobile phone 900.

The network connection for Web access, while performing Task Computing on a mobile phone 800 can be IR, BLUETOOTH, WLAN (for WLAN-enabled mobile phones) or a mobile network (GSM, CDMA, etc.). The choice of network does not affect the operation of the Mobile Phone-STEER-WS TCC 119*a*-2 on the mobile phone 800, because all communication necessary for Task Computing is carried over by high/application level communication protocols, such as (without limitation) Hypertext Transfer Protocol (HTTP) with displayable data in the form of HTML or other markup language based format.

Next the mobile phone 800 UI is described. When, at operation 802, the user at the mobile phone 800 directs a mobile phone browser software to a computing environment 110 (by entering a URL for that environment 110), the user sees a listing of the services 112 that are available in that environment 110. The listing might be presented in a single scrollable page, or in multiple pages that require that the user selects a "next page" link in order to reach them. At operation 804, if the user selects a service 112, at operation 906, the selection becomes an element of the service 112 composition (i.e., task creation), referred to as current service 112 composition (e.g., News.com is selected by the user in the FIG. 8 example). At operation 808, after a service 112 is selected, the user is directed to a page that contains a listing of only those services 112 that can appear in a composition with the selected service(s) 112 (e.g., open, print, save, store favorite, view locally). The displayed list in operation 808, as before, can appear in a single scrollable page or in multiple pages. At operation 808, at the top of the page with the listing of services 112, the previously selected services (e.g., News.com) are displayed, in the order that they might appear in a valid service 112 composition. In operation 808, the display is the current service 112 composition; it might also scroll across the display as a banner. Every time the user selects a service 112 (e.g., operation 810, 812, 814), a display page is updated to display the current service 112 composition and the listing of services 112 that can appear in the current service 112 composition, until no additional services 112 exist that can be used in the current composition, at which point, at operation 816, the user has the option of executing the service 112 composition. More particularly, operations 802 through 814 are operations to compose a task 126 via a mobile (radio) device. In the FIG. 8 example, at operation 814, there are no more additional services 112 that can be used in the current composition of the task 126, however, if additional services 112 are available, additional services 112 would be listed similar to the operations 804 through 814. According to an aspect of the embodiments described herein, the user can execute the composition as soon as it becomes executable even if it is not complete. At operation 816, execution status of a task 126 is displayed. At operation 820, an execution completion of a task 126 is displayed.

(2) Location Aware Icon (e.g., Balloon) User Interface (UI):

FIG. 9 is an image of a computer display screen location-aware balloon graphical user interface, according to an embodiment of the present invention. In particular, FIG. 9 is an example GUI of STEER-WS TCC 119*a* referred to as STEER-WS-SIS TCC 119*a*-3. The STEER-WS-SIS TCC 119*a*-3 in a computer displayed graphical user interface that displays a spatial image of an area, such as (without limitation) a surrounding area in which a user is located, and the displayed image of the user area is overlaid with selectable graphical display representations of discovered services 112 in the user area.

In FIG. 9, available/discovered services 112 within or at a location/place 902 are represented as icons 904*a*-*n* (according to the embodiment described herein, as balloon icons 904) at a corresponding area in the location/place 902 (e.g., in FIG. 9 an office floor map is a location/place 902 in which services 112 are discoverable at various areas within the office). In order to display (potentially) a large number of services 112 with 3D coordinates and realize an intuitive user computer display interface, the following mechanisms are provided:

1. The services 112 are represented by same computer display screen visual components (i.e., displayed icon), same type of visual component but with different styles (colors, size, fonts, etc.), or a different visual component for each service 112 (as the case may be). In FIG. 9, a visual component, referred to as "balloon," of varying sizes and colors is used.

2. A service 112 having a location is placed at the location in a displayed map. A service 112 without a location is placed outside the map in a tabular or some other organized way 906.

3. Randomize the balloon positions if they overlap or are close to each other

4. Keep balloons small usually and display an enlarged balloon 908 when operated or a cursor is on or close to that balloon.

5. Express the physical height (Z coordinate) by the balloon's shadow 912. The physically higher service 112 in a location, the larger and/or more blurred the shadow 912 gets. Other display techniques can be used to emphasize a Z coordinate of a service 112 at a location.

6. Represent an execution of two-service (potentially with translation services between them) composition by dragging one of the balloons and dropping it onto the other.

7. When a balloon is selected, only composable balloons (services) 112 keep their colors or are high-lighted. Others turn to another color indicating non-composable services 112, such as gray or stay the same, respectively.

8. Use the metaphor of pin bursting the balloon to represent the removal of the service 112.

9. When the pin is selected, only deletable balloons (services) 112 keep their colors or are high-lighted. Others turn to another color indicating non-deletable, such as gray or stay the same, respectively.

10. Change the language used for displaying service 112 names and descriptions based on a user language selection (as described above concerning communication language selection).

11. Provide the button to show (more comprehensive) STEER-WS-SIS TCC 119*a*-3 interface if the user wants to create more complex compositions than what can be created in this interface.

Therefore, FIG. 9 is an example of location-aware icon (e.g., balloon) user interface. Although the FIG. 9 example uses a displayed "balloon" as an available service 112 representation, the present invention is not limited to such a configuration, and any display representation overlaid on a displayed user area image can be used. This can be implemented by event-driven object-oriented programming. When STEER-WS-SIS TCC 119*a*-3, is started, it initializes the figures, internal data, and sets the event-handling codes for appropriate events. Basically those pairs of events and event-handling codes correspond to the items in the list above. In the event-handling codes, appropriate Web Service calls into TCE-WS API 106, such as STEER-WS API 120 and PIPE-WS API 122 are made. Then the event loop will take care of events and another loop for discovery (FIG. 3A) to update the balloons and internal data when there are changes in services 112 availabilities. In FIG. 9, selectable graphical displays of an "update" button 909 updates the displayed information. According to an aspect of the embodiments described herein, updating of displayed information in any of the user interfaces by a TCC 119 can be automatic. A selectable graphical display of a "language" button 910 provides the displayed information according a selected spoken language, such as Japanese (described in more detail further below under a multi-language Task Computing 100 system).

Figure 10:
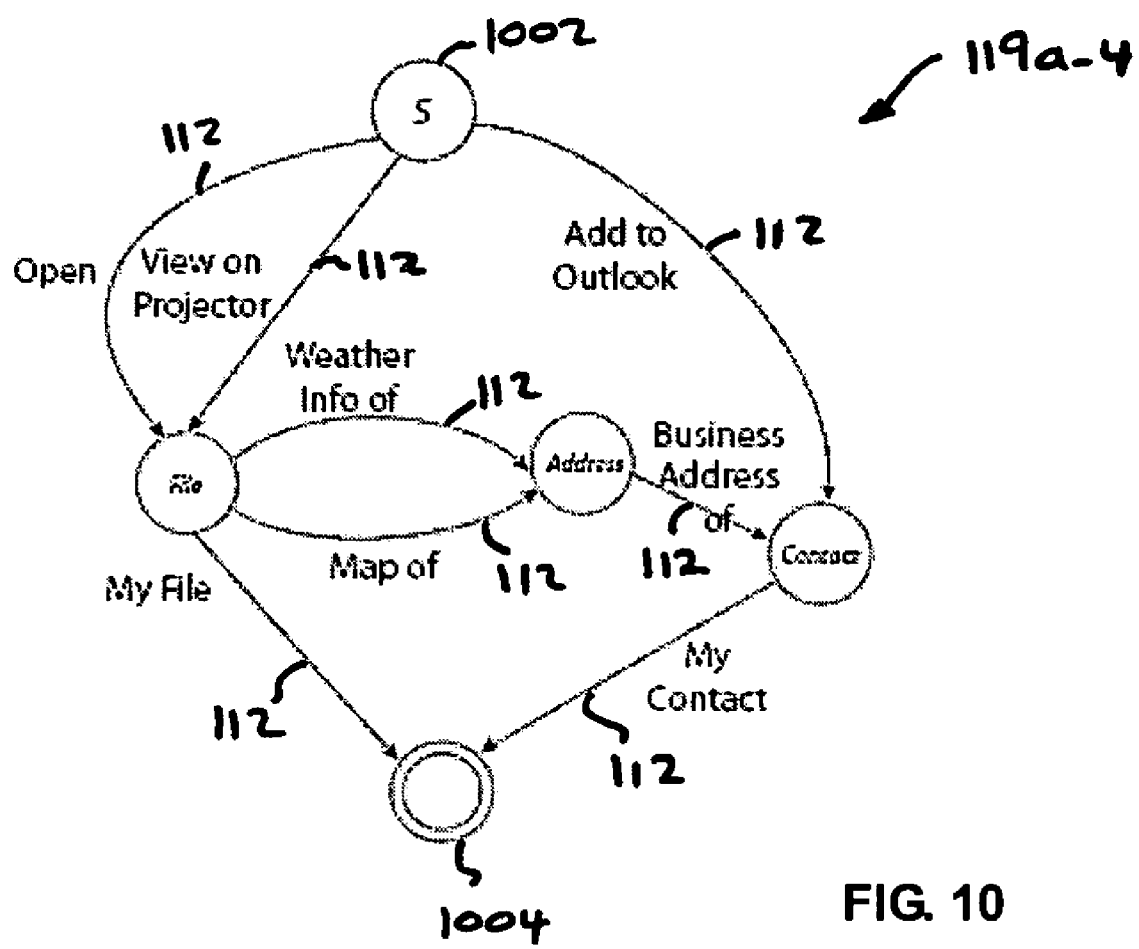
FIG. 10 is a state flow diagram of Task Computing speech recognition, according to an embodiment of the present invention.

(3) Voice User Interface (UI):

FIG. 10 is a state flow diagram of Task Computing speech recognition, according to an embodiment of the present invention. Speech can be a very important user interface for a pervasive computing environment where the user's client devices are often limited in size so that conventional input techniques such as keyboard or keypad might not be practical or convenient and/or where the user can afford to provide less visual attention, such as when operating a vehicle. According to the embodiments described herein, a VoiceSTEER-WS TCC 119*a*-4 is created, a WS Task Computing Client (WS TCC) 119 in which voice is used to give directions to work with the Task Computing 100, especially, for example, directly executing service 112 compositions as a task 126. In Task Computing 100, because service 112 compositions are designed to be compatible with a sentence structure by defining a name of a service 112 according to a natural language, so that a composition thereof creates a natural language sentence that can be processed by a speech recognizer system; i.e., compositions of the services 112 can be mapped into a speech recognition state grammar diagram, as shown in FIG. 10.

More particularly, VoiceSTEER-WS TCC 119*a*-4 is a voice-driven user interface developed, for example, in C#. A user can request tasks by speaking to a VoiceSTEER-WS TCC 119*a*-4; the implemented VoiceSTEER-WS TCC 119*a*-4 uses MICROSOFT'S AGENT AND SPEECH SDK along with calls to TCE-WS API 106. Each service 112 is mapped to a phrase (normally, the service 112 name) and once the VoiceSTEER-WS TCC 119*a*-4 "hears a sentence" (recognize a voice sentence), it will attempt to match the sentence into a sequence of services 112. Then a task 126 is built based on the service 112 sequence and is executed. One challenge of the voice interface is the recognition rate of human speech; defining a grammar set that raises the rate to an acceptable level is very important. Another challenge is how to identify and filter the semantically invalid commands (tasks), such as "Print on Office Printer My Video" that should be ignored even if "Print on Office Printer" and "My Video" are valid service 112 names. According to the embodiments described herein, the VoiceSTEER-WS TCC 119*a*-4 matches a complete sentence with valid (executable) tasks 126 according to a "Grammar Diagram," (FIG. 10), which is generated by a central module 402 of the middleware processing layer 108 and is made available through the STEER-WS API 120.

FIG. 10 is a part of a Grammar Diagram, which is a state flow diagram of Voice Task Computing, according to an embodiment of the present invention. In FIG. 10, a circle represents a service 112 semantically described functional characteristic as a grammar state (e.g., the service "open" 112 consumes a "File" data object type as input—"File" as an example is a semantic type for describing a file in a computer, including the URL link to that file). A start state 1002 is marked with "S" and an end state 1004 is designated with a double circle. Services 112 are represented by edges (lines) connecting the grammar states. A complete Grammar Diagram, for example, for a business office environment might have more than fifty services 112, over one hundred edges and over a dozen states. Paths from start state 1002 to end state 1004 represent semantically valid tasks 126; in an example business office environment, the complete Grammar Diagram might have more than one thousand such paths, i.e., more than 1000 tasks 126 that a user can execute. A "Grammar Diagram" is generated based on following rules:

1. If the service 112 has no output, then the service 112 is an edge following the start state, such as "Open," "View on Projector," and "Add to Outlook" in FIG. 11.
2. If the service 112 has no input, then the service 112 is an edge pointing to the end state, such as "My File" and "My Contact" in FIG. 11.
3. If two services 112 A and B can be composed, there must be a state that has A as input and B as output, such as "Business Address of," "Map of," and "Weather Info of" in FIG. 10.

One important attribute of the "Grammar Diagram is that it has a one-to-one mapping with a grammar rule set of a speech recognition engine. More specifically, a sentence is a semantically meaningful command (i.e., a valid task 126) if and only if a path from the start state to the end state in the diagram can be found, such that the sentence is a concatenation of the names of edges (i.e., a valid composition of services 112). For instance, "Open My File", or, "View on Projector Weather Info of Business Address of My Contact" are valid commands or tasks 126. The "Grammar Diagram" is determined solely by the ontology and the semantic descriptions of services (i.e., determined based upon SSD 116). Use of SSD 116 raises the recognition rate significantly and that the semantically invalid commands or invalid tasks 126 would be completely avoided. A Voice UI can be desirable for Intelligent Transportation System (ITS) applications of Task Computing 100.

FIG. 11 is an example pseudo-code to generate a speech recognition diagram ("Grammar Diagram") for Task Computing, according to an embodiment of the present invention.

First, at operation 1102, services 112 with no output are discovered or found. At operation 1104, all other services 112 that can be composed are recursively found. In particular, at operation 1106 for each found service 112, if the service 112 has no input, then the service 112 is designated as an edge link to the end state.

An example vocabulary of VoiceSTEER-WS TCC 119a-4 can be according to the following:
1. Name of a service 112
2. Task Computing Command to VoiceSTEER-WS TCC 119a-4 (such as "show services", or "leave Task Computing")
3. Client Operation Command (such as "Move up", "Click XXX" where XXX is the name of a button)
4. Web Page Command (such as "Click 4" to click the fourth control in the web page)
5. Letter and digits (such as "a", or "9" for user to input information)

There are two merits for having a small vocabulary set. First, it is very easy to train a speech recognition system. Second, recognition rate is high, because there are fewer words and sentences to discern from each other.

Because a Task Computing service 112 composition can have a grammatical structure, recognition rate by a speech recognition system can even be further improved, as follows. One can have an increased recognition rate for recognizing the whole sentence at once rather than recognizing each component in the sentence one at a time. This is basically because even if the recognition fails in one part of the sentence, it can still recognize it if other part is recognized (i.e., one has to consider joint probability). For example, take the spoken phrase, "Open My File." Assume the recognition rate for "Open" is a and for "My File" is b. If the recognition is done separately for "Open" and "My File", the recognition rate can never exceed a as one has to recognize "Open" first. But if the system tries to recognize the whole sentence, "Open My File," the recognition rate will be 1−(1−a)(1−b)=a+b−ab=a+b(1−a). As a is less than one and b is positive, recognition rate is always larger than a. Therefore, speech recognition rate can get higher when the sentence is longer.

Therefore, according to an aspect of the embodiments described herein, VoiceSTEER-WS TCC 119a-4 adds additional paths for "a" and "the" between service paths. By this, the user can have more natural sentences. For example:
Computer, View on Projector (the) Web Page of (the) Manager of (the) Task Computing Project It is also possible to omit one or more translator services 112 in a command sentence, because even an ambiguous command sentence might still be recognizable. For example, in FIG. 10, by having direct connections from "File" node to "Contact" node with services 112 of "Weather Info of" and "Map of," "Business Address of" service 112 in the command sentence can be omitted by the user, such as
Computer, View on Projector (the) Weather Info of My Contact and VoiceSTEER-WS TCC 119a-4 can still recognize the sentence. In this case, if there is an ambiguity in what the user wants VoiceSTEER-WS TCC 119a-4 can clarify by asking the user. In this case, when there is another link from "Address" node to "Contact" with a service 112 of "Home Address of," and the user asks the above sentence and VoiceSTEER 119a-4 can ask the user a clarifying question to compose a valid task 126:
Do you want to (1) "View on Projector Weather Info of Business Address of My Contact" or (2) "View on Projector Weather Info of Home Address of My Contact?"

By reversing the direction of the connections and replacing the start node and the end node in the recognition diagram, VoiceSTEER-WS-TCC 119a-4 can recognized other languages with noun+verb order, such as Japanese.

(4) Multiple Input/Output in User Interface:

Some services have multiple inputs, such as "Fax" service 112 takes a fax number and a file as inputs. According to an aspect of the present invention, a STEER-WS TCC 119 asks in a recursive way for missing inputs from a user during task 126 execution. For example, in the following conversations between a computer and a user of Task Computing 100 system:

User: Computer, "Fax" (the) "Fax number of" "Ryusuke Masuoka"
Computer: What is the "File" for "Fax" service?
User: Use "My File"
Computer: Will execute "Fax" "My File" with "Fax number" of "Ryusuke Masuoka" as "File" for "Fax" Service
Computer: Start execution
User: Computer, "Fax" "My File"
Computer: What is the "Fax Number" for "Fax" service?
User: Use "Fax Number of" "Zhexuan Song"
Computer: Start execution In the first conversation, user wants to invoke a task 126 which comprises three services: "Fax", "Fax number of", and "Ryusuke Masuoka" (a Contact providing service 112). By checking the task 126 (i.e. service 112 composition), the computer determines that service "Fax" takes two inputs: one is "Fax Number" and the other is "File". Since "Fax Number" is provided by the sequence, the computer now asks the user for the other input "File". Then user tells the computer to get the input from the service 112 "My File". With all inputs specified, the computer then starts the execution of the task 126.

The second conversation is about the situation when the "Fax Number" is not initially specified. In this case, user is further asked to provide a service 112 composition which gives the "Fax Number".

In the above two examples, due to the characteristics of speech used for the interface of VoiceSTEER-WS TCC 119a-4, it is often not easy or natural for a user to provide all inputs from the beginning in one sentence. Therefore, when such situations are detected, the execution engine 406 controls the VoiceSTEER-WC TCC 119a-4 computer to prompt the user for more inputs before and/or during execution. This can be thought as mapping a complex service 112 composition diagram spatially into user interaction that spans temporally between the user and the computer.

Dealing with multiple outputs is essentially same. For example, assume there is a service which is called "Bioinformatics Talk" and which produces a "Contact" data object as its speaker, a "Schedule" data object for its schedule and a "File" data object as its presentation material. Using VoiceSTEER-WS TCC 119a-4:

User: Computer, "Add (Schedule) into PIM" (the) "Bioinformatics Talk"
Computer: What do you want to do with the "Contact" from "Bioinformatics Talk"?
User: Use "Tell Me"
Computer: What do you want to do with the "File" from "Bioinformatics Talk"?
User: Use "View on Projector"
Computer: Start execution In the above task 126 composition scenario, the computer, via user prompts to further define the task 126, will add the schedule into PIM, read out the speaker contact, and show the presentation material on the projector, using three separate services, "Add (Schedule) into PIM", "Tell Me", and "View on Projector" services.

For services 112 with more than two inputs/outputs or when there are more than one service 112 with multiple inputs/outputs, the procedure is similar. This technique can be used recursively until the task 126 is well defined. Alternatively, the computer can execute whatever parts executable in the service 112 compositions and asks the user there is no other parts executable without specifying further service 112 compositions necessary.

Although the foregoing multiple inputs/outputs description is described in the context of voice recognition, the present invention is not limited to such a configuration, and those techniques are also applicable for other Task Computing Clients 119 using Graphical and other User Interfaces. For example, Task Computing clients can pop up windows asking for missing services 112 and/or for additional functional characteristics of the services 112, such as (without limitation) data object inputs and outputs of a service 112. See, for example, FIG. 1B showing a task 126 construction GUI pane 144 in which a directed graph of composed services 112 as a task 126 to deal with multiple inputs/outputs is displayed.

(5) Tasklet TCC 119*a*-5

A Tasklet TCC 119*a*-5 is a very light processing weight Task Computing Client (TCC) 119, which executes OWL-S files of a service(s) or a service composition(s) (task(s) 126). Among other ways of making Tasklet TCC to execute OWL-S files including from the command line, the preferred way is to invoke the Tasklet TCC by double-clicking (or some other appropriate OS operations) the OWL-S files to be executed. When the Tasklet TCC reads the OWL-S files, it will execute the services or the service compositions by using STEER-WS APIs 120. Tasklet TCC might show the control UIs of the service function 115 within its own window. In particular, with reference to FIG. 2, the Tasklet TCC 119*a*-5 invokes the "executeOWLS" API 120 to execute an OWL-S description.

Advanced Semantic Service Description (Advanced SSD):

Advanced features of (1) a Relaxed Type for service 112 input, (2) locations of services 112, (3) multi-language services 112, and (4) service 112 management functions, in Semantic Service Description 116 to support the versatility of services 112, is provided as follows:

(1) Relaxed Type:

Some services 112 accept a broad range of input except a small subset. For example, service "View on Projector" 112 accepts File as a functional characteristic, except Audio File and Video File, where Audio File and Video File are the subset of File. If input of "View on Project" is represented as (File-Audio File-Video File), another new problem can be encountered, i.e. when another service 112, such as "My File" generate File as output, the inference engine does not know that there two services 112 that can be composed.

The cause of the problem is that the descriptive power of the current service description language is limited and the composition conditions can be too strict. Our solution for the problem is to extend the current service description language by supporting two types of input for a service 112. One input is called parameter type $T_p$, which is the exact domain of input, and the other second input is called relaxed type $T_r$, which is a larger domain that input could also fall into. For example, an input type $T_i$ is acceptable if 1. $T_i$ is a subset of the relaxed type T
2. The intersection between $T_i$ and the parameter type $T_p$ is not null.

For example, in service 112 "View on Projector", $T_r$ is "File" and $T_p$ is ("File"-"Audio File"-"Video File"). Input type "File" is acceptable. "WebPage," a subclass of "File" is acceptable as well. But "Audio File" is rejected. "Thing" a super class of "File" is rejected as well.

An example of a piece of Semantic Service Description 116 of "View on Projector" service 115 that uses Relaxed Type is:

```
<process:Input rdf:ID="URLInput">
    <process:parameterType     rdf:resource="http://www.company-
1.com/tce/ontologies/2004/03/object.owl#ViewableFile"/>
    <Company-1:relaxedType     rdf:resource="http://www.Company-
1.com/tce/ontologies/2004/03/object.owl#File"/>
</process:Input>
```

In STEER inference engine, relaxed type is supported. This Relaxed Type can be implemented as follows: When STEER composes the services it checks if there is Relaxed Type. If there is no Relaxed Type parameter, it uses usual algorithm to match services and execution. If it finds the Relaxed Type for the service, A, the service, B, preceding the service, A, the service B matches with the service A only when the output of B is a subclass of the input Relaxed Type of A and the output of B has non-empty overlapping with the input Parameter Type of A. When STEER execute the composition, STEER checks the output of B to see if it really falls in the input Parameter Type of A, before invoking A with the output of B.

(2) Location

Including location information in Semantic Service Description 116 is another new feature. The location information can comprise the coordinates in 2D-, 3D-Euclidean coordinate systems, or any other coordinate system, reference to the coordinate system, and/or the text description of the location. A piece of Semantic Service Description 116 of "View on Projector" related to location is:

```
<Company-1:locatedAt>
    <Company-1:Location>
        <profile:sParameter>
            <geoF:Point rdf:ID="ViewServicePosition">
                <rdfs:label>On the table of Conference Room,
Company-1</rdfs:label>
                <geoF:xyzCoordinates>15, 98, 98</geoF:xyzCoordinates>
<geoC:hasCoordinateSystem rdf:resource="http://www.company-
1.com/tce/ontologies/2004/03/geo.owl#MyCoordinateSystem" />
            </geoF:Point>
        </profile:sParameter>
    </Company-1:Location>
</Company-1:locatedAt>
```

Upon service 112 discovery, the a TCC 119 extracts, via the TCE-WS API 106 (e.g., findAllServices and getServiceProperty 120 (FIG. 2), the location information out of the semantic service description 116 and support spatial based filtering or presentation of services 112 to the user (an example is the Location-Aware (Balloon UI) described above).

As services 112 change their location, the services 112 can use UPnP (and other discovery mechanism) to update their service 112 descriptions with new location. If the location change does not happen so often, this is a viable option. If the location change is often, it is more efficient to use a service 112 management function, discussed next.

(3) Semantic Service Descriptions (SSD) 116—Communication Languages (Multi-Language):

The Task Computing 100 embodiments described herein supports any communication language, such as (without limitation) spoken languages of English, Chinese (Simplified), Chinese (Traditional), Greek, Hindi, Japanese, Korean, Spanish and Turkish, thereby providing a language independent Task Computing 100. The language independent procedure comprises two operations: 1. service 112 (115, 116) profiles, such as a service 112 name/description and 2. user interface.

1. Regarding the service 112 profiles, such as service name/description, in semantic service description 116, xml:lang attribute is used to describe service names and service descriptions in different languages. For example, below is an example portion of a Semantic Service Description 116 file written in XML that describes a service name called "open" in English and "打开" in Chinese:

<serviceName xml:lang="en">Open</serviceName>

<serviceName xml:lang="zh">打开</serviceName>

The same method can be applied in describing the service as well. See also, FIGS. 16D-F.

Figure 12A:
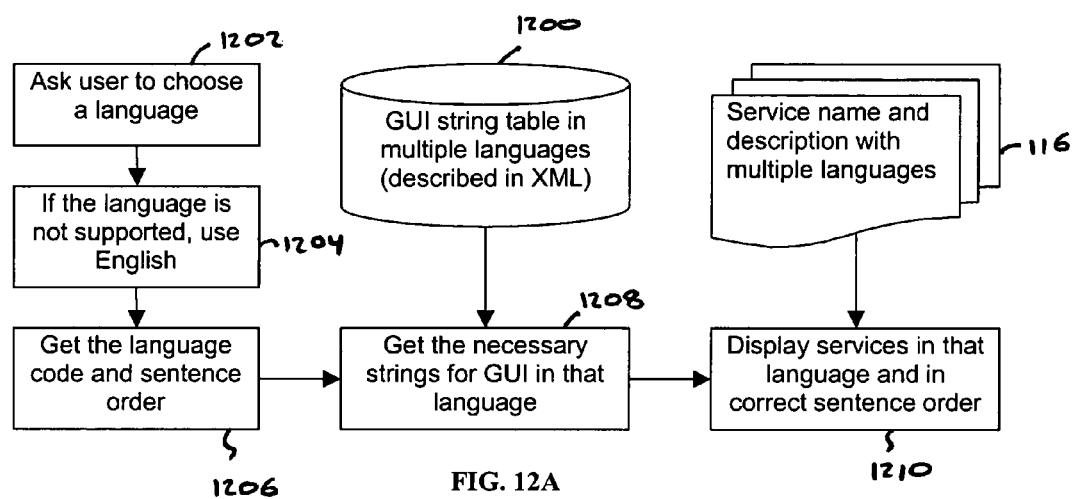
FIG. 12A is a flow chart of displaying a Task Computing Client user interface in any language, according to an embodiment of the present invention.

2. Regarding user interface, FIG. 12A is a flow chart of displaying WS TCC 119 user interface, such as STEER-WS TCC 119a, in any language, according to an embodiment of the present invention. According to an aspect of the embodiments described herein, as an example, in various STEER-WS TCC 119a user interfaces, a table 1200 is maintained for all computer display user interface strings that are used. For each string in the table 1200, multiple versions in different languages are kept. The string table 1200 is described in XML and is loaded when the STEER-WS TCC 119a is launched. The STEER-WS TCC 119a computer user interface, for example, displays strings using a language based on a user's selection.

In FIG. 12A, at operation 1202, a user is prompted via a computer user interface (e.g., a computer display screen graphical user interface (GUI), voice interface, etc.), to choose a language. At operation 1204, if determined that the language is not supported, English is selected as default. At operation 1206, a language code and sentence order are determined (e.g., retrieved from computer readable media, determined by software, etc.). At operation 1208, necessary strings for a computer user interface in the selected language are retrieved from the table 1200, which in this example are strings for a GUI. In this example, at operation 1210, a service name and service description in the selected language is determined from an SSD 116, and the determined service name, service descriptions and retrieved GUI strings in the selected language and in correct sentence order are displayed in a computer display screen user interface. Therefore, at operation 1210, at one time, STEER-WS TCC 118a displays service names, service descriptions, and computer user interface strings in the selected language. If, at operation 1210, semantic service description 116 of a service 115 does not support the selected language language, a default language (for example, English) will be fetched and displayed. Meanwhile, the sentence order is taken into account for multiple languages. As described herein, a user can specify which language version of a service name and a service description 116 of a service 115 to retrieve using STEER-WS TCC 119a. Of course, the above-described language independent operations in Task Computing 100 may be provided in any WS TCC 119a-n, such as (without limitation) the SDSCMs 119b.

Regarding sentence order, for example, in English, the sentence order is VO (verb+object), but in Japanese the sentence order is OV (object+verb). Such language order information is also kept in/maintained by STEER-WS TCC 119a (or, at operation 1202, it can be made so that the user sets it at the start up time of STEER-WS TCC 119a). When displaying compositions, at operation 1206, STEER-WS TCC 119a will pick the correct sentence order based on the selected language, selected sentence order, or both.

Figure 12B:
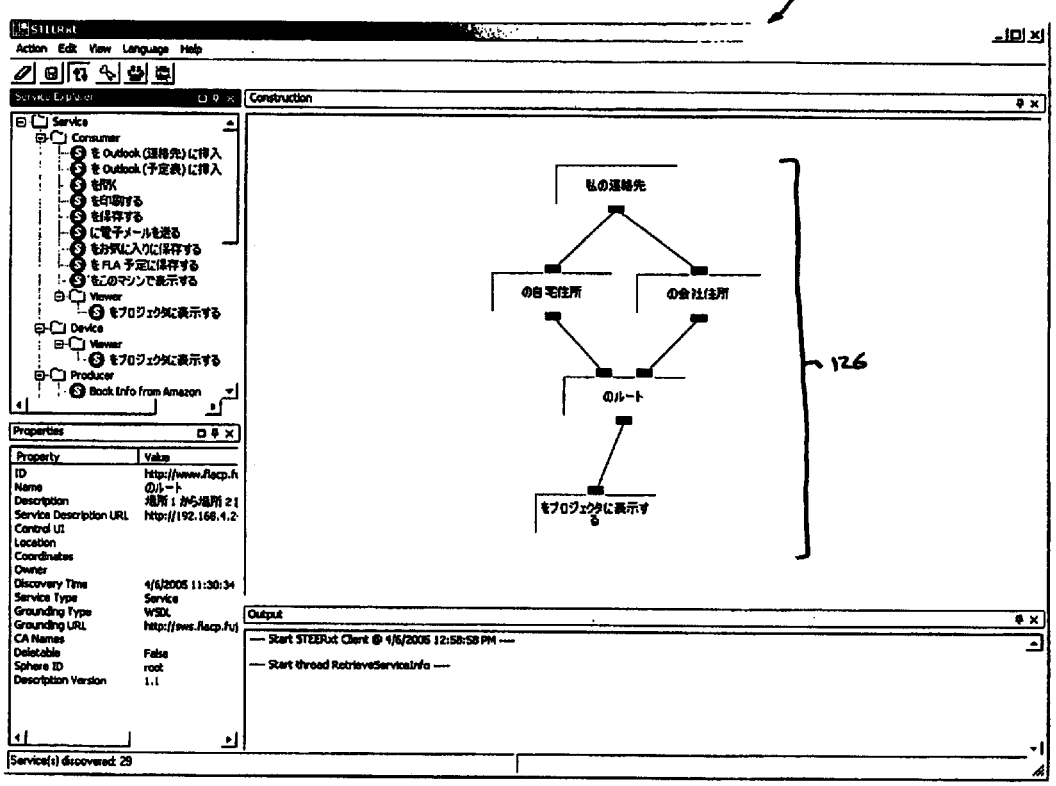
FIG. 12B is an image of a computer displayed graphical user interface as a computer implemented task interface in Japanese at the presentation layer, according to an embodiment of the present invention.

FIG. 12B is an image of a computer displayed graphical user interface as a computer implemented task interface in Japanese at the presentation layer, according to an embodiment of the present invention. In particular, FIG. 12B is an image of a GUI for STEER-WS-XT TCC 119a-1 generated in Japanese according to the flowchart of FIG. 12A and corresponding to the GUI in FIG. 1B. Similarly, in FIG. 9, by selecting a selectable graphical display of a "language" button 910, the GUI of STEER-WS SIS TCC 119a-3 can be displayed with text in a selected communication language.

(4) A Service Management Function:

Service Management Function(s) (SMFs) can be viewed as meta-services for services 112 (see FIGS. 16G-J). SMFs exist because of services 112, but not vice versa. If a service 112 is gone, the SMF of the service 112 should be gone as well. Each SMF has its own description written in OWL-S. Therefore, to link an SMF with a service 112, the SSD 116 of the service either includes the SMF descriptions or have links to SMF descriptions. In the latter case, SMF descriptions can reside anywhere. Similarly, the implementation of SMF can be deployed anywhere and is not necessary to stay on the same device as the service itself.

Examples of SMF include:
1. Destroy, once invoked, the service is destroyed.
2. Handled object of, once invoked, returns the semantic object that is currently handled by the service is returned.
3. Control UI of, once invoked, returns the link to the service control UI is returned.
4. Is Alive, a function to test whether the service is still alive.
5. Location of, once invoked, returns the current location of the service. This is an efficient way for services with changing location to provide its location.
6. Other, for example, tests whether a service is available at a given period, or grid service related functions, and so on.

From a user interface point of view, SMF are treated just like other services 112. This is especially useful in VoiceSTEER-WS TCC 119a-4. For example the following SMFs can be performed as tasks 126:
1. Destroy Tablet-PC.ppt
2. Handled Object of View on Projector
3. View Locally Control UI of Play (Audio)
4. Is Alive Bank?
5. Location of Play (Audio)

Furthermore, a user can compose the result of SMFs with other services 112, such as:
1. "View on Kiosk" "Handled Object of View on Projector"
2. "View Locally" "Control UI of View on Projector"
3. "View on Kiosk" "L-Note of Location of Play (Audio)"

Figure 13:
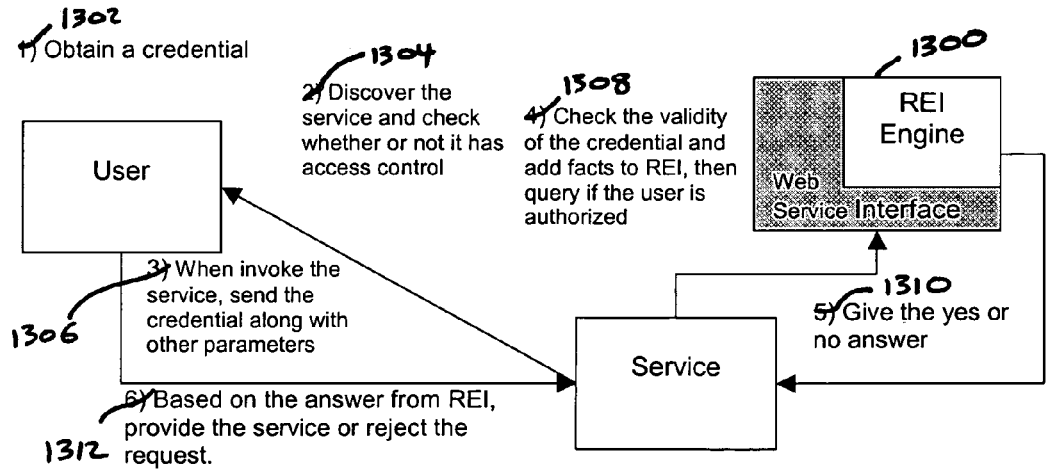
FIG. 13 is a flowchart of a service access control, according to an embodiment of the present invention.

Service Access Control:

FIG. 13 is a flowchart of a service 112 access control, according to an embodiment of the present invention. In a pervasive computing environment, there exist some services 112 that are or should not be open to all users. It is important to adopt some sort of access control mechanism for services 112. According to the embodiments described herein, access control to services 112, including (1) Shared Policy and Delegation, and (2) Service Authentication by Task Computing Clients 119 through SSDs 116, will be described.

According to the embodiments described herein, REI policy language is used to establish access policies to services 112. REI is a policy specification language. The concept of REI is known. In FIG. 13, REI policy engine 1300 determines who has what kinds of access rights based on policies (set of access/security rules), facts (information provided by a user and/or client side), and ontologies. The REI engine 1330 is provide with a Web Services interface 106 so that it can be centralized or distributed. The REI engine 1300 and/or Web Services interface 106 to the REI engine 1300 can be replaced for this framework. Any policy engine with remote procedure call interface or even a software module for policy engine within the service 112 is sufficient.

In FIG. 13, a workflow includes six operations assuming a user is visiting an office:

1. At operation 1302, when a new user registers at the counter, a credential is issued to the user. The credential includes information about the user, such as name, status and location, as well as meta-data about the credential such as its creation time, expiration time and digital signature which guarantee its integrity.

2. At operation 1304 the user gets on the network for the office, the user's Task Computing client (client) 119, for example, STEER-WS TCC 119a, discovers all services 112 that are currently available in the environment 110 and/or "spheres" that are connected at the time of discovery. Some of the services 112 are public and some of them have access control. The information of the services 112 is described in their semantic service descriptions 116. The user's Task Computing client 119 may check the status of the service 112 by reviewing its semantic service description 116. The semantic service description 116 tells/informs the Task Computing Client 119 whether it requires access control and what kinds of credential(s) is needed if so.

3. At operation 1306, when the user wants to invoke a service 112 through her Task Computing Client 119, the client 119 will check the status of the service 112. If the service is public, the client will invoke it as usual. If the service is access-controlled, the client 119 will send an extra parameter to the service 112, i.e. user's credential(s), along with usual TCE Web services 106 parameters to execute the service 112. According to another aspect of the embodiments described herein, the client 119 can send an extra parameter to the service 112, via a secured connection, such as HTTP over SSL, etc.

4. At operation 1308, the service 112 receives the request, it will first verify the integrity of the credential by checking the digital signature in the credential. If the signature is not valid, the request will be rejected immediately. Next, the expiration time in the credential is checked. If the time is expired, the request will be rejected too. When the credential is proved to be valid, the fact(s) in the credential will be extracted and inserted into a REI engine 1300. Then the service 112 will ask REI engine 1300 whether the user is authorized to invoke the service 112 based on the service's 112 policies.

5. At operation 1310, the REI engine 1300 will answer the query based on the ontology, the policies of the service and the facts about the user.

6. At operation 1312, based on the answer from REI 1300, the service 112 will either fulfill, or reject the request.

The REI engine 1300 does not have to be centralized or running at different place from the service 112. For example, it is possible to setup one single REI engine for the whole corporate campus or each device (such as printer) can have a REI engine of its own. In fact, in a pervasive environment, it is not common to have a REI engine that all services can access. In our design, as long as the instance of REI engine has enough information about the policies, facts, and ontologies, the answer will be given.

(1) Shared Policy and Delegation:

The foregoing discussed mainly about services determining the access rights of the client 119 through facts provided by the clients (maybe certified through a digital signature issued by a Certificate Authority, which issues certificates), its policy, and ontologies.

Sometimes one wants a service to use not only its own private policy, but also policies shared by certain communities. This is particularly useful when one wants to realize the delegation of rights from one user to another without accessing the service itself. (In ubiquitous environments, a service is often hosted by a device with limited computing resources. It might be too much burden for such devices to support the real secure access to those policies and to manage those policies.)

Multiple sites for shared policies might be corresponding to organizational hierarchy, geographical structure, etc. If the service belong to the department X hosted in the building Y, the service might want to use the shared policy sites for X and Y Initially for one time, the person in charge of the service sets for the service one or more sites to be checked for shared policies to be used for access control calculation. The accesses to those shared policy sites might be secured (for example, HTTP over SSL). When the service needs to calculate the access control, it will check the sites specified for possible updates. If there is no update for any of the sites, the service goes on to calculate the access control based on the cached policies along with facts provided by the clients, its policy, ontologies and other information. If there is any update for any of the sites, the updated policy is downloaded, the cache is updated, and the calculation will be done with the latest shared policies.

As to delegation of rights, it can be done through shared policy sites. One can delegate a right (which he/she has the right to delegate, for example, to print on a certain printer) by updating the shared policy with a statement that he/she delegates the right to a certain person (or group, etc.) through possibly secure connection to the shared policy site. The next time when the service calculates the access control, it uses the updated shared policy and the person with the delegated right gets to use the service.

In order to revoke, the original user updates the shared policy to add a revocation statement, which says that he/she revoke the right to the person. Or the original user may remove the original delegation statement from the shared policy.

(2) Service Authentication by Task Computing Clients 119 through SSD 116:

It is not always the case where the service wants to authenticate the client. Sometimes, the client wants to authenticate the service or to determine if the client has the right to execute the service in advance. If it can be determined in advance, the client can warn the user that it is not accessible or decide to hide the inaccessible services from the user.

In Task Computing, a service is identified through its Semantic Service Description (SSD) by the client. The SSD tells what the service is, its internal processes, how it can be executed, etc. Therefore, by giving the digital signature in the SSD itself or separately through other mechanisms, the service can be authenticated by the client. The digital signature needs to be signed by one of the authorities that the client also trusts. The digital signature can be for the parts of the SSD or for the whole SSD. It might be digitally signed partially only for important parts of the SSD.

In order for the client to determine if it has the right to execute the service, the SSD can be used as a vector for the policy information of the service. The SSD can contain the policy itself in it or the pointers to the policies it uses (ex. URL's). The policies may include the shared policy discussed above in the Shared Policy and Delegation section. When the client obtains the policy information in the SSD, the client can determine if it has the right to execute the service with the information in the SSD along with the facts about the clients, ontologies, and other information.

The service might not necessarily expose all of its policies in its SSD, but it still merits the client as even the partial information can reduce the chances that the user executes the service in vain.

Memory Device Deployment of Task Computing Client 119 for Access Control:

Previously, users must install the software before using Task Computing Client. It is time-consuming and sometimes hindrance for user adoption of Task Computing. A solution for the problem is to generate a portable or removable media or device (such as CD or UBS flash memory) that includes not only the Task Computing Client 119, but the executing environment as well, such as Java runtime, so that user can start using Task Computing without any installation.

The portable or mobile TCC 119 can also be combined with the issuance of credential that is crucial for access-controlled services for user's convenience. When the user registers at the counter, a credential is generated and can be added into the portable media or device. Then she may use the media or device on her own machine to access services based on the authorities that are assigned to her. The credential can be set as read-only so that no further changes can be made. It makes more difficult for the user to misuse the credential when the Task Computing client on the media or device is made to read the credential from the fixed path in the media or device. Note that memory device is not the only choice, other media, such as CD, DVD can be used as well.

FIGS. 14A-14G are diagrams of a scenario demonstrating use of service access control in a place, according to an embodiment of the present invention. In particular, FIGS. 14A-14G are diagrams of service access control in a business office as an example place.

Figure 14A:
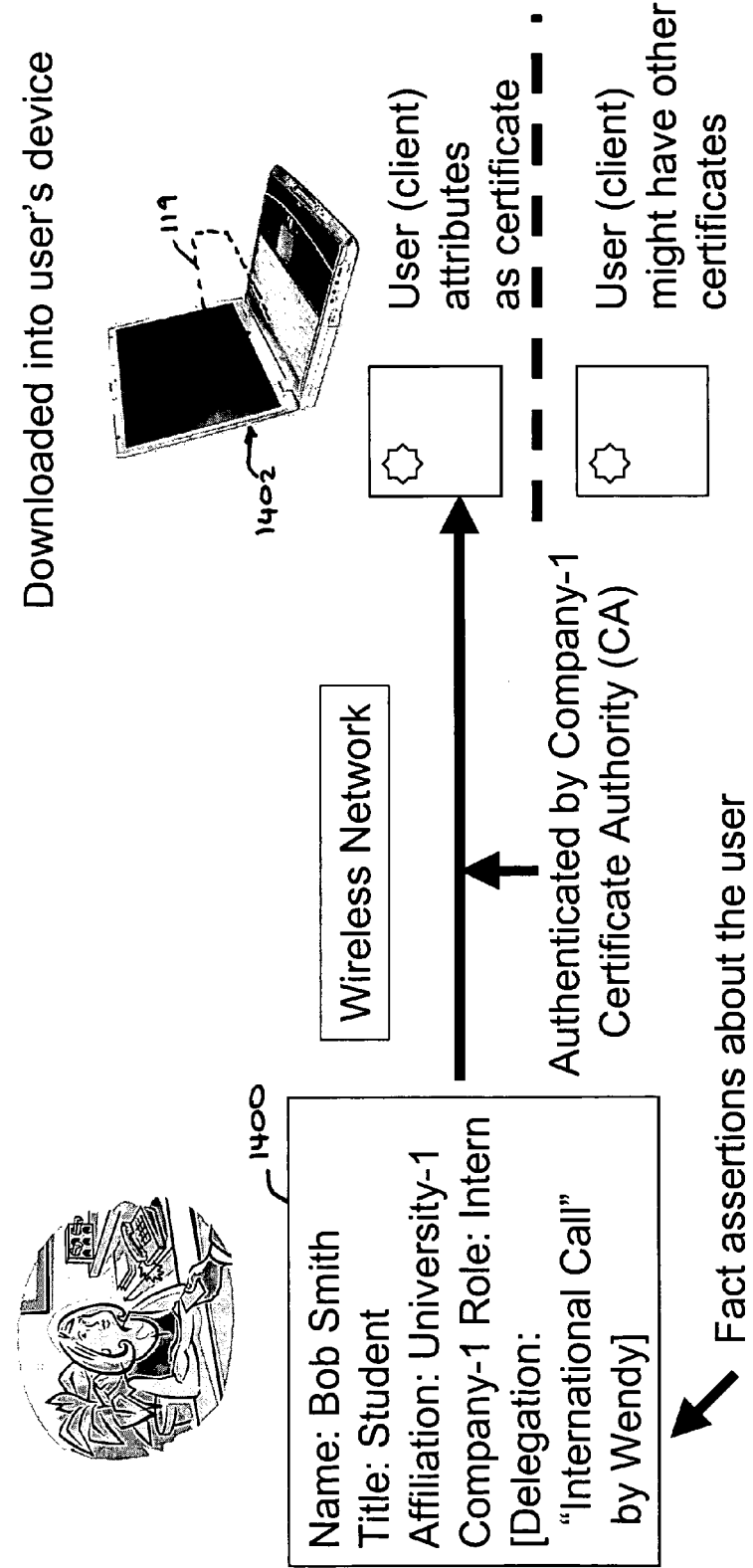

1. In FIG. 14A, Bob, a University-1 Master student, as an Intern of company-1 or site-1, visits the company-1.

2. In FIG. 14A, Wendy, an Office Administrator of the company-1 greets Bob.

3. In FIG. 14A, Wendy creates a STEER-TCC-Stick 1400 with credential for Bob. STEER-TCC-Stick 1400 can be, for example, a USB memory device with all the things necessary to run STEER TCC 119, a Task Computing client 119 including Java runtime.

Figure 14B:
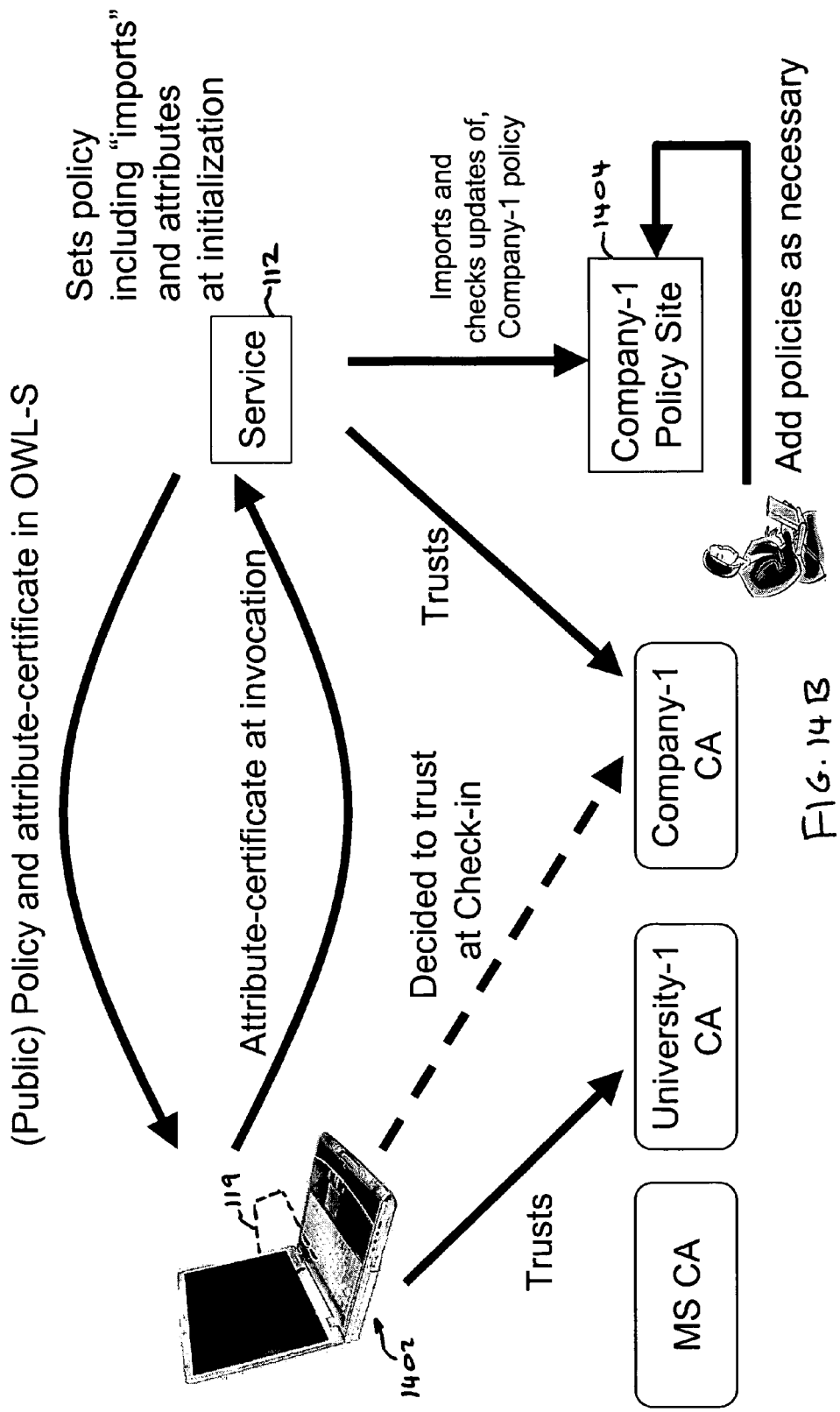

4. In FIG. 14A, using the software, Credential Creator, Wendy creates and saves the credential in the credential folder of the STEER-TCC-Stick. The credential includes his name, affiliation, status ("Intern") and metadata of credential (its creation date, expiration date/time, delegation information, etc.), and the digital signature signed with the company-1's private key. FIG. 14B is an architecture diagram of service access control, according to an embodiment of the present invention.

5. In FIG. 14A, Bob runs the STEER TCC 119 out from the STEER-TCC-Stick 1400 on his laptop 1402. FIG. 14B is a general service access control system/flow architecture, according to an embodiment of the present invention. In FIG. 14B, TCC 119 discovers the service 112 (i.e., discovers the SSD 116 in OWL-S of the service 112). The SSD describes the service's 112 (partial) policy and the facts including values of its attributes in the signed certificate. The TCC 119 can decide if the service 112 is trustworthy based on the certificate and decide if the service 112 is what the user wants to use potentially through interaction with the user. For example, the service's certificate is signed by Company-1, which the user decided to trust at the time of check-in to the Company-1 office and the user can decide whether the service 112 is trust-worthy. Then it can check if the user and TCC meet the service's policy so that it can use it. If the user decides and directs the TCC 119 to invoke the service, the TCC will send the facts including attribute values along with the other parameters of Web Service invocation. The service 112 checks the digital signature of the certificate, expiration time, and others to determine the facts sent are valid. Then using the facts, its private policy, ontologies, and shared policy, for example, one at Company-1 Policy Site 1404, the service 112 decides if the user has the right to invoke the service 112 and responds accordingly.

Figure 14C:
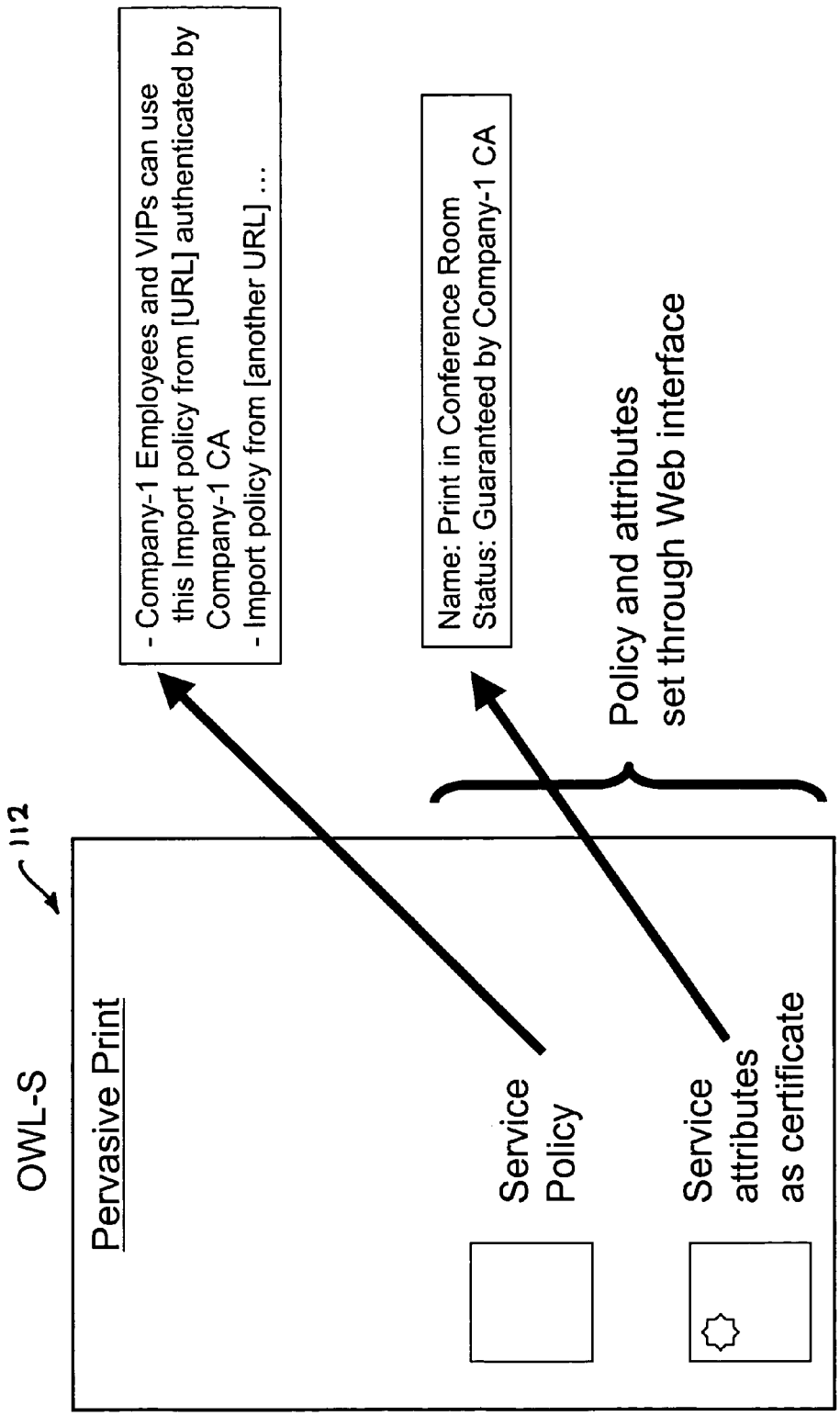
Figure 14D:
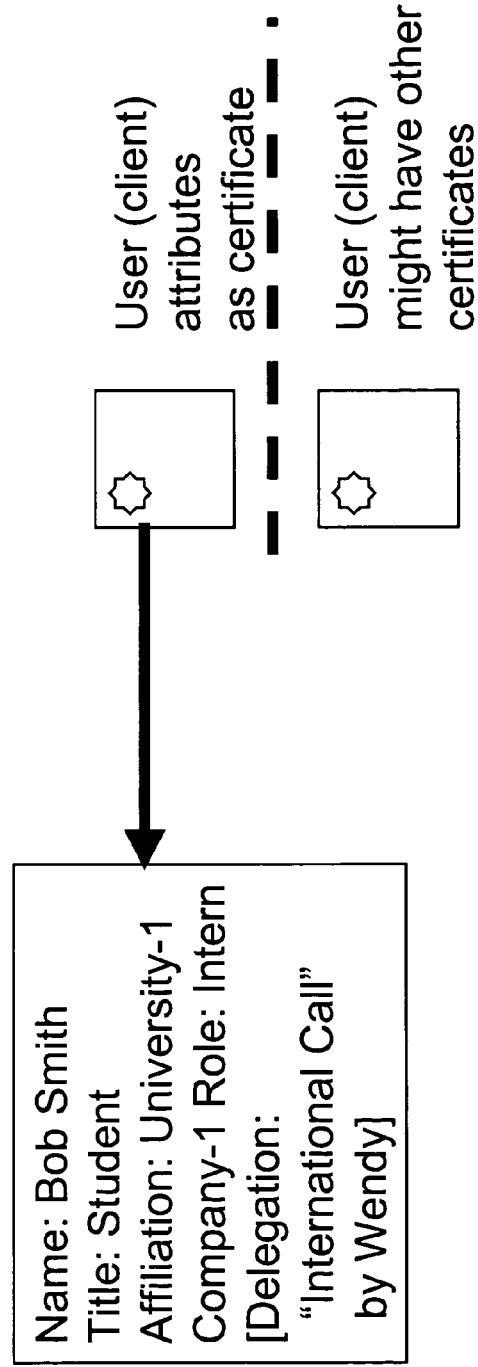

6. In FIGS. 14C and 14D, Bob finds the "Secure Print" service 112 with the key icon. In "Secure Print" OWL-S file, it says it requires the company-1 credential. (It can say it requires one of multiple credentials.) When STEER TCC 119 finds the requirement statement, it shows the key icon for the service 112 (in this case, "Secure Print").

7. In FIGS. 14C and 14D, Bob tries to use the "Secure Print", but he fails as an "Intern" is not allowed to use the service 112. Based on the "Secure Print" OWL-S file, STEER TCC 119 looks for the company-1 's credential in its "credential" folder. When it finds it, it sends the credential along with service invocation parameters in the Web Service call 106. "Secure Print" checks the digital signature of the credential to make sure it is valid. (So that facts in the credential are not modified.) First the service makes sure the credential is not expired. If not, then it uses these facts in the credential to determine if the caller has the authority to use the service by the REI policy engine, which is called through Web Service API. If the result from the policy engine is okay, the "Secure Print" prints the file. If not, it sends back a message which says the request has been turned down. (In this case, Bob as an intern does not have the right to print, so he is turned down.)

8. Bob asks John, a senior employee of the company-1, to delegate the right to print.

9. John uses the software, Delegation Manager 1406, to assert the delegation of the right to Bob by John to the Company-1 Policy Site securely. There is a statement at the company-1 Policy Site that a Senior Employee has a right to delegate the right to the interns.

10. Bob tries again to use the "Secure Print" and this time he succeeds.

11. After that, John revokes the delegation using the Delegation Manager 1406 (the delegation assertion created previously is removed from the company-1 Policy Site).

Figure 14E:
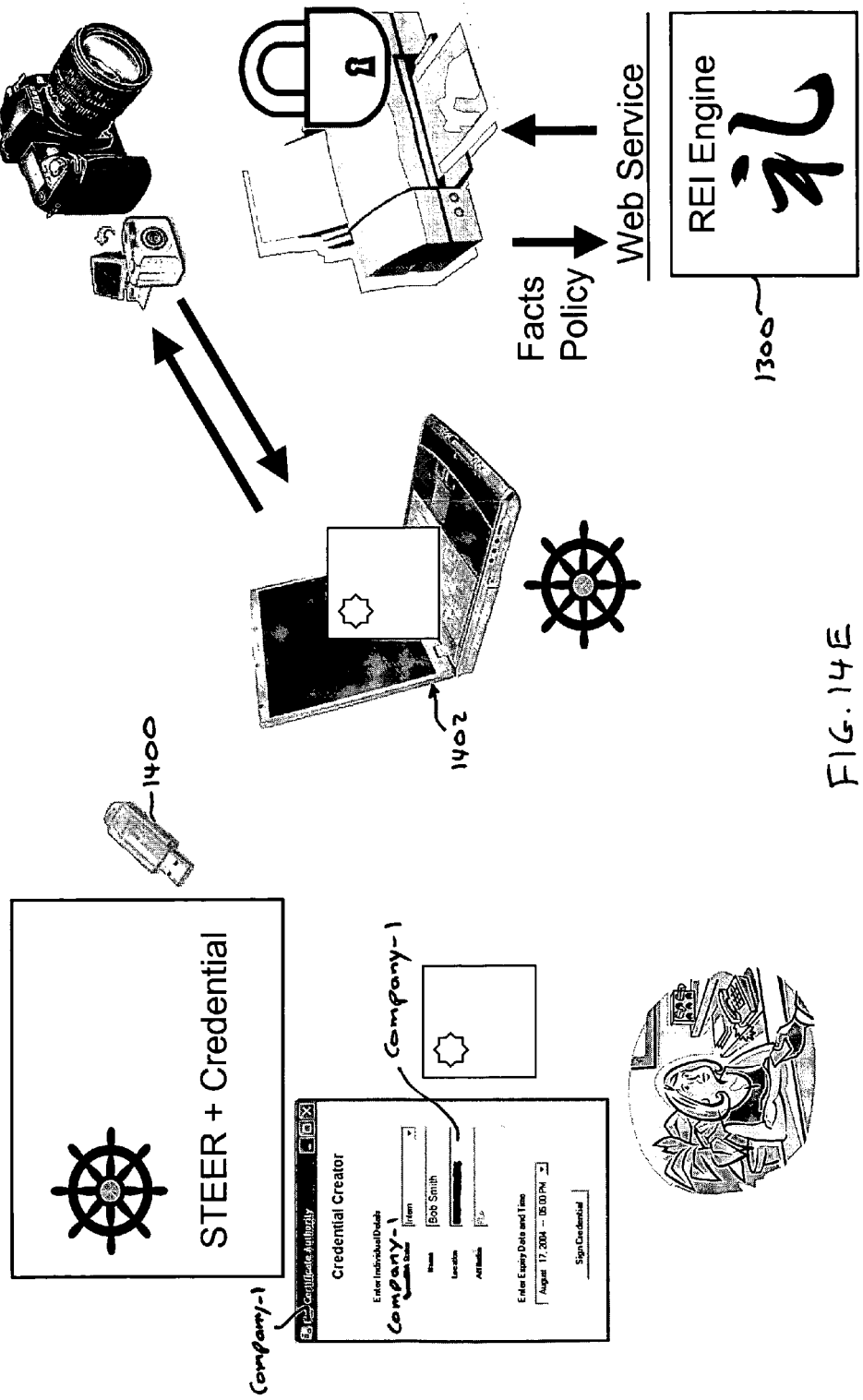
Figure 14F:
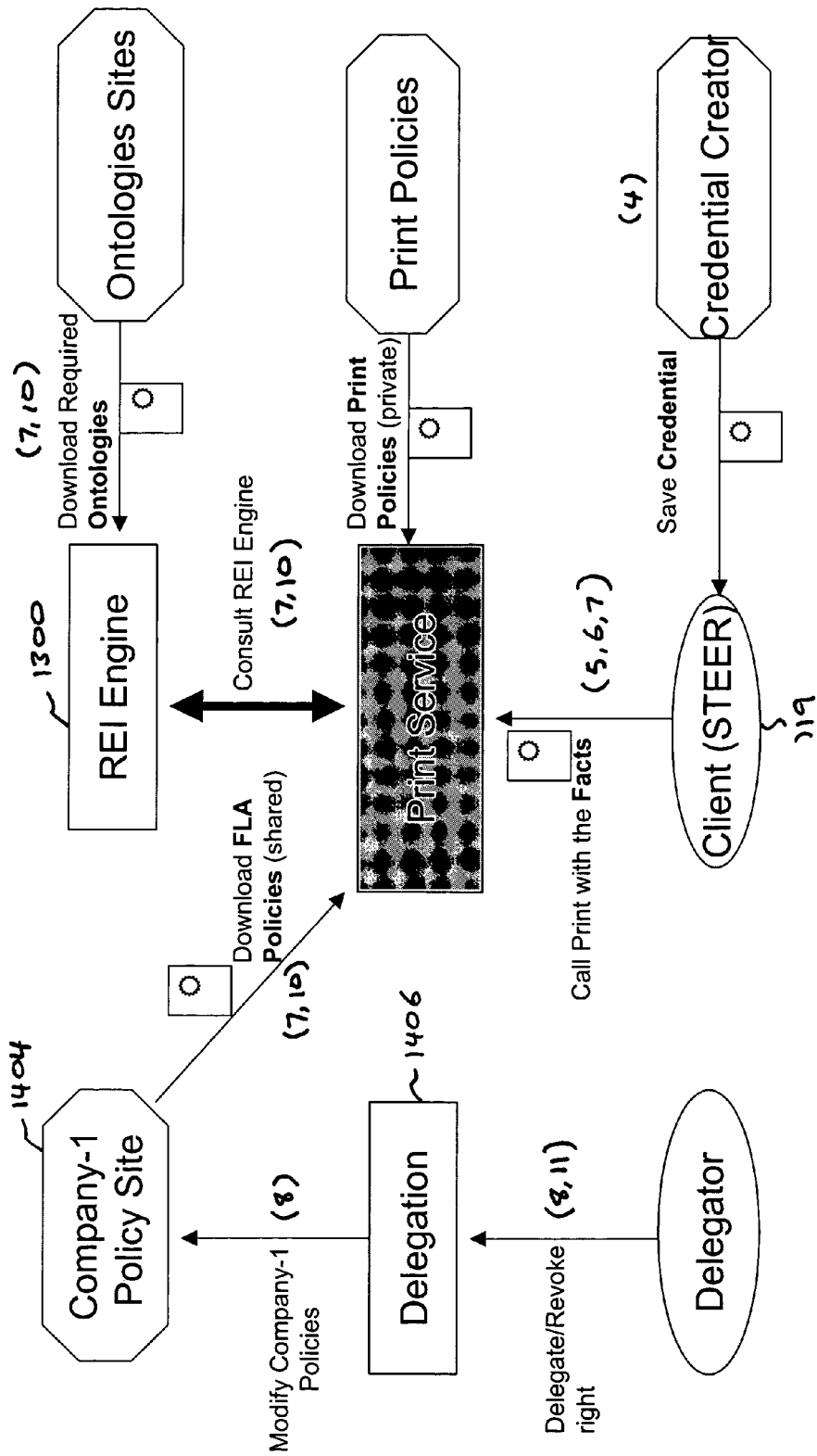

FIG. 14E is a graphical flow chart of the scenario in FIGS. 14A-14E. FIG. 14F is a flow chart of the scenario in FIGS. 14A-14E demonstrating use of service access control in a place, according to an embodiment of the present invention. The numbers in FIG. 14 correspond to the above scenario items 1-11.

Therefore access control is determined based upon the following elements: (1) facts provided by the Task Computing Client 119 (authenticated by the digital signature); (2) the service 112 private policy; (3) a shared policy; and (4) ontologies. A service 112 can use multiple shared policies depending on its configuration. Each time these listed service access control elements are mixed to determine the access control. FIG. 14G is a matrix 1410 of the service access control elements, according to an embodiment of the present invention. More particularly, FIG. 14G is a service 112 access control discussed above with reference to FIGS. 14A-14F. In FIG. 14G, at operation 1420, Client 119 calculates acceptability of service (composition) based upon client policy and service public attributes (C-P, S-A$_{pub}$). Service attributes are facts about the services, such as (without limitation) cost to use the service, any certification information, operational information, etc. Even though operation 1420 does not use the service's private attributes, if they have not been provided, operation 1420 increases the possibility that the service might be acceptable to the client. At operation 1422, Client calculates feasibility to the service of the client using service (composition) based upon client attributes and service's public policies (C-A, S-P$_{pub}$). Again, operation 1422 increases the possibility that the service might be feasible, even though the client might not have access to the service's private policy. At operation 1424, the service 112 calculates acceptability of (or authenticates) the client based upon all service accessibility factors of client attribute, and service's public and private policy (C-A, S-P$_{pub}$, S-P$_{pri}$ and/or (as the case may be service S-A$_{pri}$)). FIG. 14H is an example listing 1412 of facts, private policy for the Secure Print service 112, and the shared policy for the company-1 used in the above scenario. More particularly, in Task Computing 100 system, a service access control handling 424 (FIG. 4) can handle access to a service 112 as described herein.

Next will be described four other semanticizer client applications as SDSCMs 119$b$ that provide semantic objects to be used in Task Computing 100, namely (1) a real-world object semanticizer client 119$b$-3, (2) a database semanticizer client 119$b$-4, (3) a media publisher 119$b$-5, and (4) "White Hole" 119$b$-1.

Figure 15:
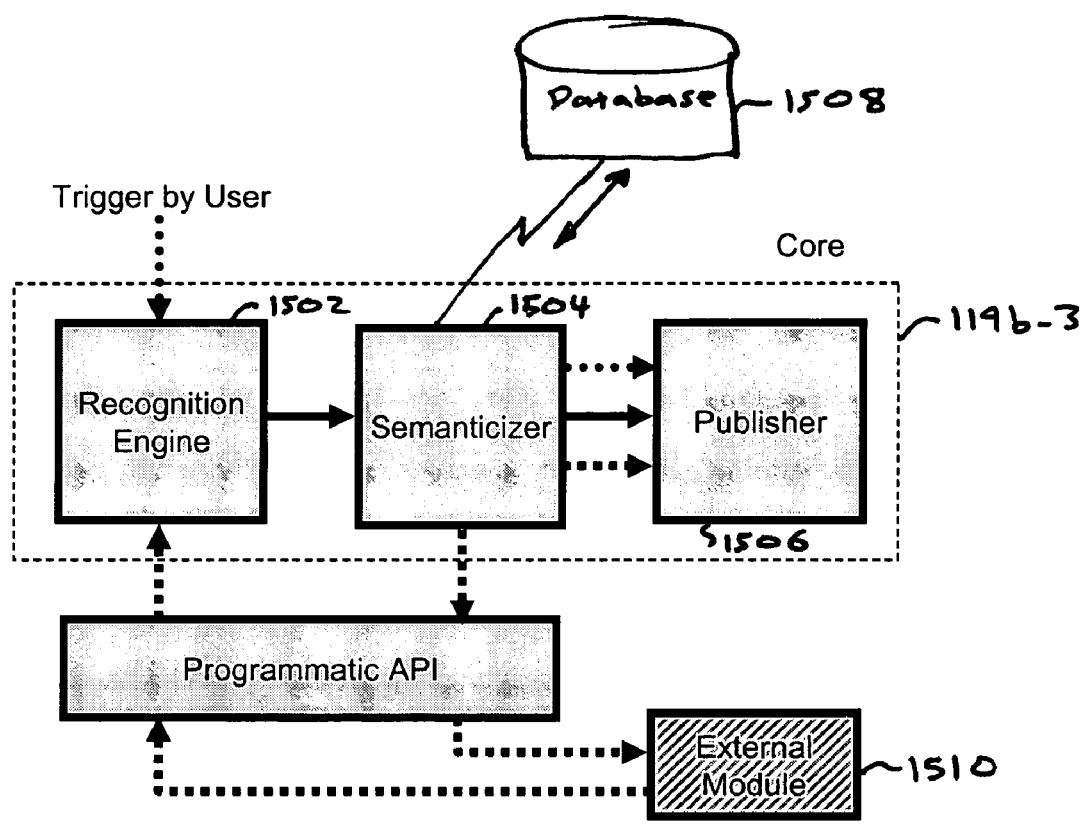
FIG. 15 is a functional block diagram of architecture of real-world object semanticizer, according to an embodiment of the present invention.

(1) Real-World Object Semanticizer Client 119$b$-3:

FIG. 15 is a functional block diagram of architecture of real-world object semanticizer client 119$b$-3, according to an embodiment of the present invention. A real-world object semanticizer client 119$b$-3 provides semantic objects out of real-world objects, such as a book. It may generate one or more semantic objects from one or many real-world objects, or many semantic objects from one or many real-world objects. As described above in connection with White Hole 119$b$-1 and PIPE-WS API 122, once a semantic object is generated/created, the PIPE-WS API 122 to the management tool 124 can be used to generate an SSD 116 for the generated semantic object, thereby allowing the semantic object to become a service 112 for discovery and composition. Technologies with potential uses for real-world object semanticizer include (without limitation), Passive and/or active Radio Frequency Identification (RFID) tags, Bar code, QR Code <http://www.qrcode.com>, two-dimensional code used mainly in Japan, Voice recognition with or without limited vocabulary and grammar, Visual and/or gesture recognitions, or any combinations thereof.

In FIG. 15, the real-world object semanticizer client 119$b$-3 comprises programmed processes of 1. a recognition processing engine 1502, 2. semanticizier process 1504, and 3. publisher 1506.

1. Recognition Engine:

The recognition engine 1502 recognizes tags, codes, voice, video, gesture, etc. The recognition process might be active (i.e. it is always on and it recognizes the object on its own) or passive (triggered by the users or programs). As for tags and codes, appropriate readers are used as the recognition engine 1502; as for voice/visual/gesture, recognition engines 1502 of corresponding multimedia input are used. Some recognition engines usually are error-prone. However, by giving some constraints on data patterns specific for the purpose may boost the recognition rate. For example, in case of voice recognition, one can limit the vocabulary and grammar used. Using additional confirmation processes by the recognition engine, when the recognition rate is low, also helps improve overall recognition rate of the system. For example, a user might command the following task 126 to the voice-recognition based real-world object semanticizer client 119$b$-3.

(User) Computer, give me the book with the ISBN: 0-7356-1918-2

(Computer) Sure.

In another task 126 conversation, it may be like the following.

(User) Computer, give me the book with the title, "INTRODUCING MICROSOFT.NET THIRD EDITION"

(Computer) Let me confirm. Is it the book with the title, "INTRODUCING MICROSOFT.NET THIRD EDITION"?

(User) Yes.

The variations of the above sentences can also be used in other cases by changing "book" (to other semantic object names), "ISBN" (to the property names of the semantic object), and the value (especially values such as ISBN or number can be well constrained).

Sometimes (partial/whole) semantic objects themselves might be encoded in the tags and codes (or in the voice command). Especially RFID tags with large memory and QR tags can hold semantic objects in plain text or encoded format. Alternatively, it is possible to have an RFID tag with a pointer to a semantic instance that can be downloaded, its SSD 116 created and published.

As soon as the recognition engine 1502 recognizes an object or objects, it will pass the information onto the semanticizer 1504.

2. Semanticizer 1504:

From the information passed by the recognition engine 1502, the semanticizer process 1504 first tries to find the information about the corresponding object. For example, in RFID case, it might consult the local or remote database 1508 for the objects with the RFID's. t. Next, the semanticizer process 1504 generates the semantic object. For instance, the "Book" semantic object by consulting a local or remote database 1508 based upon the ISBN number obtained from the recognition engine 1502. In FIG. 15, the circle dotted lines represent a "passive" mode case, in which recognition of a real-world object is triggered by the user. Alternatively, the recognition engine 1502 and semanticizer process 1504 might be invoked by an external module 510 via an API for the external module 1510 to obtain the semantic object(s) of the physical object.

The semantic objects might be stored as separate files in the local file system and the system might simply obtain the semantic object through the file which matches the information. For example, the semanticizer just picks the file with the same name as the RFID data and returns the semantic object in the file.

In case where the whole semantic objects are passed on to the semanticizer, it does nothing, but in case of the partial semantic objects, the semanticizer might or might not attach additional information about the object.

When the semanticizer is supposed to return a single or fixed number of semantic objects and it cannot determine them, it might ask the user to select appropriate ones from possible ones or arrange the recognition process to happen again.

At the end, the semanticizer will pass on those semantic objects on to the publisher or return them to the programmatic API module.

3. Publisher 1506:

The publisher provides those semantic objects as semantic object providing services. It will publish a single semantic object providing service if a single semantic object is provided by the semanticizer. Or it will publish multiple semantic object providing services when multiple objects are given. Or, in some cases, a single service which lets the user select one or more semantic objects from its user interface from multiple objects. Or a mixture of these methods. As for publishing mechanisms, a PIPE WS API 122 can be used.

According to an aspect of the embodiments described herein, the recognition may be triggered by the user, for example, clicking a button. Or it may be initiated by a function call from the programmatic API module. If the function call requires the return value of the recognized semantic objects, the semanticizer will return the semantic objects to the programmatic API module. In this case, the semanticizer might not send the semantic objects to the publisher. The function calls from the programmatic API module can be implemented remotely, such as using Web Services calls.

(2) Database Semanticizer client 119*b*-4:

Most formatted data today is stored in relational databases. A database semanticizer makes the data from the databases available as semantic objects, such as in RDF or more specifically in OWL. More particular, database semanticizer 119*b*-4 processes semi-structured text data. Typically according to the present invention, the database semanticizer comprises two major modules 1. a user interface to create the mapping between a database schema and an ontology; and 2. a Semantic service process to provide semantic objects from the database based on the mapping given above.

Optionally the database semanticizer can create the semantic objects from all or part of the data from the database in a single or multiple files based on the mapping created in the process 1.

The user interface to create the mapping can be graphical. More specifically it can show the database schema on one side in a GUI window and the ontology on the other side in another GUI window, which the user plans to map the database to. The user can manually specify the mapping between the database schema and the ontology. Typically according to the embodiments described herein, the user picks a semantic object in the ontology on one side and an item in the database schema on the other side and specify to the system (e.g. by clicking a "Map" button) that they are to be mapped. The user repeats the process until the user specifies all desired mappings. Using the mapping specification created as above, the semantic service process maps the data (real values) out from the database and creates a semantic instances with the values mapped accordingly. However, the system can also provide suggestions on the possible mapping based on the syntactical clues in the schema and the ontology. The system can provide on-the-spot checking of the mapping consistency. When the mapping is done, it will save the mapping, for example, as a file for the future use. The database semanticizer client 119*b*-4 can use a created semantic object to create a service 112 by creating an SSD 116 based upon the PIPE-WS API 122, as described herein.

The semantic service process comes with not only programmatic APIs to generate a semantic object based upon the mapping, but also a user interface for the user to pick up from one or more generated semantic objects. When the semantic service is executed, the semantic service provides the user interface for the user to pick up one or more semantic objects, then the semantic service returns the semantic objects selected as its return value. For the sake of efficiency, especially when the database holds huge number of data, the semantic service connects the database each time to provide the user interface and map the data to the semantic objects based on the mapping. But it is also possible for the database semanticizer to have the semantic objects created from the database based on the mapping given and provide its functions through those semantic objects.

(3) Media Publisher Client 119*b*-5

Like directory publishing service, the media publishing service allows user to select a file (audio, video, or image) from a device and get a corresponding semantic instance. However, the way how the service is launched is different. When user plugs in a device (such as memory device, digital camera, CD-ROM, DVD-ROM, or external hard drive) to a computing device, a program is launched to check whether there are files (audio files, video files, image files, etc.) in the device. If so, a dialog box will be popped up asking whether the user wants to publish them. If user decides to do so, a new service(s) is generated.

The service is extremely useful when user wants to share her files (audio, video, pictures, etc.) carefree. She simply needs to plug the device and click OK. Then everything is set for her. She can use those newly published services composed with other services to accomplish her tasks. If she prefers, with one option set, even the OK clicking can be omitted and the whole service publishing process can be made fully automatic. The media publisher client 119*b*-5 can use a created semantic object to create a service 112 by creating an SSD 116 based upon the PIPE-WS API 122, as described herein.

(4) "White Hole" 119*b*-1

FIG. 16A is a procedure of semantic-izing, service-izing and publishing of objects and services, according to an embodiment of the present invention. With reference to FIG. 16A, White Hole 119*b*-1 using PIPE-WS API 122 (management tools 124), supports the dynamic creation of services (service publishing) and their dissemination (sharing). This tool is used to semantic-ize, service-ize and publish (information) objects and services. The White Hole client 119*b*-1 has a convenient drag-and drop interface for operating system or application objects (such as files from the OS, contacts of PIM application, etc.), semantic objects in OWL format (or URL to the OWL file), and semantic service descriptions in OWL-S format (or URL to the OWL-S file).

When something is dropped (input) into the White Hole, the tool first decides its type, as follows: (a) if it is an OWL or OWL-S object, the white hole just passes it to PIPE-WS API 122 (discuss next) (FIG. 16D-F); (b) if it is a URL to a OWL or OWL-S file, the white hole downloads the content of the URL and passes it to PIPE-WS API 122; (c) if it is a known (semantically speaking) OS/application object (FIG. 16G-J) or a semantic object (FIG. 16K-N), the white hole semanticizes the object (see FIG. 16A, FIG. 16B, table 1550). Semantic-ization is the process of creating a semantic object from an OS/application object (e.g., as described in unlimiting examples of Real-world object semanticizer 119*b*-3 and database semanticizer 119*b*-4 for creating semantic objects). A TCS 118 can support ten types of OS/application objects (such as file and URL from OS, contact and schedule from PIM application, etc.). White Hole determines the semantic type of objects by their name, extension, and content. Once the type is determined, an OWL template for the type is retrieved and filled with the values extracted from the original object. Then the OWL description of the object is generated and passed on to PIPE-WS API 122. For example, if a user drops a contact item from a PIM application, the white hole first loads the OWL template for the contact type, then, retrieves the name, company, email, phone, etc., from the contact item, and fills them into the template. Finally the complete OWL object is passed on to PIPE-WS API 122.

PIPE-WS API 122, which is part of management tools 124 in the middleware server processing layer 108, is a tool to service-ize semantic objects and to publish them (see FIG. 16C); the possible outputs of the white hole (semantic object in OWL or semantic service description in OWL-S) need to be service-ized prior to publishing. So a service (with associated semantic description) 112 is created, which when invoked, will return the semantic object itself. Specifically, PIPE-WS API 122 first dynamically creates a web service, which returns the semantic object as its output when invoked; next, a semantic service description for the newly created service is generated (see FIG. 16, Table 1555). During this process, the name, description, output type, and grounding details of the service are determined and described in a high level (in OWL-S). Therefore, a Task Computing 100 system supports objects defined via a Task Computing 100 system and/or any OWL object as well.

The outcome of the service-ization is a Semantic Service Description, or SSD 116, which is either the original one that the user dropped into the white hole, or the one PIPE-WS API 122 created to describe the newly created web service. PIPE-WS API 122 can be used to publish the SSD 116 depending on the discovery range (as discussed above) that the user chooses. For example, if the user wants to publish it as a group by subnet service, PIPE-WS API 122 will create a UPnP device with a getDescriptionURL action that points to the OWL-S file.

Even though PIPE-WS API 122 is described in relation to the White Hole client 119*b*-1, PIPE-WS API 122 can be a completely independent tool with a Web services interface so that it can be called by any other components in a TCS 118, and used to publish objects or services. Conversely a PIPE-WS API 122 can call other TCE-WS API 106, such as STEER-WS API 120. One important usage of PIPE-WS API 120 is to realize a so called semantic object bank service, which is a persistent repository of semantic objects. A bank service can be used by users in an environment to leave such things as files, contacts, schedule, etc. as semantic object providing services in the environment so that people (maybe later) can use those services to accomplish tasks 126.

PIPE-WS API 120 also includes a management user interface which helps users to organize the semantic objects or services that the user has published through PIPE-WS API 120. The functions comprise:

1. Switch discovery range: The user can switch the discovery range for the services published through PIPE-WS API 122, for example, in order to temporarily "hold" services (empty discovery range).
2. Expiration time: The user can set the expiration time for the services, so that the service becomes undiscoverable after the expiration time.
3. Invocation limit: The user can set a limit for the number of possible invocations, so that the service becomes undiscoverable after that number of invocations.
4. Name/Description: The user can set or change the name and the text description of a service.

FIGS. 16D-16N are three examples of computer interpretable source codes of SSDs 116 in OWL-S, according to an embodiment of the present invention. In particular, FIG. 16D-F is an SSD 116 for a document-1 1570 created by Company-1. FIG. 16G-J is an SSD 116 created based upon an OS/Application object 1572 (in this example a contact of 'Bob Smith' from an Address Book, such as MS OUT-LOOK). And FIG. 16K-N is an SSD 116 created based upon a semantic object 1574 (in this example a "XYZ Project" semantic object.

New Services:

New services 112 are designed and implemented, which include: (1) semantic instance serializing services, (2) information providing services, (3) sensor services, such as (without limitation), time, weather related, temperature, and/or anything that can be sensed (4) snapshot services, (5) OWL formatter service, and (6) text formatter service.

(1) Semantic Instance Serialization Services:

The services in this category consume any types of semantic instances, serialize them and pass the information to users. One example is "Tell Me" service. It takes a semantic instance, serializes it into a human-understandable string and reads it out. Details of "Tell Me" service are as follows.

Once a semantic instance arrives, the semantic instance is first parsed by the "Tell Me" service. Then, "Tell Me" service will check its transformation script repository to see if there is any serialization transformation available for the class of the instance, or any classes of the object properties of the instance. The transformation script could be, but not limited to, Extensible Stylesheet Language (XSLT) script. If such a script is found, it is first applied to the instance and transforms the instance (or a part of the instance) into a string. This transformation process is applied recursively when the instance includes other instances as its object properties. (For example, a "Contact" instance can include an "Address" instances as its "hasBusinessAddress" and "hasHomeAddress" object properties and corresponding scripts are applied to the instance.)

For example, assume that the service receives the following "Address" instance:

```
<?xml version="1.0" encoding="UTF-8"?>
<rdf:RDF
xmlns:co="http://www.company-1.com/tce/ontologies/2004/03/
object.owl#"
  xmlns:rdf="http://www.w3.org/1999/02/22-rdf-syntax-ns#"
  xmlns:rdfs="http://www.w3.org/2000/01/rdf-schema#"
>
<co:Address>
    <rdfs:label>Company-1, City Name</rdfs:label>
    <co:streetAddress>1000 Example Ave</co:streetAddress>
    <co:city>City Name</co:city>
    <co:state>State Name</co:state>
    <co:zipCode>Zip Code Number</co:zipCode>
    <co:country>Country Name</co:country>
</co:Address>
</rdf:RDF>
```

By applying a script, the output is:

The "Address" of "Company-1, City Name" is "1000 Example Avenue, City Name, State, Zip Code Number, Country Name"

Next, the result of the transformation, or the instance itself if no such script is found, is sent to a general serialization module. The purpose of the module is to serialize any semantic instances using a default logic. In the above example, if there is no script for the address instance, the instance will be serialized as:

The "Address", "Company-1, City Name" has "1000 Example Avenue" as the "Street Address", "City Name" as the "City", "State Name" as the "State", "Zip Code Number" as the "Zip Code", and "Country Name" as the "Country"

The last step of the "Tell Me" service is to read the serialized string out. The serializing module of the "Tell Me"

service can also be used by many other similar services, such as "Show Me" service to display the string in a ticker device.

The "Tell Me" service can be extremely useful when used in combination with VoiceSTEER. This is a service which has one or more input and no output (semantically). It reads out the semantic object(s) which it receives as input. When the semantic object is of a known type to this service, it uses internal mechanisms such as an XSLT script for each know type to determine how to read the object. If the object is unknown to the service, it first looks for the object ontology to see if there is information on how to read it. If it also fails, it uses a default way to read it out using the ontology the object refers to.

For example, assume that the service receives the following "Address" object:

```
<?xml version="1.0" encoding="UTF-8"?>
<rdf:RDF
xmlns:co="http://www.company-1.com/tce/ontologies/2004/03/
object.owl#"
  xmlns:rdf="http://www.w3.org/1999/02/22-rdf-syntax-ns#"
  xmlns:rdfs="http://www.w3.org/2000/01/rdf-schema#"
>
<co:Address>
    <rdfs:label>Company-1, City Name</rdfs:label>
    <co:streetAddress>1000 Example Ave</co:streetAddress>
    <co:city>City Name</co:city>
    <co:state>State Name</co:state>
    <co:zipCode>Zip Code Number</co:zipCode>
    <co:country>Country Name</co:country>
</co:Address>
</rdf:RDF>
```

When the service does not know about "Address" object, it might read this object out something like:

The "Address", "Company-1, City Name" has "1000 Example Avenue" as its "Street Address", "City Name" as its "City", "State Name" as its "State", "Zip Code Number" as its "Zip Code", and "Country Name" as its "Country"

Labels for properties such as "Street Address" for "co:streetAddress" is defined in the ontology to which "Address" object refers. A semantic object can be serialized into a string by giving a transformation function (such as an XSLT code piece). If within the ontology file, a serialization function is defined, or "Tell Me" service knows how to serialize the "Address" object in its own knowledge base, it might apply the function and read this object out like:

The "Address" of "Company-1, City Name" is "1000 Example Avenue, City Name, State Name, Zip Code Number, Country Name"

This "Tell Me" service accepts any objects as its input. It can have multiple names such as "Tell", "What is" (Those names can be provided in the same OWL-S file or in separate OWL-S files.) That will give a natural way for user to examine a semantic object. For example, if you a service called "Temperature" returns the current room temperature, user can ask VoiceSTEER:

Computer, "Tell Me" (the) "Temperature"?
Computer, "What is" (the) "Temperature"?

The service can have other names and be made to accept specific kinds of object so that the service can be combined with automatic translation services insertion mechanism of Task Computing Clients. For example, let "Where is" a "Tell Me" service with the different name which accepts "Location" objects. Assume that there is a service, "Commander Data" which provides the "Contact" information of Commander Data including his location and "Location of" service which extracts the "Location" from "Contact". Then you can say to VoiceSTEER:

Computer, "Where is" "Commander Data"?

Then "Location of" service will be inserted automatically and the service composition, "Commander Data", "Location of", "Where is" will be executed and the location of Commander Data will be read out. Of course you can say:

Computer, "Tell Me" (the) "Location of" "Commander Data"?
Computer, "What is" (the) "Location of" "Commander Data"?

By making the service to accept specific kinds of object, it can also be made so that the service can be combined with service management function of semantic services. For example, let "Where is" a "Tell Me" service. Assume the "View on projector" service provides the location information in its SSD. Then you can ask VoiceSTEER:

Computer, "Where is" "View on Projector"?

Then the "Location of" service management function (the details of service management function are discussed in more detail below) is automatically added between "Where is" and "View on Projector."

"Where is" will be executed and the location of "View on Projector" will be read out. Of course you can say:

Computer, "Tell me" (the) "Location of" "View on Projector"?
Computer, "What is" (the) "Location of" "View on Projector"?

Even though "Tell Me" service is explained in the context of usage with VoiceSTEER where it would be most useful, it can be used along with any Task Computing Clients.

(2) Information Providing Services:

Information providing services take no input, and once invoked, creates a semantic instance as output. The difference between information providing services and instance providing services is that the instances generated by the information providing services are different from time to time, but those generated by the instance providing services are always the same. Some examples of information providing services are: temperature service, time and date service.

Take the "Temperature Service" as an example, once invoked, it checks the current temperature by the sensor and creates a semantic instance with the latest value. It is very useful when combined with "Tell Me" service mentioned above: when user commands: "Computer, Tell me (the) temperature of the conference room" through a voice-based Task Computing Client, she will hear: "The temperature is 75 degree."

(3) Sensor services, such as (without limitation), time, weather related, temperature, and/or anything that can be sensed is a type of information providing service.

Sensor services, such as Time/Temperature services, are the semantic object provider services. Once invoked, the services may consult devices, Web Services, Web Pages, and/or other information sources and return the current time/temperature as semantic objects.

(4) Snapshot Service

A snapshot service will capture a still image from imaging devices such as digital camera, digital video camera, scanner, etc. and returns an "image" semantic object when it is invoked.

(5) OWL Formatter Service

An OWL formatter service accepts semantic objects as its input, formats them into a human understandable way, and returns it as its output. In one of implementations in current technologies, it formats the semantic objects in the Table format in HTML using the ontologies used for the descriptions of those objects and returns the HTML's themselves or the URL's to them.

(6) Text Formatter Service

A text formatter service accepts semantic objects as its input, formats them into one of pre-determined text formats, and saves it as text files, appends it to some file, etc. For example, a text formatter service can accept a "Book" semantic object and format it into a BibTeX format and append it to the user's own BibTeX file. Or a bioinformatics object such as "Protein" can be formatted into a format used by Blast application by another text formatter service.

It can be implemented using XSLT and other scripts. For example, a text formatter service can hold the table of the pairs of a semantic object and a corresponding formatting XSLT script. When it receives a semantic object, the text formatter determines which XSLT script to use to format it by the table and it pops up the dialog box for the user to select which file to save it or to append it to.

Figure 17:
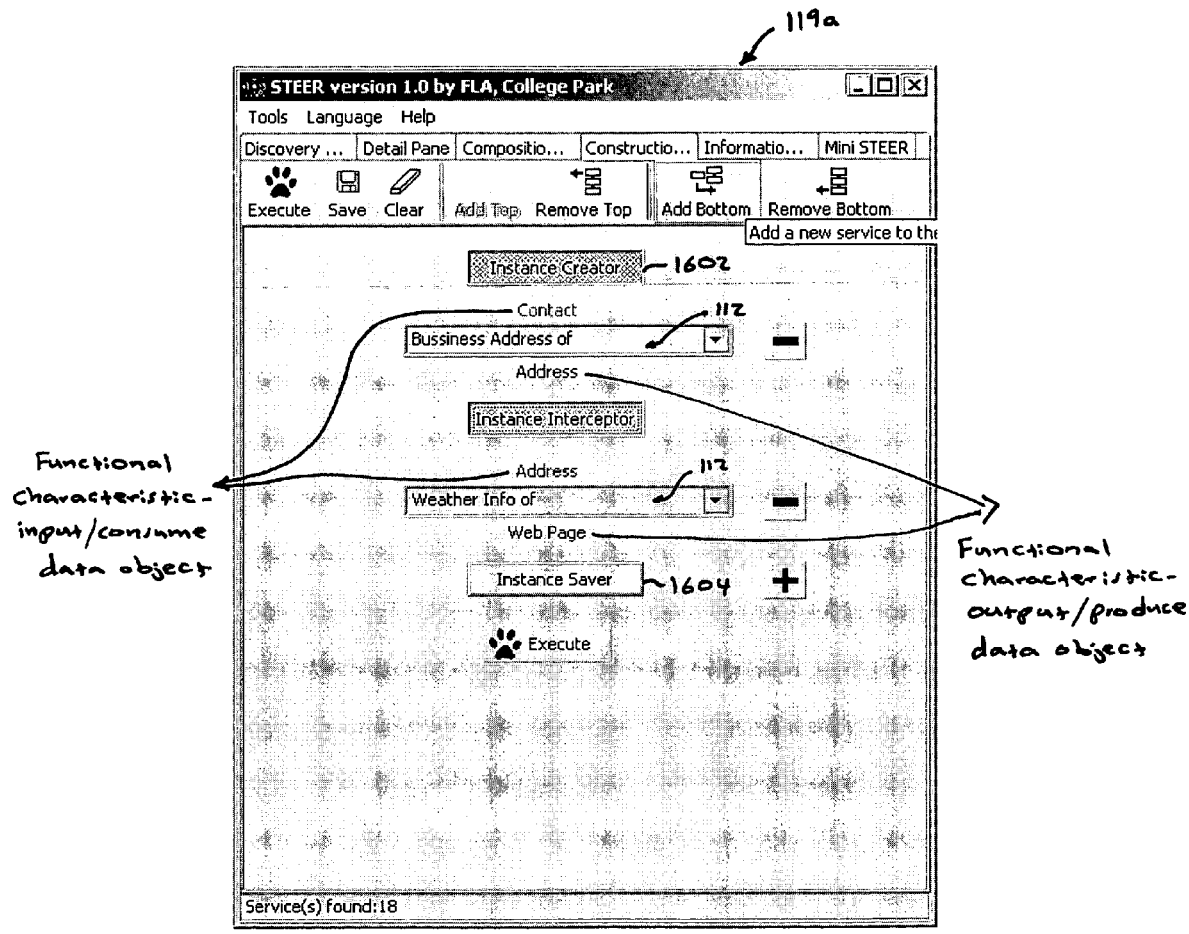
FIG. 17 is an image of a computer displayed graphical user interface of STEER-WS TCC with Internal Services, according to an embodiment of the present invention.

Task Computing Client 119 Internal Services:

FIG. 17 is an image of a computer display screen graphical user interface of STEER-WS TCC 119a with Internal Services, according to an embodiment of the present invention. Internal services are services that are closely bundled with Task Computing Clients 119 (STEER TCC, White Hole, Service Manager, etc. 119). As it is dealt within TCCs 119 in a special way, it can be made so that internal services can appear anywhere in clients' GUI even though they are not found through any particular discovery mechanisms.

In general, those internal services are too generic (provide and/or consume any "Thing"). So those internal services are provided in different ways by Task Computing Clients from other local and pervasive services 112. Even though an internal service might be treated very differently from other services 112, its Semantic Service Description is not different on the surface. This allows saving internal services into a composite service and sharing the composite service with others.

The execution of a composition with internal services is as follows. When the execution engine encounters an internal service, (the execution engine knows it because all internal services are described as a ordinary WSDL Web service with a known WSDL URL) the engine will check the WSDL operation name and decide which internal service it is. Once it is decided, instead of directly invoking a WSDL web service, the engine launches a special module to handle the internal service.

According to an aspect of the embodiments described herein, one can implement a real web service at the constant URL for the internal service, which serves the same purpose as the internal service. It is useful in some cases when some clients, which do not have internal service mechanisms implemented, can still invoke the service at the URL. Obviously, it is more efficient to invoke it as an internal service in our approach.

The following implemented internal services are described herein: (1) Instance Creating Service, (2) Instance Copier, (3) Intercepting Service, (4) Instance Saving Service, and (5) Property Choosing Service. Instance creator, instance copier, interceptor, and instance saver are four internal client 119 services that are related to task 126 execution flow control. They share some common modules when dealing with semantic objects. The common modules make it possible for user to dynamically save the semantic instance as a file or to publish a local or pervasive instance providing service. (It can be made so that it will feed the semantic instance (or its object property) to a semantic service composition.) User can also load the semantic instance from a file in the local storage or on a Web site for the whole instance or object properties of the instance. It can be made so that it load the semantic instance as a result from a semantic service composition execution. The common modules also perform validity check for the data based on the ontology (such as "Integer", "Time", etc.).

(1) Instance Creator:

In FIG. 17 a selectable graphical display for "Instance Creator" 1602 is shown. Instance creating service is a service that generates an interactive interface for any semantic type based on the ontology and allows user to create a semantic instance of that type from the interface. It is useful in the case when user wants to test a service with input, but does not have any services that provide that type of input. Instance creating service can be put before any services that take input. The output type of the instance creating service is the same as the input type of the service after it.

(2) Instance Copier

Copier service is placed between two services in an execution sequence. At its point in the execution flow, it just copies its input to its output and does nothing else. It is used mainly for saving compositions with some of the inputs to the composition copied to multiple services. Without the copier, the saved composition needs to have multiple inputs that should be exactly the same. With the copier, the saved composition can have only one input. Internally within the saved composition, the instance copier as the first service accepts the input the input is then copied to multiple services within the composition. The input and output type of the copier is the same as the output type of the previous service.

(3) Instance Interceptor:

Interceptor service is placed between two services in an execution sequence. Once inserted, it stops at its point in the execution flow, parses and displays the output of the previous service. User has chances to review and update the value before continue. If she is not satisfied with the result, she might choose to stop the execution. Meanwhile, the intermediate results can be saved into a file, or published as a semantic instance. Interceptor service can be placed between any two services. The input and output type of the interceptor is the same as the output type of the previous service.

(4) Instance Saver:

In FIG. 17 a selectable graphical display for "Instance Saver" 1604 is shown. Instance saving internal service 1604 analyzes and saves any semantic instances. In some scenarios, the output generated by a service cannot be consumed by any other services within the environment. Without the instance saving service, the result will get lost. With it, user has an extra option to store the result for future use or use it in another environment where a service is available to consume it. Instance saving service can be placed after any services that generate outputs. The input type of the instance saving service is the same as the output type of the previous service.

(5) Property Chooser

Property chooser is a service that extracts a part of an output and sends to the next service. It is useful in the case when a service is only interested in part of the output that is generated by another service. For instance, "My Contact" service allows user to select a contact item from her Outlook and generates a "Contact" instance. "Map of" service accepts an "Address" instance and displays the map of the address. These two services can not be linked together because there is no super-sub-class relationship between "Contact" and "Address." However, notice that "Contact" instance has a property called "hasBusinessAddress," which has "Address" type. Property chooser service is used here to help user to discover this type of possible composition.

Property chooser service can be placed between two services where the input of the second service is a property of the output of the first service (or recursively so). The input type of the property chooser is the same as the output type of the service prior to the property chooser and the output type of the property chooser is the same as the input type of the service after the property chooser.

Described herein is implementation of a Task Computing computer system by segmenting Task Computing 100 environment into a plurality of computer system implementation tiers of a presentation client processing layer, a remote procedure call application programming interface (API), a middleware server processing layer to which the presentation layer interfaces via the remote procedure call API to real-time, dynamically generate a computer implemented task interface at the presentation layer to a semantically described computer system source of function as a service on a computer system; a service layer and a function source realization layer providing the semantically described computer system source of function as the service on the computer system to which the middleware processing layer interfaces; and real-time, dynamically composing an executable task that comprises one or more services, according to the generated task interface at the presentation layer to one or more services on the computer system. A computer service is in real-time and dynamically composed into an executable task using the generated interface to the service on the computer based upon the semantically described application-, device- and service-rich computer. According to an aspect of the embodiments described herein a user practically, effectively, efficiently, dynamically, in real-time, relies on a flexible and unified user interface (composition and execution functions) to manage interaction and to interact with a pervasive computing environment.

Task Computing, is the approach that: (a) seeks to exploit SemanticWeb technologies, so that the larger (semantic) web of resources will be immediately available to ubiquitous computing applications, and (b) is quite agnostic about the nature of the resources, as regardless of how they are discovered, accessed, connected to, or communicated with, a service abstraction 116 can be used to make them usable by a Task Computing 100 system. Task Computing relies on semantically described services 116 as the universal abstraction of all functionality; and in addition, Task Computing has a larger scope than device-to-service interoperability, as composable tasks 126 may involve many services 112. For example, a typical Task Computing 100 system task 126 might real-time, dynamically utilize 5-6 services 112.

The above described preferred embodiments of the present invention are implemented in software (as stored on any known computer readable media) and/or programmable computing apparatus/hardware controlling a programmable apparatus/computing device (for example, a programmable electronic device that can store, retrieve, present (for example, display) and process data)—any type of electronic programmable computing apparatus, such as (without limitation) a personal computer, a server and/or a client computer in case of a client-server network architecture, networked computers in a distributed network architecture, a terminal device, a personal digital assistant, a mobile device).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
semantically describing a plurality of computer system sources of functions as services on a computer system;
segmenting a computer system including one or more computer systems in network communication into a plurality of computing system implementation tiers comprising:
a presentation client processing layer using a computer, a remote procedure call (RPC) application programming interface (API),
a middleware server processing layer using a computer to which the presentation layer interfaces via the RPC API to real-time, dynamically generate a computer implemented task interface at the presentation layer to a semantically described computer system source of function as a service on a computer system, and
a service layer and a function source realization layer, using a computer, providing the semantically described computer system source of function as the service on the computer system to which the middleware server processing layer interfaces;
registering by a first computer system of the plurality of computer systems an RPC API of the first computer system via the network in a second computer system of the plurality of computer systems;
discovering by the second computer system a service on the second computer system;
informing, by the second computer system via the registered RPC API, the first computer system of the discovered services in the second computer system; and
using the first computer real-time, dynamically composing an executable task that comprises a plurality of services, according to a generated task interface at the presentation layer to the plurality of services discovered at the first and/or the second computer,
wherein the semantically describing the plurality of computer system sources of functions as services, comprises:
describing functional characteristics of a computer system source of function using an ontology, and
assigning a name to the service as an element of a natural language sentence to support composability of the services mapping into composability of natural language elements as a natural language sentence, and
wherein a generation of the computer implemented task interface comprises identifying compatible discovered services according to a functional characteristic of a service based upon the describing of the functional characteristics of a computer system source of function using an ontology to support user composing the executable task of the compatible services based upon a name assigned to the service.

2. The method of claim 1, wherein the service layer comprises a service function from a function source realization layer and a semantic service description correspondingly semantically describing the service function of the function source realization layer, as the service on the computer system.

3. The method of claim 1, wherein the remote procedure call API is a remote Web services API.

4. The method of claim 3, further comprising filtering discovery of the services in the second computer system according to specifying a filter in the registered remote Web services API.

5. The method of claim 4, wherein the filter is a query according to Resource Description Framework Data Query Language (RDQL).

6. The method of claim 1, wherein the middleware server processing layer comprises programmed units of a service discovery unit, a service composition unit, a service execution unit, a service management unit, or any combinations thereof accessible via the remote procedure call API to support the real-time, dynamically generation of the computer implemented task interface at the presentation layer.

7. The method of claim 6, wherein the registering, discovering and informing further comprises:
   installing a first programmed unit of the middleware server processing layer in the second computer system as a remote middleware server processing layer;
   publishing a first RPC API of the first programmed unit in the second computer system;
   invoking by a second programmed unit in the first computer system, via the published first RPC API, the first programmed unit in the second computer system to manage a service in the second computer system.

8. The method of claim 7, wherein managing the service in the second computer system comprises discovering, executing, manipulating, or any combinations thereof of the service in the second computer system via the semantic description of the computer system source of function for the service.

9. the method of claim 7, wherein the invoking the first programmed unit in the second computer system to manage a service in the second computer system, comprises:
   discovering the service via the semantic description of the computer system source of function for the service according to one or more discovery mechanisms of file system, multi-cast, community directory, open semantic service directory, or any combinations thereof.

10. The method of claim 7, wherein the invoking the first programmed unit in the second computer system to manage a service in the second computer system, comprises:
   setting a discovery range from ranges of empty, private, group by subnet, group by interest, or any combinations thereof, in the semantic description of the computer system source of function for the service; and
   discovering the service via the semantic description of the computer system source of function for the service according the discovery range set in the semantic description of the computer system source of function for the service.

11. The method of claim 7,
   wherein the remote procedure call API is a remote Web services API.

12. The method of claim 11, wherein the managing of the service on the second computer system comprises creating, publishing, discovering, executing, or any combinations thereof of the service on the second computer system.

13. The method of claim 1, wherein the computer system source of function is described semantically according to Web Ontology Language (OWL) based Web service ontology (OWL-S) language.

14. The method of claim 1, wherein the semantic description of a computer system source of function comprises a spoken language attribute controlling a computer user interface according to the spoken language.

15. The method of claim 14, wherein the computer user interface is a computer displayed graphical user interface and the spoke language attribute controls displayed description of a service name and a service description according to the spoken language.

16. The method of claim 1, wherein the semantic description of a computer system source of function comprises descriptions for a relaxed data type of input, a location of a computer system source of function as a service, a management function or any combinations thereof.

17. The method of claim 1, wherein the semantic description of a computer system source of function as the service on the computer system comprises identifying two or more types of input data for the service, a first input data type identifying an exact domain of input data and a second input data type identifying a relaxed input data type of a domain larger than the domain of the first input data type.

18. The method of claim 1, wherein the semantic description of a computer system source of function as the service comprises a description for a management function for the service, a link to a description for a management function for the service or both.

19. The method of claim 18, wherein the management function comprises one or more service processes of deleting a service, returning a handled semantic object of a service, presenting a user interface to the service, status information of the service, a location of the service, or any combinations thereof.

20. The method of claim 1, wherein the computer implemented interface to the semantically described computer system source of function is a computer displayed graphical user interface, a voice command user interface, a radio device user interface, or any combination thereof.

21. The method of claim 1, wherein the computer implemented interface to the semantically described computer system source of function is a voice command user interface, and the method further comprises:
   defining a service name according to a natural language in the semantic description of the computer source of function,
   generating a speech recognition state grammar diagram according to the defined natural language service names,
   recognizing by a speech recognizer a spoken natural language sentence as a composition of a task that comprises one or more of spoken defined service names,
   matching the recognized spoken defined service names to a sequence of services according to the speech recognition state grammar diagram, and
   executing the task by executing the matched services.

22. The method of claim 20, wherein the computer displayed graphical user interface is a spatial presentation of a service.

23. The method of claim 22, wherein the spatial presentation of a service comprises:
   displaying an area map; and
   spatially displaying over the area map discovered services.

24. The method of claim 1, wherein access to a service is controlled according to service access control elements of facts provided by a client, the service private policy, a shared policy, ontologies, or any combinations thereof.

25. The method of claim 1, wherein the presentation client processing layer comprises providing internal services of instance creator, instance copier, instance interceptor, instance saver, property chooser or any combinations thereof.

26. The method of claim 1, further comprising:
   providing a semantic instance serializing service, an information providing service, a sensor service, a snapshot service, an Web Ontology Language (OWL) formatter service, and a text formatter service as the plurality of computer system sources of functions semantically described.

27. The method of claim 26, wherein the semantic instance serializing service comprises consuming any type of semantic instance, serializing the semantic instance into information and providing the information to a user.

28. The method of claim 26, wherein the information providing service comprises outputting a semantic object from a computer system source of function, wherein the computer system source of function is an information providing source of function.

29. The method of claim 28, wherein the information providing source of function provides time, date, weather related, road traffic, or any combinations thereof.

30. The method of claim 26, wherein the snapshot service comprises:
capturing a still image from an imaging device; and
outputting a semantic object for the still image.

31. The method of claim 26, wherein the OWL formatter service comprises:
accepting a semantic object as input;
formatting the semantic object into a human understandable way, and
outputting the formatted semantic object.

32. The method of claim 26, wherein the text formatter service comprises:
accepting a semantic object;
formatting the semantic object into one of pre-determined text formats; and
outputting the formatted semantic object.

33. The method of claim 1,
wherein the computer system comprises a plurality of computer systems in network communication, and
wherein the computer system sources of functions as the services comprise device, application, electronic service, content, or any combinations thereof sources of functions on any of the plurality of computer systems.

34. The method of claim 33 or 1, wherein the computer system sources of functions as the services are available through remote procedure calls of WSDL (Web Service Description Language), a UPnP (Universal Plug and Play), CORBA, RMI, RPC, DCE, DCOM, or any combinations thereof.

35. The method of claim 1, wherein the middleware server processing layer comprise a service management process, and the presentation client processing layer comprises one or more semantically described service control mechanism clients to create, publish, or manipulate, or any combinations thereof, a semantic object or a semantic service description, or any combinations thereof for a computer system source of function as a service.

36. The method of claim 35, wherein the semantically described service control mechanism clients comprise a client process to semanticize, create a semantic service description, and publish the semantic service description as a service, a real-world object semanticizer client, a database semanticizer client, and a media publisher.

37. The method of claim 36, wherein the media publisher comprises:
receiving a selected data object;
generating a corresponding semantic instance for the selected data object, and
creating and publishing a semantic service description for the generated semantic instance to provide a service.

38. The method of claim 36, wherein the database semanticizer semanticizes a database by:
mapping a schema of the database to an ontology; and
generating a semantic object of data in the database upon the mapping.

39. The method of claim 38, wherein the generating of the semantic object comprises generating the semantic object from all or a part of the data in the database and outputting one or more semantic objects in a single or multiple files.

40. The method of claim 38, wherein the mapping further comprises:
displaying a graphical user interface comprising:
a first window displaying selectable graphical displays of the database schema; and
a second window displaying a selectable graphical display of an ontology; and
mapping by a user the database schema to the ontology, based upon the displayed graphical user interface.

41. The method of claim 40, wherein the mapping further comprises:
suggesting by a programmed processor a possible mapping according to syntactical clues in the database schema and the ontology.

42. The method of claim 38, further comprising:
displaying a graphical user interface comprising selectable graphical displays of a semantic object; and
returning a value of a selected semantic object.

43. The method of claim 35, wherein the semantically described service control mechanism clients comprise a client process to semanticize by:
recognizing an object;
generating a semantic instance based upon the recognized object; and
publishing the semantic instance.

44. The method of claim 43, wherein the object is a physical object, voice, video, or any combinations thereof.

45. The method of claim 43, wherein the recognizing of the object is according to reading a computer readable code, detecting a Radio Frequency Identification (RFID) tag, and detecting object information by multimedia recognition processing engines.

46. A method comprising:
semantically describing a plurality of computer system sources of functions as services on a computer system;
segmenting a computer system into a plurality of programmable computing system implementation tiers comprising:
a presentation client processing layer using a computer,
a remote procedure call application programming interface (API),
a middleware server processing layer using a computer to which the presentation layer interfaces via the remote procedure call API to real-time, dynamically generate a computer implemented task interface at the presentation layer to a semantically described computer system source of function as a service on a computer system, and
a service layer and a function source realization layer, using a computer, providing the semantically described computer system source of function as the service on the computer system to which the middleware server processing layer interfaces; and
using the first computer real-time, dynamically composing an executable task that comprises one or more services, according to the generated task interface at the presentation layer to one or more services on the computer system,
wherein the semantically describing the plurality of computer system sources of functions as services, comprises:
describing functional characteristics of a computer system source of function using an ontology, and assigning a name to the service as an element of a natural language sentence to support composability of the services mapping into composability of natural language elements as a natural language sentence, and wherein generation of the computer implemented task interface comprises:

discovering available services, and identifying compatible services according to a functional characteristic of a service based upon the describing of the functional characteristics of a computer system source of function using an ontology to support user composing the executable task of the compatible services based upon the names assigned to the service, and wherein the computer implemented task interface is a computer displayed screen graphical user interface, and the graphical user interface comprises:

displaying in a first graphical user interface window selectable graphical displays of discovered services according to a tree structure;

presenting a second graphical user interface window supporting real-time, dynamic composition of the one or more services into a task according to a process, comprising:

selecting by a user a discovered service in the first graphical user interface window;

automatically displaying a selectable graphical display of other compatible services in connection with the selected discovered service;

selecting by a user a compatible service; and real-time, dynamically displaying in the second graphical user interface window a directed service graph according to the user selecting of the discovered service and the compatible services as the task; and displaying a selectable graphical display of task execution to execute the task.

47. The method of claim 46, wherein the displayed discovered services are organized in the first graphical user interface window according to functional characteristics of the discovered services.

48. A computer system, comprising:

one or more server computers that execute a server processing system abstracting computer system sources of functions by semantically describing the computer system sources of functions as one or more services; and a client computer that executes a client processing system interfacing with the server computers via a remote procedure call and supporting via a computer implemented task interface real-time, dynamic composition of an executable task comprising a plurality of services discovered in the client computer and/or in the server computer, based upon the semantically-described computer system sources of function, wherein a server computer includes a middleware server processing layer including a first programmed unit of the middleware server processing layer published via a first remote procedure call (RPC) API as a remote middleware server processing layer, and the client computer includes a second programmed unit managing the one or more services in the server computer by invoking, via the published first RPC API, the first programmed unit in the computer server, the managing of the one or more services including discovering of the one or more services in the computer server, based upon the semantically-described computer system sources of function, wherein the semantically describing the computer system sources of functions as services, comprises:

describing functional characteristics of a computer system source of function using an ontology, and assigning a name to the service as an element of a natural language sentence to support composability of the services mapping into composability of natural language elements as a natural language sentence, and wherein a generation of the computer implemented task interface comprises identifying compatible discovered services according to a functional characteristic of a service based upon the describing of the functional characteristics of a computer system source of function using an ontology to support user composing the executable task of the compatible services based upon a name assigned to the service.

49. A portable computer readable storage medium storing at least one program controlling a computer communicably connectable to other computers to perform operations comprising:

as services semantically describing a plurality of computer system sources of functions in the computer and/or the other computers;

discovering the plurality of semantically described computer system sources of functions as the services by:

registering a remote procedure call (RPC) application programming interface (API) of the computer in other computer, discovering, via the registered RPC API, a service in the other computer, and presenting a plurality of services discovered in the computer and/or in the other computer in a first graphical user interface window;

presenting a second graphical user interface window supporting real-time, dynamic composition of the plurality of services discovered at the computer and/or the other computer into a task according to a process, comprising:

selecting by a user a discovered service in the first graphical user interface window;

automatically displaying a selectable graphical display of other valid services in connection with the selected discovered service;

identifying, as valid services, compatible services from the plurality of discovered services according to a functional characteristic of a service described in a semantic description of a computer system source of function;

selecting by a user a valid service; and real-time, dynamically displaying in the second graphical user interface window a directed service graph as the task according to the user selecting of the discovered service and the valid service; and displaying a selectable graphical display of task execution to execute the task.

50. A terminal device communicably connectable to other terminal devices, comprising:

a computer processor controlling a terminal device by:

discovering, via a registered remote procedure call mechanism to the other terminal devices, a plurality of semantically described computer system sources of functions as services;

generating a computer implemented user interface supporting real-time, dynamic composition of a plurality of services discovered at the terminal device and/or at the other terminals devices into a task by:

presenting the discovered services in a first graphical user interface window, presenting a second graphical user interface window supporting the real-time, dynamic composition of the plurality services into the task by:
  providing a user selected discovered service from the first graphical user interface window,
  automatically displaying a selectable graphical display of other compatible services, as valid services in connection with the selected discovered service, from the plurality of discovered services according to a functional characteristic of a service described in a semantic description of a computer system source of function,
  real-time, dynamically displaying in the second graphical user interface window a directed service graph as a composition of the task according to the user selection of the discovered service and the valid services, and
  displaying a selectable graphical display for a task execution command to execute the task; and
controlling processing of the task including the plurality of services according to semantic descriptions of computer system sources of functions as the services, in response to a selection of the task execution command.

51. The terminal device of claim 50, wherein the computer implemented user interface is a computer displayed graphical user interface, a voice command user interface, a radio device user interface, or any combination thereof.

52. The terminal device of claim 50, wherein a semantic description of a computer system source of function as a service is a Web Ontology Language (OWL-S) based file and the computer processor reads the OWL-S file and executes the service according to the reading of the OWL-S file.

53. A server processing apparatus in communication with a plurality of client processing apparatuses, the server processing apparatus comprising:
  a computer processor that executes a server process controlling, in response to one or more remote procedure calls, the server processing apparatus according to a process, comprising:
    discovering on the server processing apparatus and/or discovering, via registered remote procedure call (RPC) application programming interfaces (APIs) on the plurality of client processing apparatuses, a plurality of semantically described computer system sources of functions as services;
    controlling via a remote procedure call generation of a client computer implemented user interface supporting real-time, dynamic composition of a task that includes a plurality of services discovered on the server processing apparatus and/or the client processing apparatuses by:
      presenting the discovered services in a first graphical user interface window,
      presenting a second graphical user interface window supporting the real-time, dynamic composition of the plurality of services into the task by:
        providing a user selected discovered service from the first graphical user interface window,
        automatically displaying a selectable graphical display of other compatible services, as valid services in connection with the selected discovered service, from the plurality of discovered services according to a functional characteristic of a service described in a semantic description of a computer system source of function,
        real-time, dynamically displaying in the second graphical user interface window a directed service graph as the task according to the user selection of the discovered service and a valid service, and
        displaying a selectable graphical display for a task execution command to execute the task.

54. The server processing apparatus of claim 53, wherein the controlling of generation of the client computer implemented user interface further comprises:
  receiving the task execution command; and
  executing the one or more services at the client to execute the task, in response to the task execution command.

* * * * *

UNITED STATES PATENT AND TRADEMARK OFFICE
CERTIFICATE OF CORRECTION

PATENT NO. : 7,761,885 B2
APPLICATION NO. : 11/115403
DATED : July 20, 2010
INVENTOR(S) : Yannis Labrou et al.

It is certified that error appears in the above-identified patent and that said Letters Patent is hereby corrected as shown below:

Column 53, Line 65 delete "spoke" and insert -- spoken --, therefor.

Column 55, Line 66 delete "database upon" and insert -- database based upon --, therefor.

Signed and Sealed this

Twenty-first Day of December, 2010

David J. Kappos
*Director of the United States Patent and Trademark Office*